United States Patent [19]

Ishii et al.

[11] Patent Number: 5,058,201
[45] Date of Patent: Oct. 15, 1991

[54] MOBILE TELECOMMUNICATIONS SYSTEM USING DISTRIBUTED MINIATURE ZONES

[75] Inventors: Yasuhiro Ishii; Tetsuji Isogai; Tatsuhiko Okazaki; Fumikazu Sato; Hiroto Yoneyama; Yukio Inotsume; Toshiyuki Kodama, all of Tokyo, Japan

[73] Assignee: Oki Electric Industry Co., Ltd., Japan

[21] Appl. No.: 357,010

[22] Filed: May 24, 1989

[30] Foreign Application Priority Data

| Jun. 7, 1988 | [JP] | Japan | 63-138407 |
| Jun. 9, 1988 | [JP] | Japan | 63-140374 |
| Jun. 9, 1988 | [JP] | Japan | 63-140375 |
| Jun. 9, 1988 | [JP] | Japan | 63-140376 |
| Jun. 9, 1988 | [JP] | Japan | 63-140377 |
| Jun. 9, 1988 | [JP] | Japan | 63-140378 |
| Jun. 9, 1988 | [JP] | Japan | 63-140379 |
| Jun. 10, 1988 | [JP] | Japan | 63-141550 |
| Jun. 10, 1988 | [JP] | Japan | 63-141551 |
| Jun. 10, 1988 | [JP] | Japan | 63-141553 |

[51] Int. Cl.$^5$ .................................................. H04Q 7/00
[52] U.S. Cl. ........................................ 455/33; 455/34; 455/56; 379/60
[58] Field of Search ............................. 455/33–34, 455/56, 8, 10; 379/60, 59

[56] References Cited

U.S. PATENT DOCUMENTS

| 2,607,887 | 8/1952 | Gissler et al. | 455/33 |
| 4,144,496 | 3/1979 | Cunningham et al. | 455/33 |
| 4,193,031 | 3/1980 | Cooper | 455/56 |
| 4,775,999 | 10/1988 | Williams | 455/33 |
| 4,856,048 | 8/1989 | Yamamoto et al. | 455/33 |
| 4,879,740 | 11/1989 | Nagashima et al. | 455/33 |

OTHER PUBLICATIONS

W. R. Young, et al., "Advanced Mobile Phone Service"; Bell Sys. Tech. J., vol. 58, No. 1, pp. 1–275 (Jan. 1979).

Primary Examiner—Curtis Kuntz
Assistant Examiner—Andrew Faile
Attorney, Agent, or Firm—Edward D. Manzo

[57] ABSTRACT

A mobile telecommuncations system has multiple base stations each defining a miniature service zone and capable of communicating with mobile stations present in the service zone over a radio link. Geographically associated ones of the base stations are spaced apart from each other by an area which is not responsive to electromagnetic waves on the radio links, whereby the base stations are allowed to share the same frequency for the electromagnetic waves. The base stations are interconnected to an on-road vehicle telecommunications network which switches communications to the base stations.

25 Claims, 29 Drawing Sheets

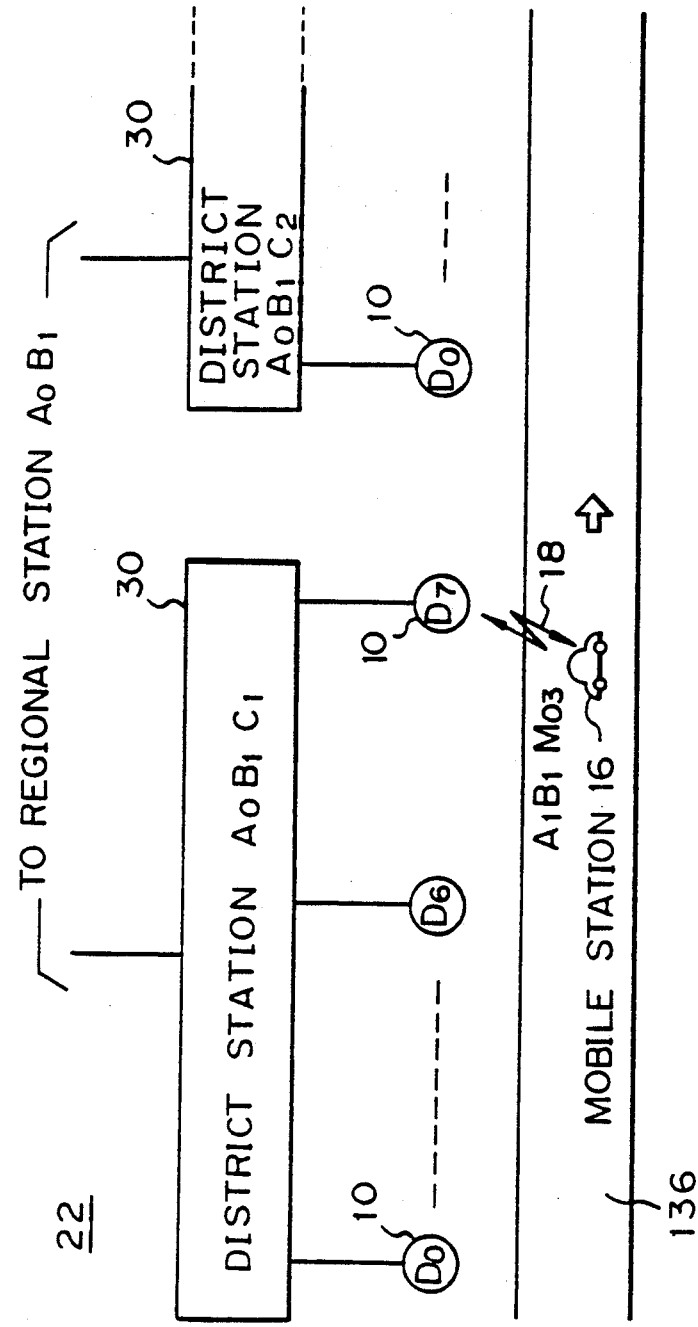

REGISTRY STATION

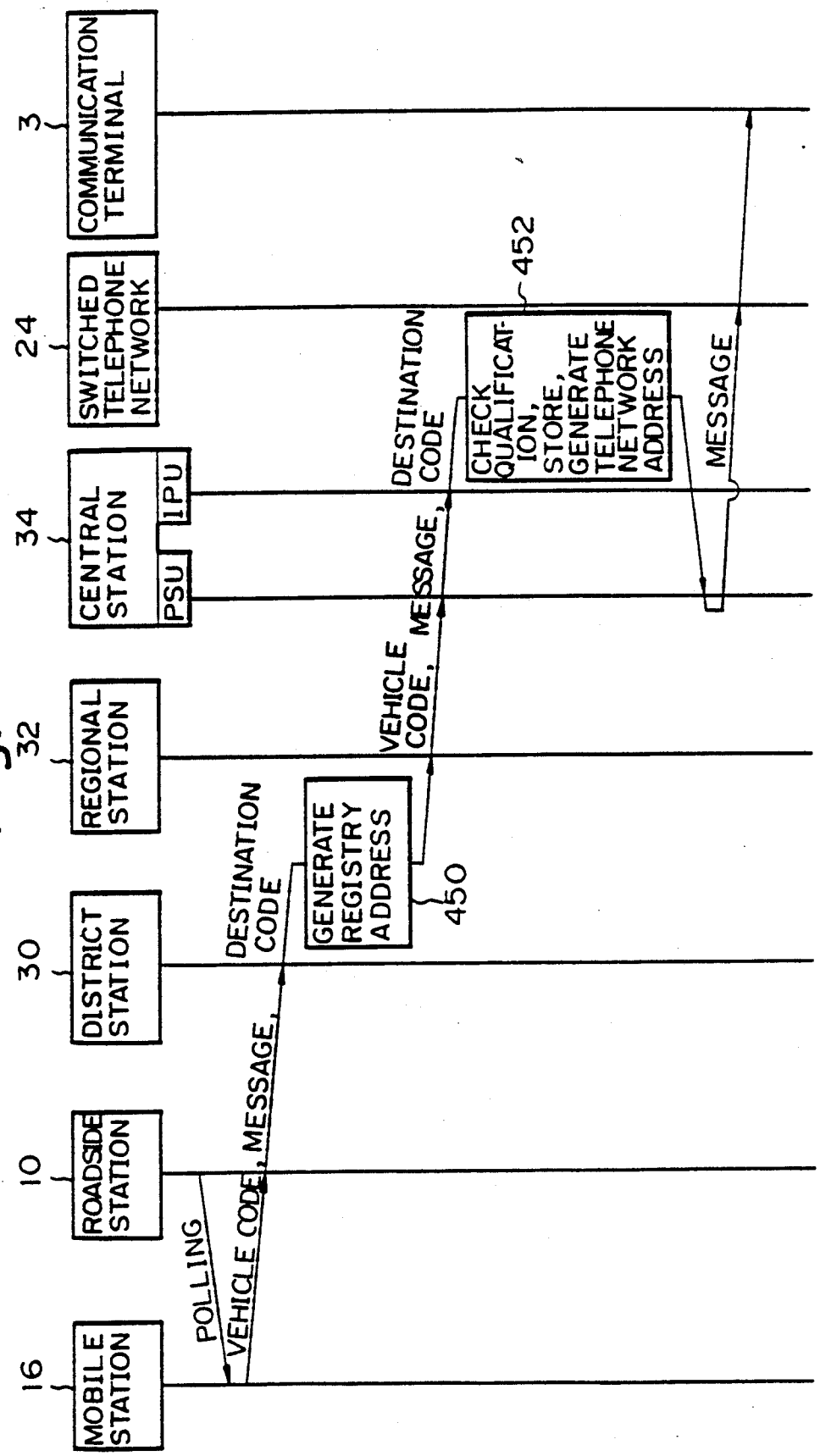

MOBILE TELECOMMUNICATIONS SYSTEM USING DISTRIBUTED MINIATURE ZONES

BACKGROUND OF THE INVENTION

1. Field of the Invention

The present invention relates to a mobile telecommunications system and, more particularly, to a mobile telecommunications system advantageously applicable, but not exclusively, to telecommunications with vehicles such as motorvehicles.

2. Description of the Prior Art

Typical of prior art mobile telecommunications systems with which the present invention is particularly concerned is an automobile telephone system which is disclosed in W. R. Young, "Advanced Mobile Phone Service", Bell Syst. Tech. J. Vol. 58, No. 1, pp. 1-278, January 1979. Some of prior art automobile telephone systems share a cellular concept which is such that base stations each covering a limited service zone or cell are arranged two-dimensionally and the service zones of adjoining base stations overlap each other to insure the continuity of a communication.

To terminate an incoming call at a given mobile station, it is necessary to determine the current position of the mobile station. With the prior art cellular automobile telephone system, it has been customary to cause a network to access a plurality of zones by general calling, then detect a response of a mobile station of interest to determine the current position of the mobile station, and then terminate an incoming call at that station.

In a cellular mobile communication system, different frequencies are assigned to the individual zones or cells which adjoin each other so as to avoid interference of electromagnetic waves. To effectively use a limited frequency band available, it is preferable that the zone configuration is fractioned to promote repetitive use of the same frequency. However, fractioning the zone configuration increases the number of times that the frequency should be switched over during movement of a mobile station over a plurality of zones, forcing both of the base stations and the mobile stations to bear an extra load for frequency switchover control. This problem is more pronounced as the moving speed of a mobile body increases. The only implementation available with the prior art cellular system for eliminating this problem is to broaden each zone or to increase the number of frequencies assigned. However, increasing the number of frequencies is extremely difficult in the present servere frequency assignment environment.

An automobile telephone system implemented by the cellular concept is customarily designed to implement voice communications and is therefore not always suitable for services of the kind transmitting a large amount of data at high speed. In land traffic which involves automobiles, for example, services of the kind mentioned include a navigation service which guides automobiles along appropriate routes depending upon the degrees of conjestion, weather and so fourth, and an operation control service which controls the operations of a large number of automobiles collectively with efficiency. In this kind of traffic, therefore, a large amount of data have to be interchanged between on-board units and base stations at high speed. The frequency band of a transmit signal available with a prior art automobile telephone system is limited to the speech band, limiting the applicability of the system.

Further, in the prior art automobile telephone system, in response to every incoming call each base station accesses mobile stations by general calling and, after awaiting a response from a particular mobile station, terminates the call at that mobile station. This results in the need for complicated control over the termination of an incoming call and therefore in a relatively long connection setup time. With the prior art system, it is impossible to locate individual mobile bodies unless the mobile bodies are called up individually. It follows that a transport company or similar user owning a large number of vehicles cannot efficiently supervise the operations of the vehicles.

When a plurality of base stations each being communicatable with a mobile station over a radio link are distributed at spaced locations with a no-wave area intervening between nearby base stations, the base stations will be allowed to share the same frequency as the electromagnetic waves on the radio links. In a mobile communication system having such a configuration, the base station accessible to a mobile station sequentially changes as the mobile station travels and, hence, a communication with a desired mobile station cannot be adequately set up unless the system recognizes the varying position of the mobile station at all times. Moreover, even if the system accurately locates a mobile station at a certain moment, it is not warrantable that it actually stays in that position when a call meant therefore is originated. Especially, when it comes to a system applicable to ordinary roads as distinguished from thruways, a mobile body moves two-dimensionally so that estimating the future movement of a mobile body accurately so as to accomplish efficient call termination control is difficult. Moreover, it is undesirable that the traffic concentrates more on the communication which is adapted to locate mobile stations than on the primary communication traffic of the entire system.

In a mobile telecommunications system, mobile stations constantly move around without remaining in fixed positions so that a plurality of wave propagation paths exist between base stations and mobile stations. The wave propagation paths interfere with each other to cause sharp and noticeable changes in the amount of wave attenuation ascribable to the movement. Hence, in a blind area, a sufficient electromagnetic wave cannot be fed to a mobile station and it sometimes occurs that the path between a land station and a mobile station cannot be set up despite that the land station is kept in connection to a switched telephone network. In this condition, an originating subscriber has to wait until the path to the mobile station has been set up and, in the meantime, the path between the calling terminal and the land station is held only ineffectively. When a predetermined period of time expires before the path between the land station and the mobile station is set up, the originating subscriber is informed of the unable-to-connect condition by, for example, a switched telephone network by voice. Then, the caller has to repetitively call the mobile station until the connection succeeds.

SUMMARY OF THE INVENTION

It is therefore an object of the present invention to provide a new and useful mobile telecommunications system which implements high-speed telecommunications without occupying a number of frequencies.

It is another object of the present invention to provide a mobile telecommunications system which reduces the processing loads imposed on land stations and mobile stations while promoting effective use of a telecommunications network.

It is still another object of the present to provide a mobile telecommunications system which adequately supervises the conditions of mobile stations inclusive of communications with mobile stations.

It is yet another object of the present invention to provide, in a new mobile telecommunications system capable of effecting high-speed telecommunications without occupying a number of frequencies, a call termination control system which enhances efficient control over the termination of a call at a desired mobile station.

It is a further object of the present invention to provide, in a new telemobile telecommunications system capable of effecting high-speed telecommunications without occupying a number of frequencies, a mobile station locating system which enables an originating subscriber to hold an adequate communication with a desired mobile station.

In one aspect of the present invention, there is provided a mobile telecommunications system comprising a plurality of base stations each being communicable with a mobile station over a radio link, and a communication network interconnected to the plurality of base stations for switching communications to the base stations. Geographically adjoining ones of the base stations are spaced apart from each other by an area in which the mobile station is substantially not responsive to an electromagnetic wave on the radio link. The plurality of base stations are therefore allowed to share a single frequency as the electromagnetic wave.

In another aspect of the present invention, there is provided a mobile telecommunications system comprising a mobile station, and a communication network comprising a pluality of land stations each being communicable with the mobile station. The mobile station is registered in any one of the plurality of land stations. Any of the land stations detected the mobile station reports the position of the mobile station to one of the land stations where the mobile station is registered. The land station where the mobile station is registered constantly updates a stored content in response to the position of the mobile station being detected and reported.

In a further aspect of the present invention, there is provided a mobile telecommunications system comprising a plurality of base stations each being communicable with a mobile station over a radio link. The base stations are spaced apart from each other by an area in which the mobile station is substantially not responsive to an electromagnetic wave on the radio link and are therefore allowed to share a single frequency as the electromagnetic wave. A communication network is interconnected to the base stations and is constituted by a plurality of switching stations for switching communications to the base stations. The mobile station is registered in any one of the switching stations. Any one of the plurality of switching stations detected the mobile station reports the position of the mobile station to the switching station where the mobile station is registered. The switching station where the mobile station is registered stores data of the reported position of the mobile station. The switching station where the mobile station is registered constantly updates the stored position data in response to the position of the mobile station being detected and reported.

BRIEF DESCRIPTION OF THE DRAWINGS

The objects and features of the present invention will become more apparent from the consideration of the following detailed description taken in conjunction with the accompanying drawings in which:

FIG. 13 is a diagram schematically showing an embodiment for detecting a roadside station located at the outgoing end of a coverage area;

FIG. 31 is a diagram showing a specific sequence for processing a call originated by a mobile station in the embodiment of FIG. 29.

DESCRIPTION OF THE PREFERRED EMBODIMENTS

Figure 1:
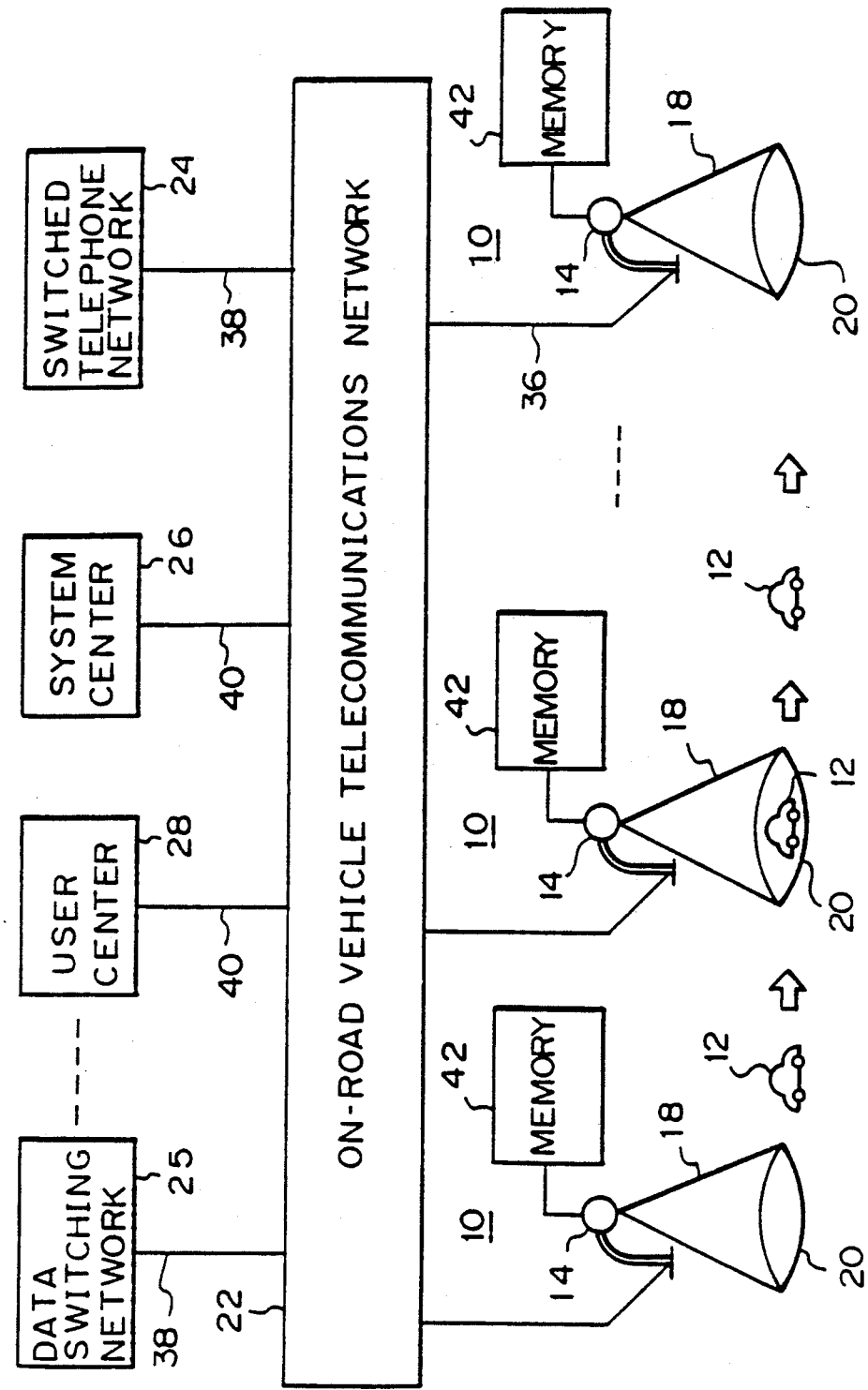
FIG. 1 is a schematic block diagram showing a mobile telecommunications system using distributed miniature zones embodying the present invention and implemented as an on-road vehicle telecommunications system for road traffic.

Referring to FIG. 1 of the drawings, a mobile telecommunications system embodying the present invention is shown and implemented as an on-road vehicle telecommunications system applicable to land traffic, especially road traffic which involves automobiles and other similar vehicles. As shown, a plurality of roadside stations 10 are located along a road such as an ordinary road or a thruway at the intervals of several hundred meters or several kilometers, for example. The distance between nearby roadside stations 10 may be suitably selected in matching relation to the regulation speed of the road, for example. Each roadside station 10 is a land station which serves as a base station capable of communicating with a subscriber vehicle 12 over a radio channel.

Each roadside station 10 covers a limited service area or zone 20 and has a transmitter/receiver 14 for transmitting and receiving an electromagnetic wave 18 from an on-board unit, or mobile station, 16 (FIG. 2) which is mounted on a subscriber vehicle 12 that is present in the zone 20. A characteristic feature of the illustrative embodiment is that the roadside stations 10 are distributed at intervals and each zone 20 is far smaller than the interval between nearby roadside stations 10. The diameter of each zone 20 may be of the order of several ten meters to a hundred meters, for example. Therefore, the nearby zones 20 leave therebetween an area in which the mobile station 16 is substantially not responsive to any of the electromagnetic waves 18 issuing from the roadside stations 10, i.e. a no-wave area. A vehicle 12 can communicate with any of the roadside stations 10 only when it is operated within the zone 20 defined by the roadside station 10. This communication occurs at a high speed.

Having the above configuration, the illustrative embodiment allows the nearby roadside stations 10 to use the same frequency repetitively and effectively. Basically, therefore, the radio links between the roadside stations 10 and the mobile stations 16 included in the entire system can be implemented by a single frequency. A system with which full-duplex communication is available uses a pair of frequencies, one for an up-going channel and the other for a down-going channel. This eliminates the need for the switchover of frequency which is indispensable with the prior art cellular system. Having these characteristic features, the system will be referred to as a distributed miniature zone system while each zone 20 will be referred to as a miniature zone.

The roadside stations 10 form a part of an on-road vehicle telecommunications network 22 and, in this particular embodiment, they are capable of accessing a switched telephone network 24, a packet switching network or similar data switching network 25, or other similar telecommunications facilities such as a system center 26 and a user center 28 via the on-road vehicle telecommunications network 22. Adopting a hierarchical configuration as shown in FIG. 2 by way of example, the on-road vehicle telecommunications network 22 performs switching between the telephone network 24, data switching network 25 and centers 26 and 28 and the individual mobile stations 16, as described in detail later.

The distributed miniature zone telecommunications system described above promotes high-speed communication between the mobile stations 16 and the roadside stations 10 and, therefore, implements a variety of services including high-speed data communications. Typical examples are a navigation service for guiding an automobile or similar vehicle 12 along an adequate route which may depend on the degree of traffic congestion and weather, and a data communication service for allowing the mobile stations 16 to communicate with the center 26 or 28 via the telecommunications network 22 so that the operations of a great number of vehicles 12 may be managed efficiently.

Figure 2:
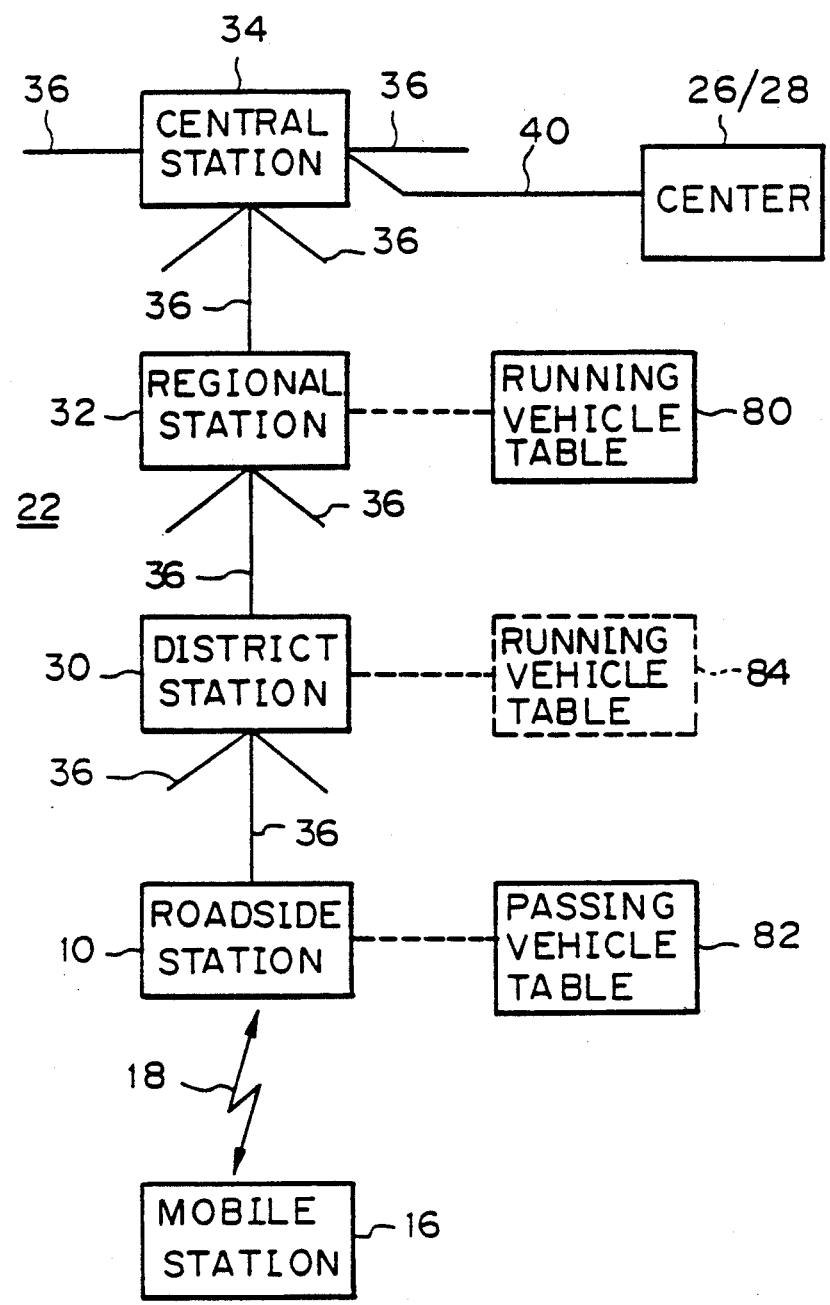
FIG. 2 is a schematic block diagram representative of a specific hierarchical configuration of an on-road vehicle telecommunications network which is included in the system of FIG. 1.

Referring the FIG. 2, the hierarchy of the on-road vehicle telecommunications network 22 is constituted by district stations or offices 30 each accommodating a plurality of roadside stations 10 which are distributed in a certain district, regional stations or offices 32 each accommodating a plurality of district stations 30 over a certain area, and central stations 34 each accommodating a plurality of regional stations 32. The associated stations 30, 32 and 34 inclusive of the roadside stations 10 will be collectively called a land station hereinafter. In the illustrative embodiment, the channels between the associated district station 30, regional station 32 and central station 34 are configured in a tree-like network which is constituted by basic trunks, tranversal trunks or similar trunks 36. On the other hand, the central stations 34 are interconnected by a mesh type network. The present invention, of course, is not limited to such a network configuration and may be practiced with any other kind of hierarchy which matches with the nature of a road, e.g., an ordinary road or a thruway or a linear network.

The trunks 38 terminating at the switched telephone network 24 and data switching network 25 are accommodated in the central stations 34, for example. The system center 26 plays the role of a data processing system assigned to the navigation of the subscriber vehicles 12, for example. The user center 28 serves as a data processing system available for a particular customer to supervise the operations of, among the subscriber vehicles 12, those which belong to the customer. The system center 26 and user center 28 are connected to the central stations 34 by trunks 40. These centers 26 and 28 may of course be connected to the regional centers 32 or the district centers 30.

The central station 34, regional station 32 and district station 30 have their own station codes. By representing the individual codes assigned to the central station 34 and regional station 32 by hierarchy, a registry land station code 52 (FIG. 3) is formed. For user owning a great number of subscriber vehicles, the district station code may be replaced with a user code which is particular to the user. The mobile station 16 mounted on each subscriber vehicle 12 is registered in any of the district station 32 and provided with a unique mobile station code 54 there. Hence, in the nationwide scale, each on-board unit or mobile station 16 is designated by a land station code 52 and a mobile station code 54. It is to be noted that the subscriber vehicles may be registered in the central stations or district stations.

Figure 3:
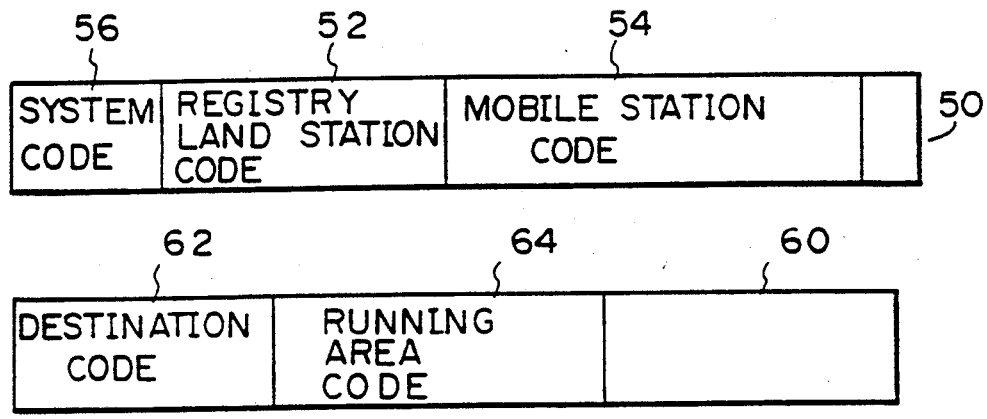
FIG. 3 shows a specific format of a vehicle-oriented code applicable to the system of FIG. 1.

As shown in FIG. 3, in the illustrative embodiment, a vehicle-oriented code for specifying a mobile station 16 is made up of a static code 50 and a dynamic code 60. The static code 50 specifies the mobile station 16 registered in the regional station 32 and consists of the land station code 52, the mobile station code 54 and a system code 56 adapted to distinguish the entire system from other systems. Specifically, the system code 56 identifies this system in distinction from the other systems and is omissible within this system. Hence, apart from the function of providing a mobile station 16 with an identification number within the system, the static code 50 is closely related to the number system of calls which the mobile station 16 may receive from the telephone network 24, data switching network 25 and centers 26 and 28.

The dynamic code 60 is associated with the moving state of the subscriber vehicle 12 and effectively used to grasp the current condition of the vehicle 12 for a navigating purpose. In this sense, the dynamic code 60 is a code unique to a subscriber vehicle 12 and associated with the district or region in which the vehicle 12 is operated as well as its travelling condition. The dynamic code 60, therefore, plays an important role in allowing any of the telephone network 24, data switching network 25 and centers 26 and 28 to locate a vehicle 12 for a paging purpose and supplying a vehicle 12 with guide information for routing it to a destination. In the illustrative embodiment, the dynamic code 60 includes a destination code 62 representative of a destination of the subscriber vehicle 12 and an running area code 64 representative of an area in which the vehicle 12 is running. The running area code 64 is constituted by the codes which are individually assigned to the central station 34, regional station 32, and district station 30. The area code 64 may further include a link code which shows a communication link being set up.

As shown in FIG. 2, in the illustrative embodiment, the regional station 32 has a running vehicle table 80. The table 80 stores data representative of particular areas in which the subscriber vehicles 12 registered in the associated regional station 32 are running, on a station basis. The table 80 also stores data associated with other subscriber vehicles 12 which are running in the coverage area of the regional station 32, on a registry station basis. These data stored in the table 80 are updated every moment. A similar vehicle table may also be installed in each district station 30 or central station 34, as exemplarily indicated by a phantom line 84 in relation to the district station 30.

As FIG. 1 schematically indicates, each roadside station 10 has a memory 42 which includes areas for storing a passing vehicle table 82 (FIG. 2) and information to be interchanged between the roadside station 10 and the mobile stations 16. The passing vehicle table 82 holds data associated with the subscriber vehicles 12 which travel through the miniature zone 20 which the roadside station 10 covers. These data include the vehicle specific codes 50 and 60 and are constantly updated as the subscriber vehicles 12 pass through the miniature zone 20.

In the illustrative embodiment, the mobile station 16 is mounted on an automobile or similar subscriber vehicle 12 and transmits/receives navigation information, operation supervisory information and other similar data, messages and video signals with the roadside stations 10 while allowing an occupant to see such signals visually and/or auditorily. Preferably, the mobile station 16 is provided with a video display, facsimile transceiver, vocoder and other similar equipment for interfacing the roadside stations 10 to a vehicle occupant by means of pictures and speeches. Further, the mobile station 16 may be provided with an automatic operation control function which governs the steering mechanism of the subscriber vehicle 12. The mobile station 16 has a random number table function so that the road station 10 may select an idle channel out of a plurality of channels assigned to the link 18 between the stations 10 and 16 by polling.

Figure 4:
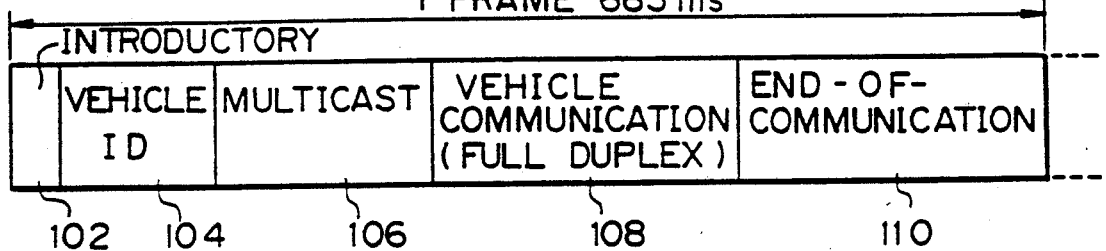
FIG. 4 indicates a specific frame format also applicable to the system of FIG. 1.
Figure 5:
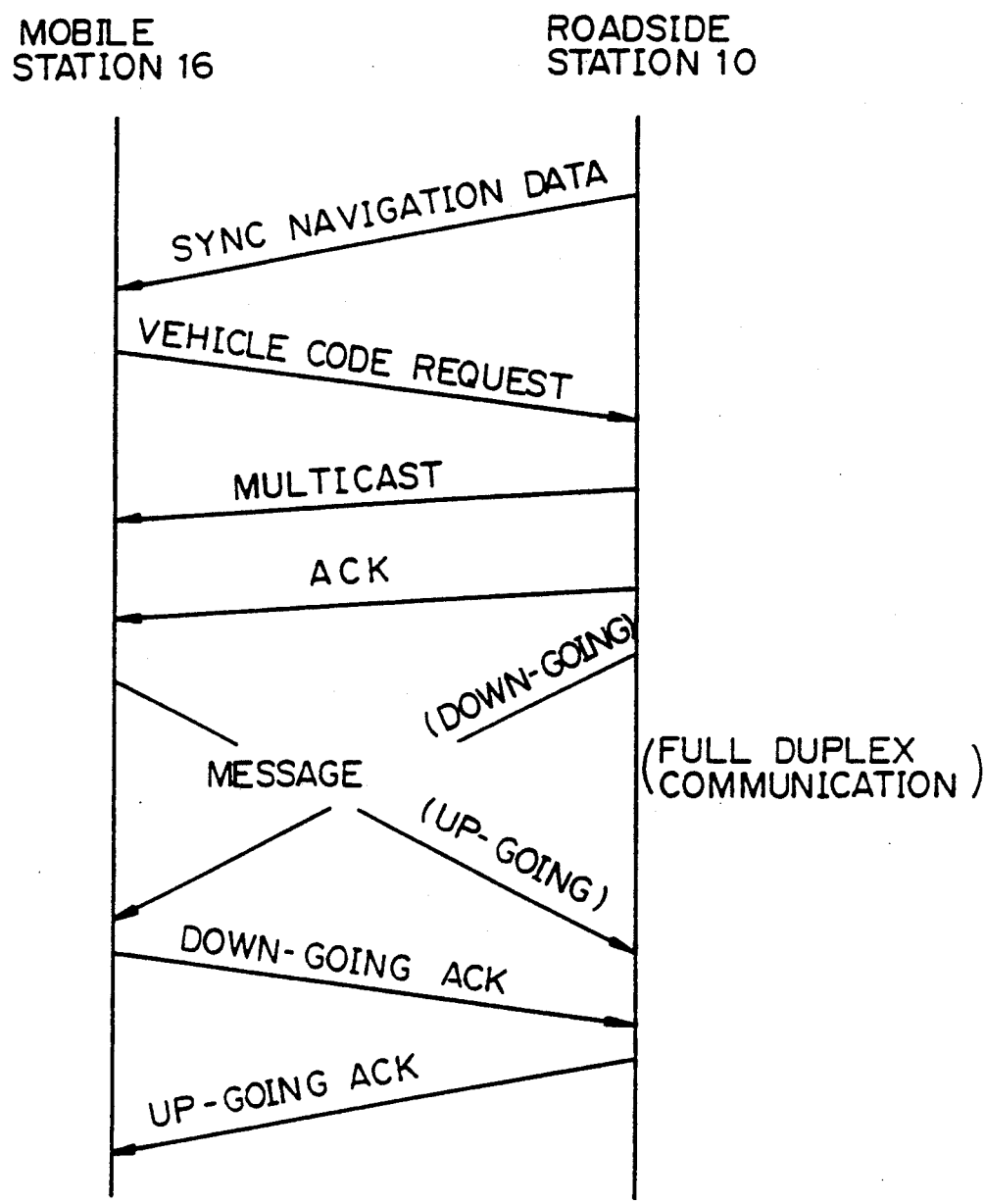
FIG. 5 is a diagram demonstrating a specific communication sequence between a mobile station and a roadside station included in the embodiment of FIG. 1.

In this embodiment, a communication between the on-board mobile station 16 and the base station 10 is effected by polling which uses a frame 100 having a format which is shown in FIG. 4. In the illustrative embodiment, the frame 100 has a period of 683 milliseconds (ms) and a signalling rate of 512 kilobits per second, a plurality of channels being multiplexed in a great number of time slots of the frame 100. In principle, a necessary bidirectional communication is completed within one frame period. The radio links 18 are implemented by a single frequency. In the case of full-duplex communication, each of an up-going and a down-going channel is implemented by a different frequency. Nevertheless, since such frequencies are fixed, a subscriber vehicle 12 will be served by the same frequencies throughout the distributed zones 20 of the roadside stations 10. As shown in FIG. 4, the frame 100 is headed by an introductory field 102 which includes a preamble, a synchronizing signal, a polling identification (ID) signal, and a code assigned to a roadside station 10. As shown in FIG. 5, the roadside station 10 polls the mobile station 16 being operated in its own zone 20 at a predetermined period by using the introductory field 102 of the frame 100. The mobile station 16 is held in a receive mode while in an idle state and is brought into a transmit mode when the introductory field 102 is fully received.

The introductory field 102 is followed by a subscriber ID field 104 which allows the mobile station 16 to send its own vehicle codes 50 and 60 while allowing the roadside station 10 to recognize it. Advantageously, two blocks may be sent repetitively so as to achieve a far higher subscriber recognition rate. In response to the polling, the mobile station 16 selects an idle channel out of a plurality of channels by using the random number table. The static subscriber code 50 and a service function code are transmitted to the roadside station 10 over the idle channel (see FIG. 5).

In the illustrative embodiment, the subscriber ID field 104 is followed by a multicast communication field 106. By using the field 106 of the frame 100, the roadside station 10 sends to the mobile station 16 traffic information and other beacon type dynamic navigation information as well as registration response signal (ACK or NACK) (FIG. 5). If the channel selected by the mobile station 16 does not conflict with another channel, the roadside station 10 registers it and sends an ACK signal to the mobile station 16.

A vehicle communication field 108 is provided next to the multicast field 106 of the frame 100. In the illustrative embodiment, as shown in FIG. 5, a full-duplex communication is held between the roadside station 10 and the mobile station 16 by using the vehicle communication field 108. For the full-duplex communication, an up-going and a down-going channel each having a different frequency and selected by the roadside station 10 are used. However, the subscriber vehicle 12 is served by the same frequencies in the zones 20 which are defined by the nearby roadside stations 10. The full-duplex communication, of course, may be replaced with half-duplex or one-way communication. During the vehicle communication field 106, the mobile station 16 and the system center 26 and/or user center 28 interchange navigation information, operation supervisory information or similar data, message, and video signal. Such information is imparted to the vehicle occupant in the form of a picture or a speech. The mobile station 16 may communicate with any of the switched telephone network 24, data switching network 25, and another mobile station 16 which is served by this system, in the same manner as with the center 26 or 28.

The roadside station 10 may store in the passing vehicle table 82 the data associated with the subscriber vehicles 12 and obtained from the mobile stations 16 present in the zone 20 at each polling period. These data are sent from the roadside station 10 to the district station 30, regional station 32, or central station 34. The station 30, 32 or 34 then stores the incoming data in the running vehicle table 80, for example. Hence, the running vehicle table 80 of the regional station 32, for example, is constantly updated by new data.

Information sent from the center 26 or 28, switched telephone network 24 or data switching network 25 and meant for a certain mobile station 16 is temporarily stored in any of the stations, e.g. the memory 42 of the roadside station 10. The roadside station 10 compares a destination code associated with the information with the static vehicle codes 50 obtained from the mobile stations 16 which are present in the associated coverage area. If the destination code is coincident with any of the static vehicle codes 50, the roadside station 10 transmits the information stored in the memory 42 to the mobile station 16 for which the information is meant by using the down-going channel of the vehicle communication field 108 of the frame 100. Information sent from a certain mobile station 16 to the roadside station 10 is temporarily stored in the memory 42. The up-going information is transferred to the center 26 or 28, data switching network 25 or switched telephone network 24 over the on-road vehicle telecommunications network 22 later.

The vehicle communication field 108 of the frame 100 is followed by an end-of-communication field 110 for transmitting an up-going and a down-going answer signal (FIG. 5). This signal is adapted to confirm the end of communication and not to confirm the content of information.

By the above procedure, one frame 100 of communication is completed while the subscriber vehicle 12 runs through the service zone 20 which is managed by the roadside station 10. While the subscriber vehicle 12 runs in the no-wave area defined between two nearby zones 20, the mobile station 16 cannot communicate with the on-road vehicle communications network 22. Due to the use of a single frequency, the system may bring up the image of a conventional leakage coaxial cable broadcasting system. However, the illustrative embodiment is implemented as a one-to-one communication system and not a broadcasting system and is clearly distinguishable over a leakage coaxial cable broadcasting system due to the presence of no-wave areas.

In principle, this particular embodiment is constructed such that one communication completes while the subscriber vehicle 12 exists in a certain miniature zone 20. The roadside stations 10 are distributed along a road, whether it be an ordinary road or a thruway, at intervals which allow the subscriber vehicle 12 to complete a substantial amount of communications while running through some miniature zones 20 which have the no-wave areas therebetween. Stated another way, such a distant arrangement of roadside stations 10 makes it possible even for mobile stations 16 whose communication traffic is heavy to achieve desired communications satisfactorily.

Figure 7:
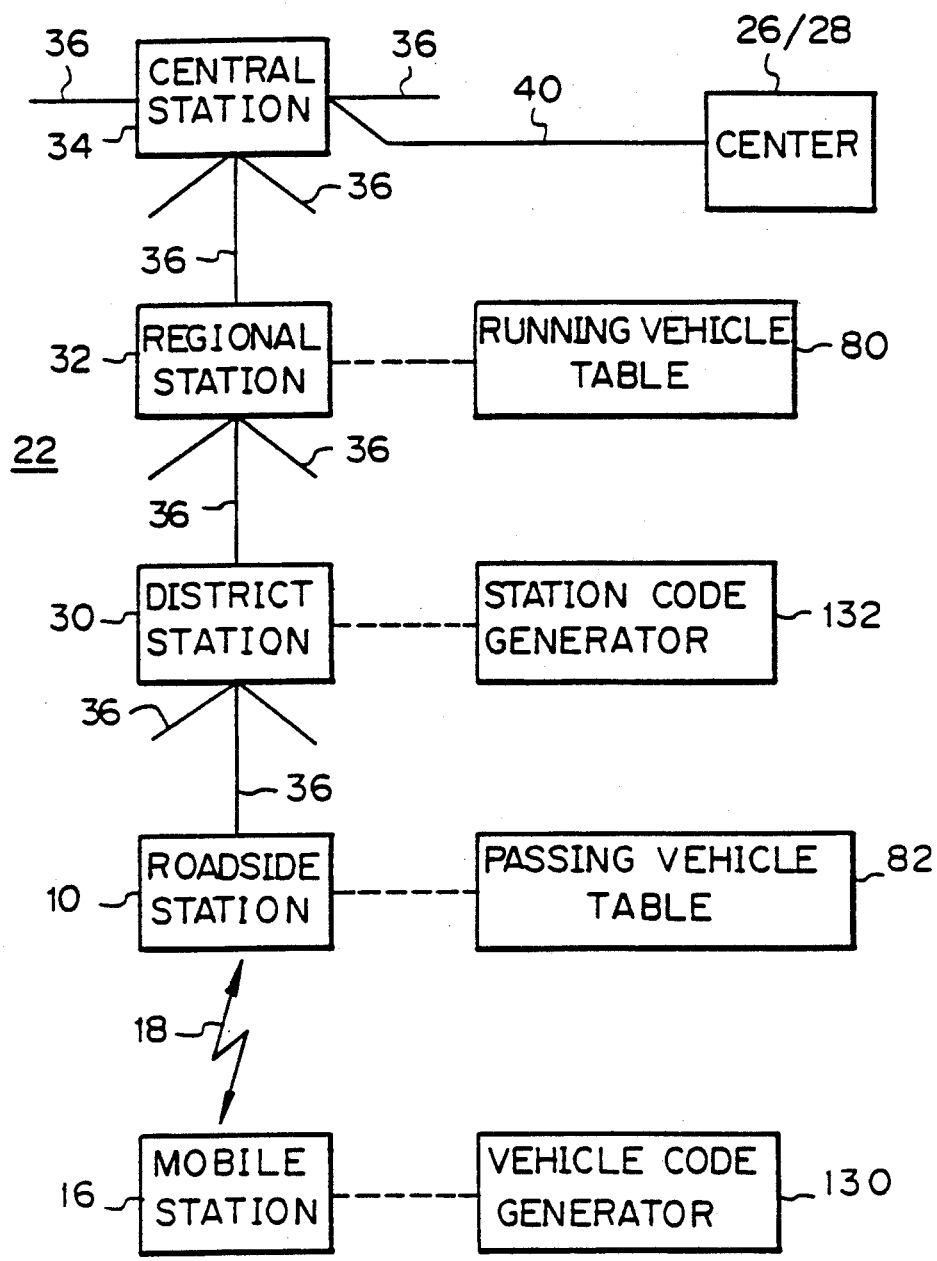
FIG. 7 is a schematic diagram representative of an alternative hierarchical configuration of the on-road vehicle telecommunications network.

Referring to FIG. 7, an alternative embodiment of the present invention is shown in which the mobile stations 16 are individually registered in particular land stations beforehand, more specifically the on-road vehicle telecommunications network 22 of such an alternative embodiment. In this network 22, each mobile station 16 has a vehicle code generating unit 130 while each district station 30 has a station code generating unit 132. In the figure, similar components or structural elements are designated by the same reference numerals, and redundant description will be avoided for simplicity.

The vehicle code generating section 130 of the mobile station 16 generates a vehicle code which is assigned to the mobile station 16. The vehicle code includes a land station code 52 (FIG. 3) representative of a particular station in which the mobile station 16 is registered, and a mobile station code 54 assigned to the mobile station 16. These codes are set in the vehicle code generating section 130 and, in response to polling from any of the roadside stations 10, read thereout of to be transmitted.

Figure 6:
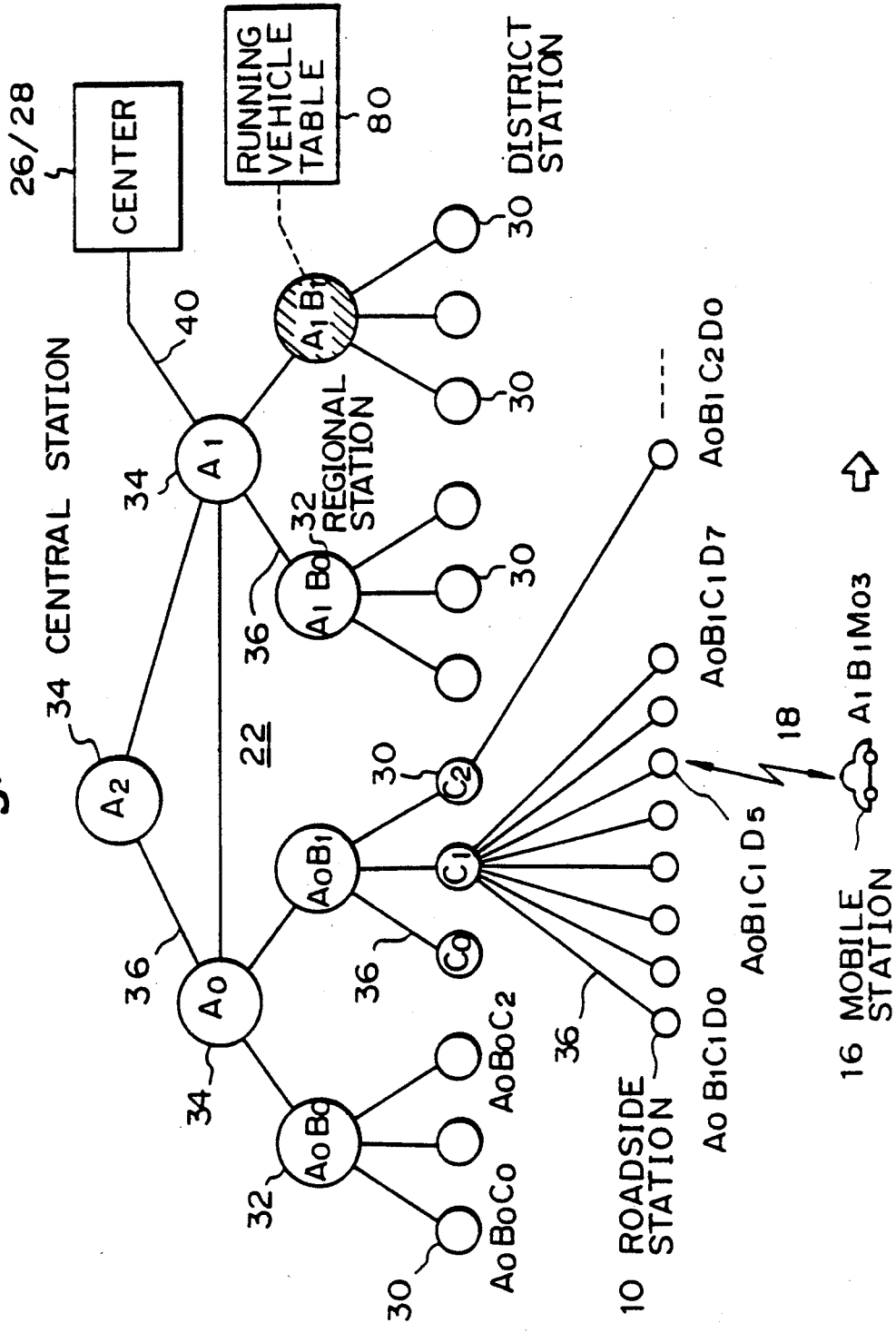
FIG. 6 is a view schematically showing a mobile telecommunications system using distributed miniature zones in accordance with the present invention.

As shown in FIG. 6, assume that a certain mobile station 16 is registered in one, $B_1$, of regional stations which are subordinate to a central station $A_1$. Further, assume that the land station code 52 assigned to the regional station 32 is "$A_1B_1$", and the mobile station code 54 assigned to the mobile station 16 within the regional station 32 is "$M_{03}$". Then, the mobile station 16 is designated by a static vehicle code "$A_1B_1M_{03}$".

Given one, $C_1$, of the district stations belonging to the regional station $A_0B_1$ accommodates eight roadside stations 10 which are designated by station codes $D_0$ to $D_7$, respectively, the sixth roadside station 10 as counted from the left in FIG. 6 is designated by a station code "$A_0B_1C_1D_5$". When the mobile station 16 whose static vehicle code 50 is "$A_1B_1M_{03}$" is polled by the roadside station $A_0B_1C_1D_5$ while running through the zone 20 of that roadside station, the mobile station 16 returns an ID code "$A_1B_1M_{03}$" to the roadside station $A_0B_1C_1D_5$ as the roadside station code 52 and mobile station code 54.

As the mobile station 16 running in a direction indicated by an arrow in the figure enters the zone 20 as defined by the next roadside station $A_0B_1C_1D_6$, it is again polled by the roadside station $A_0B_1C_1D_6$ and, in response, returns its vehicle code "$A_1B_1M_{03}$". In this manner, as the mobile station $A_1B_1M_{03}$ moves in a particular direction, the successive roadside stations 10 on the route sequentially receives the vehicle code "$A_1B_1M_{03}$" from the mobile station $A_1B_1M_{03}$.

Figure 8:
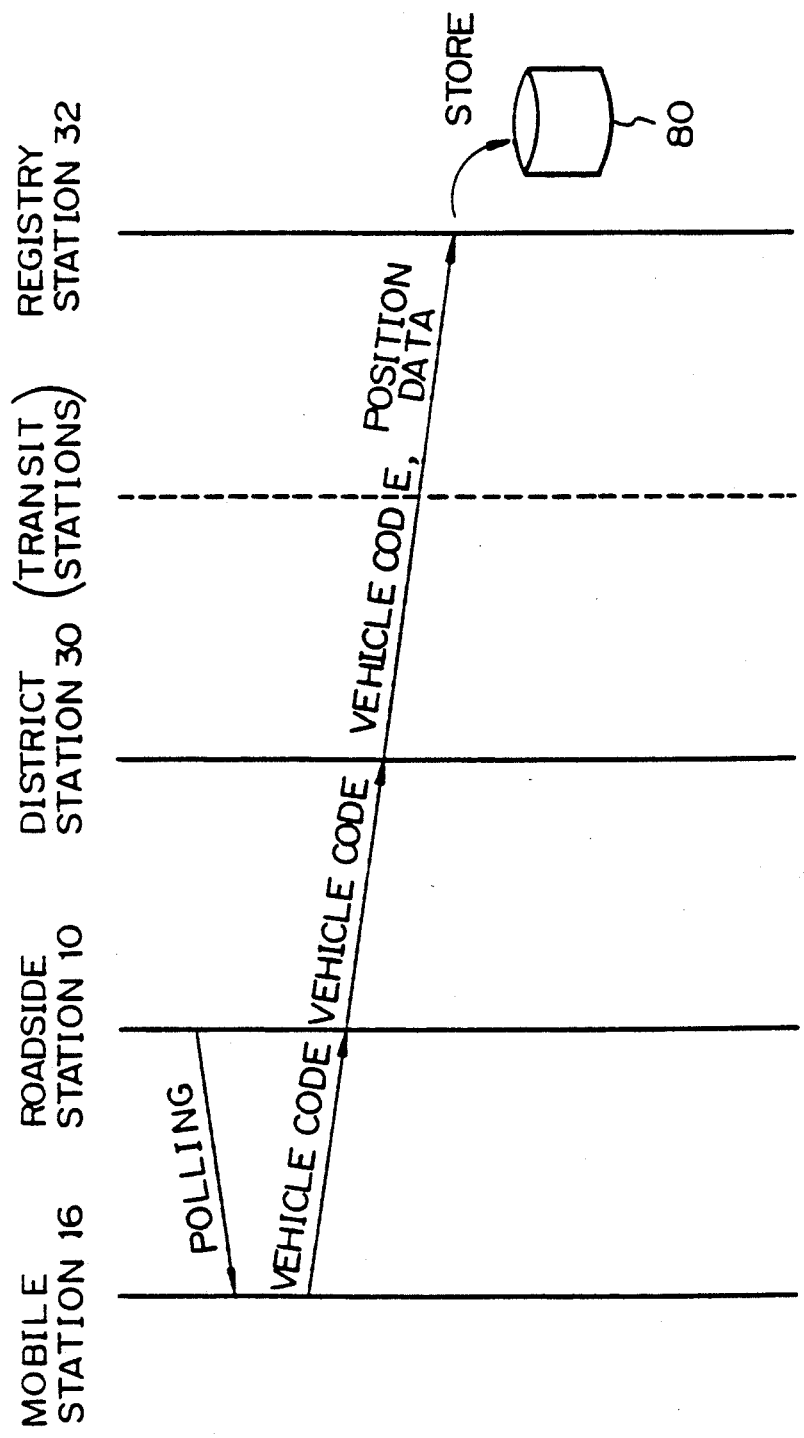
FIG. 8 is a diagram demonstrating a specific sequence for locating a mobile station.

More specifically, as shown in FIG. 7, the district station 30 of this embodiment has a station code generating unit 132 for generating a land station code 52 which designates the district station 30 and a roadside station code which designates a roadside station subordinate to the station 30. For example, the district station $A_0B_1C_1$ shown in FIG. 6 has a land station code "$A_0B_1C_1$" set in it station code generating unit 132. The vehicle code "$A_1B_1M_{03}$" of the mobile station 16 received by the roadside station $A_0B_1C_1D_5$ is once stored in the passing vehicle table 82 (FIG. 7) while being transferred to the district staion, or upper layer station, $A_0B_1C_1$. As shown in FIG. 8, as the district station $A_0B_1C_1$ determines that the mobile station 16 with the vehicle code "$A_1B_1M_{03}$" is registered in the regional station $A_1B_1$ which in turn is subordinate to the central station $A_1$ as indicated by the vehicle code "$A_1B_1M_{03}$", it transfers the vehicle code "$A_1B_1M_{03}$" to the regional station $A_1B_1$. The district station $A_0B_1C_1$ also sends to the regional station $A_1B_1$ information representative of its own position and a position of the roadside station 10 which has detected the mobile station 10, i.e. information indicative of the current position of the mobile station 16. This position information includes the land station code "$A_0B_1C_1$" and roadside station code "$D_5$" as the running area code 64 of the dynamic vehicle code 60.

Switching stations lying above the district station $A_0B_1C_1$ such as the regional station $A_0B_1$ and central stations $A_0$ and $A_1$ determine the destination of the mobile station position data on the basis of the vehicle code "$A_1B_1M_{03}$" and then repeats it to the station in which the mobile station 16 is registered (hereinafter referred to as a registry station for convenience), i.e. the regional station $A_1B_1$ in this example. Receiving the mobile station position data in the form of the static vehicle code 50 and dynamic vehicle code 60, the registry station $A_1B_1$ identifies the mobile station 16 of interest, i.e., the mobile station $M_{03}$ as represented by the mobile station code 54 and then stores the position data in a particular location of the running vehicle table 80 which is allocated to the station $M_{03}$.

The current position data associated with the mobile station 16 is constantly updated. In this particular embodiment, every time any of the roadside stations 10 detects a mobile station such as $M_{03}$, the arrival is reported from the district station 30 to the registry station $A_1B_1$ in which the mobile station $M_{03}$ is registered. This updates the running vehicle table 80 of the registry station $A_1B_1$ as to the mobile station $M_{03}$.

In the illustrative embodiment, every time the mobile station 16 travels over two consecutive roadside stations 10, its position is reported to the registry station where it is registered. The current position data to be sent to the registry station may include a roadside station code, i.e. "$D_5$" in this example. Assuming that the mobile station $A_1B_1M_{03}$ has moved away from the miniature zone 20 of the roadside station $A_0B_1C_1D_5$ to the miniature zone 20 of next roadside station $A_0B_1C_1D_6$, then the station $A_0B_1C_1D_6$ detects it by polling, stores the mobile station code "$A_1B_1M_{03}$" in the passing vehicle table 82, and reports it to the district station $A_0B_1C_1$. In response, the district station $A_0B_1C_1$ informs the registry station $A_1B_1$ of the new position of the mobile station $A_1B_1M_{03}$ by using a running area code "$A_0B_1C_1D_6$" which includes the roadside station code "$D_6$". While this kind of system needs a relatively large amount of communication traffic for reporting the current position of the mobile station 16 and imposes relatively heavy updating and storing loads on the registry station, it is capable of measuring the varying position of the mobile station 16 with accuracy at all times.

Alternatively, an arrangement may be made such that when any of the district stations 30 has detected the particular mobile station $M_{03}$ for the first time through any of its associated roadside stations 10, the arrival is reported to the registry station $A_1B_1$ where the mobile station $M_{03}$ is registered. In this case, the running area code 64 (FIG. 3) does not have to include the roadside station code. Specifically, assume that the mobile station $A_1B_1M_{03}$ has moved away from the last roadside station $A_0B_1C_1D_7$ subordinate to the district station $A_0B_1C_1$ to the zone 20 which is defined by the first roadside station $A_0B_1C_2D_0$ of the next district station $A_0B_1C_2D_0$ of the next district station $A_0B_1C_2$. Then, the roadside station $A_0B_1C_2D_0$ reports the vehicle code 50 of the mobile station $A_1B_1M_{03}$ to the district station $A_0B_1C_2$ which then registers it in the passing vehicle table 82. At this instant, the district station $A_0B_1C_2$ checks the passing vehicle table 82 to see if the vehicle code "$A_1B_1M_{03}$" has been stored in the table 82 in the past. If it has not been stored in the table 82, the district station $A_0B_1C_2$ transfers the current position data of the mobile station $A_1B_1M_{03}$ to the registry station $A_1B_1$ via the associated regional station $A_0B_1$. Here, the station code "$A_0B_1C_2$" which ends with the district station code suffices for the current position data. This alternative system is practicable with a minimum of communication traffic for reporting the current position of the mobile station 16, while simplifying the supervisory procedure required of the registry station.

Figure 9:
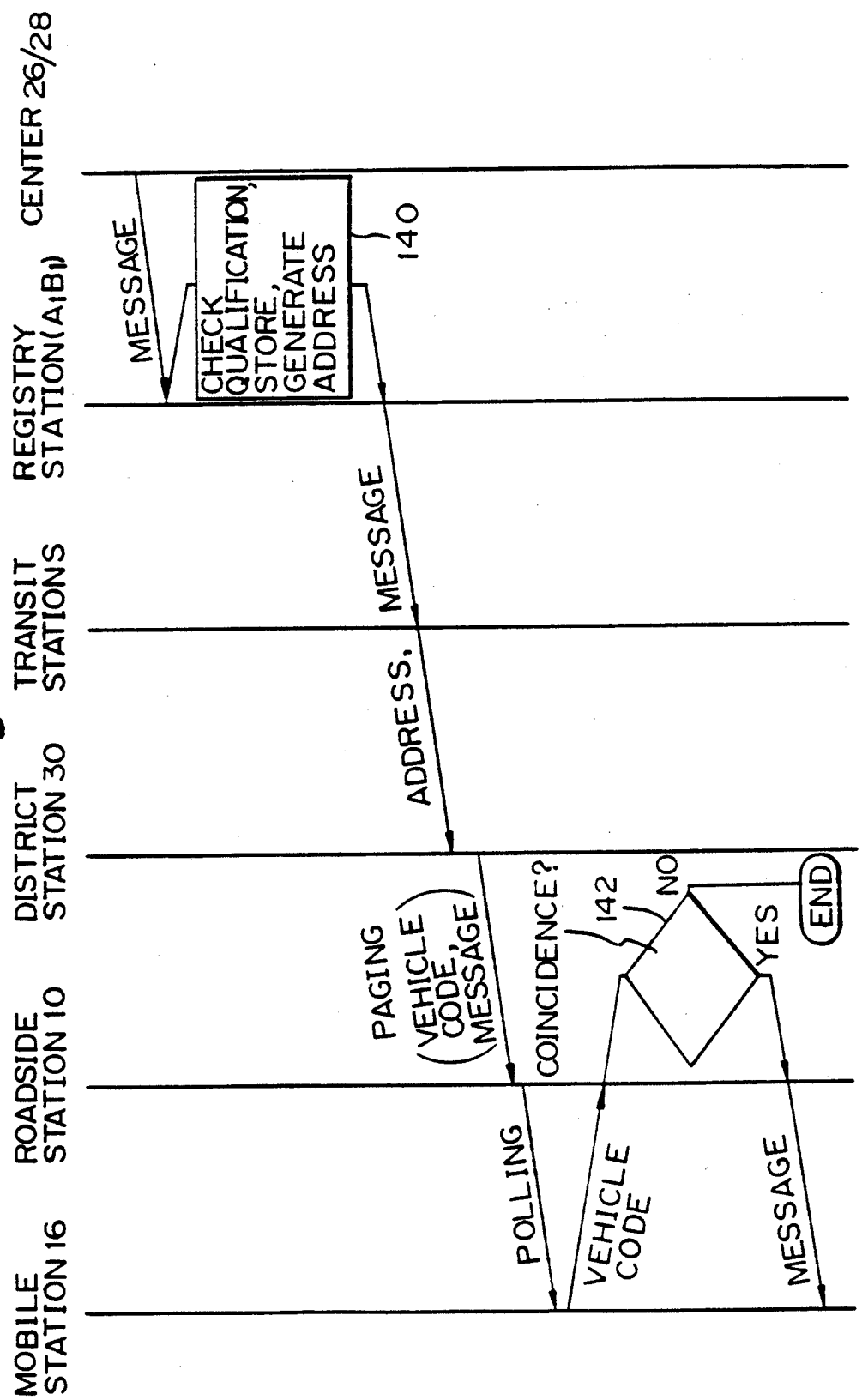
FIG. 9 is a diagram demonstrating a specific sequence for terminating a call at a mobile station.

A reference will be made to FIG. 9 for outlining a sequence available with this particular embodiment to allow a call from the center 26 or 28 to arrive at the mobile station $A_1B_1M_{03}$ by using the mobile station position data which is constantly updated by the registry station $A_1B_1$. A message destined to the mobile station $A_1B_1M_{03}$ is sent from the center 26 or 28 to the registry station $A_1B_1$ via the central station 34, together with a header in the form of a static vehicle specific code 50 which includes a destination code "$A_1B_1M_{03}$". This message transfer is effected by causing each transit or tandem station to identify the destination code "$A_1B_1M_{03}$". On reception of the message together with the header, the registry station $A_1B_1$ determines whether or not the destination or mobile station $A_1B_1M_{03}$ is qualified as to the registration on the basis of the destination code and, if it is qualified, temporarily stores the message in a memory (not shown) (140). Although not shown in the figure, the registry station $A_1B_1$ returns an answer for confirmation to the center 26 or 28.

Then, the registry station $A_1B_1$ references the running vehicle table 80 to determine the current position of the mobile station $A_1B_1M_{03}$ which is represented by the mobile station position data. When the registry station $A_1B_1$ decides that the mobile station $A_1B_1M_{03}$ is currently located at "$A_0B_1C_1D_5$", for example, it generates a dynamic vehicle specific code 60 in which the address "$A_0B_1C_1$" of the district station 30 is included as the running district code 64. The registry station $A_1B_1$ reads the message out of its memory, adds it to the header of the dynamic code 60, and transmits the dynamic code 60 with such a header to the district station $A_0B_1C_1$.

Transit stations such as the central and regional stations 34 and 32 identify the dynamic vehicle code 60 of the message and transfer it to the district station $A_0B_1C_1$. On reception of the message with the header, the district station $A_0B_1C_1$ accesses all of its subordinate roadside stations 10 at the same time by a send request, the message, and the destination code "$A_1B_1M_{03}$" to which the message is destined. In response, each roadside station 10 once stores the message in the memory 42 and polls mobile stations 16 which are present in its service zone 20. This polling is effected by using the introductory field 102 of the frame 100, as stated earlier.

In response to the polling, active mobile stations 16 present in the service zone 20 which is defined by the roadside station 10 generate the vehicle codes 50 and 60 (FIG. 3) by the individual vehicle code generating units 130 and return them to the roadside station 10. This is implemented by the vehicle ID field 104 (FIG. 4) of the frame 100. The roadside station 10 temporarily stores the vehicle codes returned from the mobile stations 16 and compares the individual static vehicle codes 50 with the destination code "$A_1B_1M_{03}$" (142). When any of the static vehicle codes coincides with the destination code at a certain roadside station 10, that roadside station 10 reads the message out of its memory 42 and sends it over the channel of the mobile station $A_1B_1M_{03}$ by using the vehicle communication field 108 of the frame 100. The mobile station $A_1B_1M_{03}$ received the message returns an answer for confirmation to the roadside station 10 by using the end-of-communication field 110 of the frame, the answer being finally transferred to the registry station 32. If the answer includes a positive response ACK, the district station $A_0B_1C_1$ cancels the send request to the other roadside stations 10.

The other roadside stations 10 where the coincidence of the two different kinds of codes has not occurred discard the message stored in their memories 42 and end this processing, under the control of the district station $A_0B_1C_1$. While the individual stations return a confirmation signal at each step of the sequence described above, such a procedure is not shown in FIG. 9 to avoid intricacy of illustration.

In summary, in this particular embodiment, the mobile stations 16 are individually registered in particular land stations. A land station detected a mobile station 16 which is registered in a particular land station reports the current position of the station 16 to the latter land station to allow it to store the current position data. The current position data is constantly updated on a real time basis. When a certain mobile station 16 is to receive a call, a registry station where the mobile station 16 is registered is accessed to see the current position of the mobile station 16. The mobile station 16, therefore, is connected to any of the roadside stations 10 which is adjacent to the current position of the mobile station 16.

Figure 11:
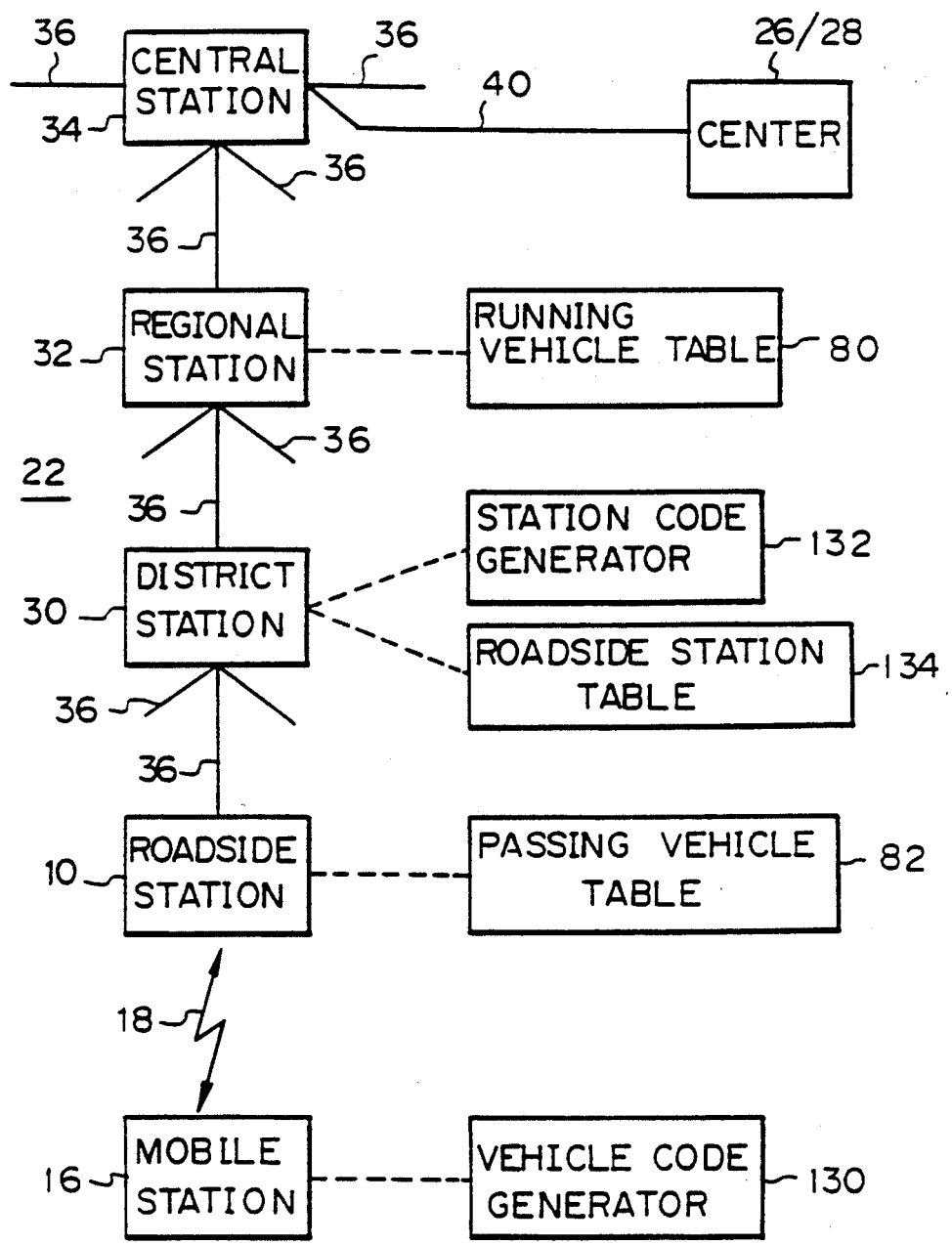
FIG. 11 is a schematic block diagram representative of another specific hierarchical configuration of the on-road vehicle telecommunications network.

To efficiently control the termination of a call at a mobile station 16, a plurality of roadside stations 10 may be constructed into a paging group on the basis of their locations, as described hereinafter. In this alternative embodiment, a paging is effected by handling the group as a unit. The group configuration may be such that all the roadside stations 10 belonging to a single district station 30 constitute a paging group. Alternatively, some of the roadside stations 10 which are subordinate to the same district station 30 and geographically adjacent to each other may be treated as a paging group. An alternative embodiment of the telecommunications network 22 for implementing the second-mentioned paging group configuration is shown in FIG. 11. In the figure, the district station 30 has a roadside station table 134 which stores which of the roadside stations 10 in the coverage area belong to which paging group. The table 134 is referenced when a paging is to be effected for the termination of a call at a mobile station 16.

Figure 10:
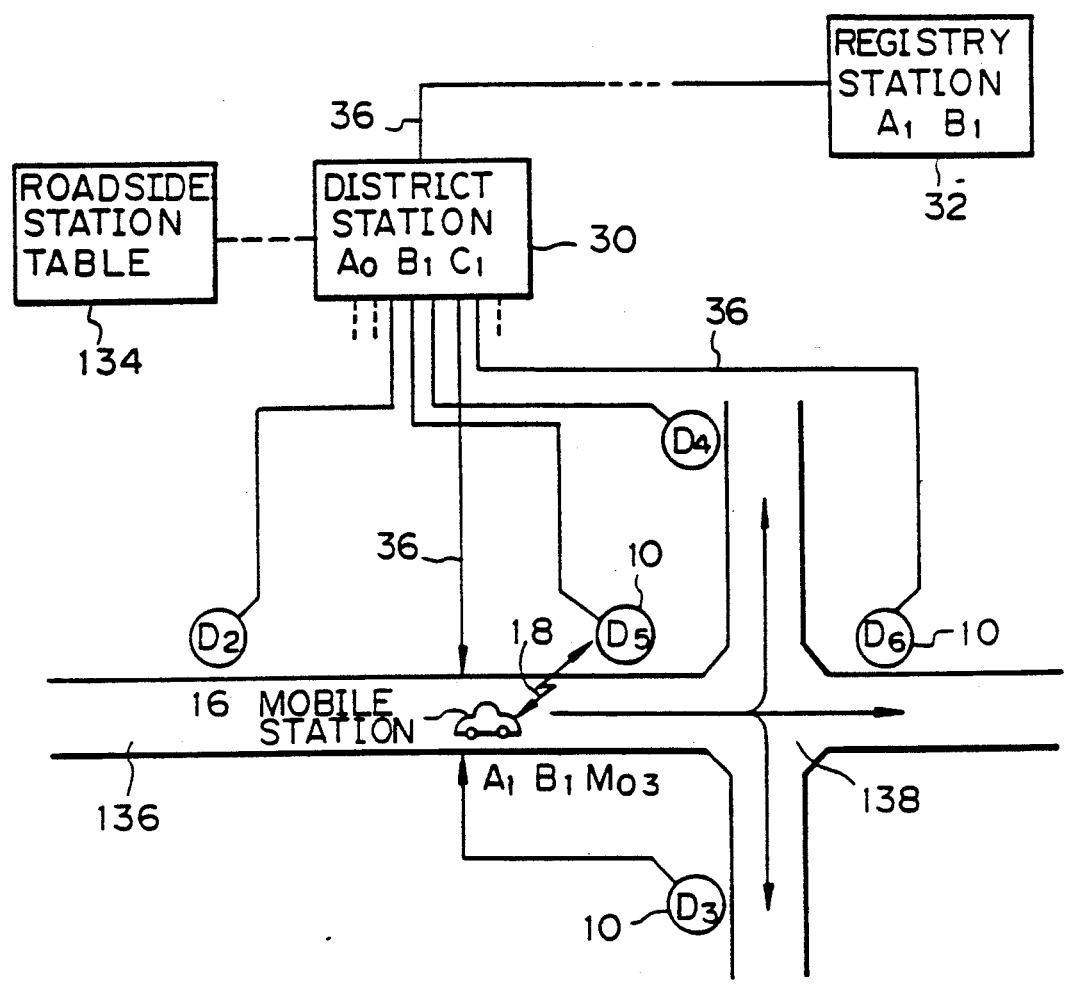
FIG. 10 is a diagram schematically showing a specific paging group configuration of roadside stations.

As shown in FIG. 10, when the mobile station $A_1B_1M_{03}$ is operated on an ordinary road 136 toward a crossroad 138 by way of example, there are three different directions which the mobile station $A_1B_1M_{03}$ may travel via the crossroad 138. For example, assume that the mobile station $A_1B_1M_{03}$ is running in the coverage area of the roadside station $A_0B_1C_1D_5$ and, therefore, the current position "$A_0B_1C_1D_5$" of the mobile station $A_1B_1M_{03}$ is stored in the running vehicle table 80 of the registry station $A_1B_1$. When the current position "$A_0B_1C_1D_5$" of the mobile station $A_1B_1M_{03}$ is determined by referencing the running vehicle table 80 and, based on this position, the mobile station $A_1B_1M_{03}$ is called via the roadside station $A_0B_1C_1D_5$, the termination of the incoming call at the station $A_1B_1M_{03}$ often fails because the probability that the station $A_1B_1M_{03}$ has already moved away from the service zone 20 of the roadside station $D_5$ is great. The route which the mobile station $A_1B_1M_{03}$ moved away from the service zone 20 may take is indefinite, as shown in the figure.

To eliminate the above problem, this particular embodiment arranges the roadside stations 10 in a paging group configuration. In the example shown in FIG. 10, the roadside stations $D_2$, $D_3$, $D_4$, $D_5$ and $D_6$ which geographically adjoin each other around the road 136 are accommodated in a single district station 30 to constitute a single paging group. This group is listed in the roadside station table 134 of the district station $A_0B_1C_1$. If desired, only the roadside stations $D_3$, $D_4$ and $D_6$ may be constructed into a group.

Again, a reference will be made to FIG. 9 for describing a sequence available with this particular embodiment to terminate a call from the center 26 or 28 at a mobile station $A_1B_1M_{03}$ on the basis of the mobile station position data which is constantly updated at the registry station $A_1B_1$. As stated previously, a message to be sent from the center 26 or 28 to the mobile station $A_1B_1M_{03}$ is transmitted to the registry station $A_1B_1$ via the central station 34, together with a header in the form of the static vehicle code 50 which includes the destination code "$A_1B_1M_{03}$". For so transferring the message, the transit stations individually identifies the destination code "$A_1B_1M_{03}$" of the message. On reception of the message with the header, the registry station $A_1B_1$ checks the destination code to see if the mobile station $A_1B_1M_{03}$ is a registered or qualified station and, if it is qualified, temporarily stores the message in a memory (not shown) (140). At this instant, the station $A_1B_1$ returns a confirmation signal to the center 26 or 28, although not shown in the figure.

Then, the registry station $A_1B_1$ references the running vehicle table 80 to determine the current position of the mobile station $A_1B_1M_{03}$ on the basis of the mobile station position data being stored in the table 80. In the illustrative embodiment, if the current position is "$A_0B_1C_1D_5$" by way of example as determined by the registry station $A_1B_1$, the registry station $A_1B_1$ produces a dynamic vehicle specific code 60 which includes the address "$A_0B_1C_1D_5$" of the roadside station 10 as the running area code 64 (FIG. 3). The registry station $A_1B_1$ reads the message out of the memory, adds the dynamic code 60 to the header of the message, and transmits the resulting message and header to the district station $A_0B_1C_1$.

Transit stations such as the central and regional stations 34 and 32 individually identify the dynamic vehicle code 60 of the message and transfer it to the district station $A_0B_1C_1$. On reception of the message and header, the district station $A_0B_1C_1$ identifies the roadside station 10 which is represented by the running area code 64 of the header and, based on the identified roadside station 10, references the roadside station table 134. In this example, since the roadside station code is representative of "$D_5$", the district station $A_0B_1C_1$ determines that the paging group made up of the roadside stations $D_3$, $D_4$ and $D_6$ is the group to be accessed. Then, the district station $A_0B_1C_1$ determines the running direction of the mobile station $A_1B_1M_{03}$ and accesses all of the roadside stations $D_3$, $D_4$ and $D_6$ at the same time. The rest of the call termination sequence is the same as the previous embodiment.

As described above, in this particular embodiment, the roadside stations 10 which are geometrically associated with other are arranged in a paging group configuration. To terminate a call at any of the mobile stations 16, the current position of the mobile station 16 is determined by accessing a registry station where the mobile station 16 is registered and, then, the roadside stations 10 belonging to a single group associated with or estimated from the determined current position access the desired mobile station 16 at the same time. This eliminates the problem ascribable to the uncertainty of the reposition of the mobile station 16 and thereby promotes efficient call termination control.

In the case that a single district station 30 covers a single paging group, the current position data supplied in the event of call termination does not have to include a roadside station code and, further, the district station 30 does not halve to have the roadside station table 134. In this case, the district station 30 will access all of the roadside stations 10 lying in its coverage area in response to an incoming call.

Figure 12:
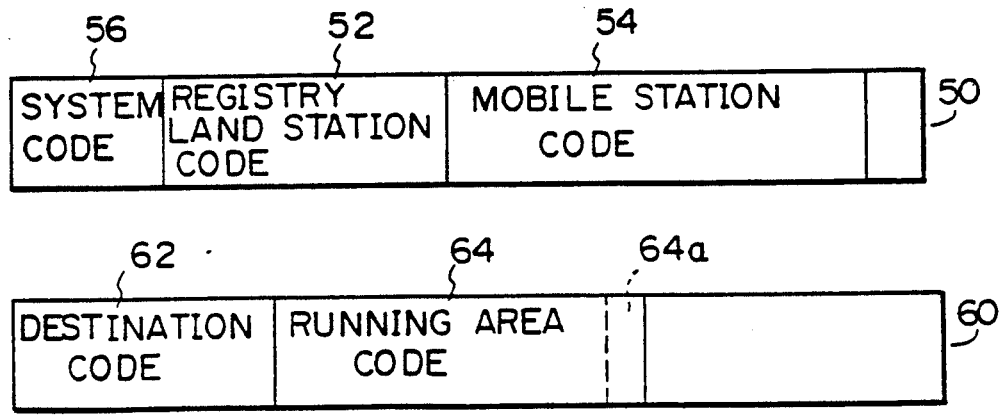
FIG. 12 indicates another specific format of the vehicle-oriented code.

Hereinafter will be described an alternative embodiment of the present invention in which information indicative of whether or not a mobile station 16 is running past a roadside station 10 located at the end of the coverage area of a district station 30 is supplied, so that the movement of the mobile station 16 may be estimated with accuracy to implement efficient call termination control. FIG. 12 shows a specific format of the vehicle code which is applicable to this embodiment. In the figure, the current position data associated with the mobile station 16 includes the land station code "$A_0B_1C_1$" and a boundary bit 64a in the form of the running area code 64 of the dynamic vehicle code 60.

The boundary bit 64a shows whether or not the roadside station 10 detected the mobile station 16 is located at the end of the coverage area of the district station 30. As shown in FIG. 13, assume that the roadside stations $D_0$ to $D_7$ belonging to the district station $A_0B_1C_1$ are arranged linearly along a single road 136 such as a thruway, and that the roadside station $D_7$ which adjoins another district station $A_0B_1C_2$ at the end of the coverage area of the district station $A_0B_1C_1$ has detected the mobile station 16. Then, the district station $A_0B_1C_1$ sets a significant bit such as a (logical) ONE in the boundary bit 64a. For this purpose, in this particular embodiment, the district station 30 has the roadside station table 134 (FIG. 11) that stores which of the roadside stations 10 belonging to its own coverage area adjoins another district station 30, i.e., which of such roadside stations 10 are the "end stations" in the limited coverage area. In the example shown in FIG. 13, the roadside station $A_0B_1C_1D_7$ is listed in the roadside station table 134 as "outgoing end station" with respect to the running direction of the vehicle 12. While a single outgoing end station is shown in this example, two or more outgoing end stations may exist in the case of actual roads which are developed two-dimensionally.

Figure 14:
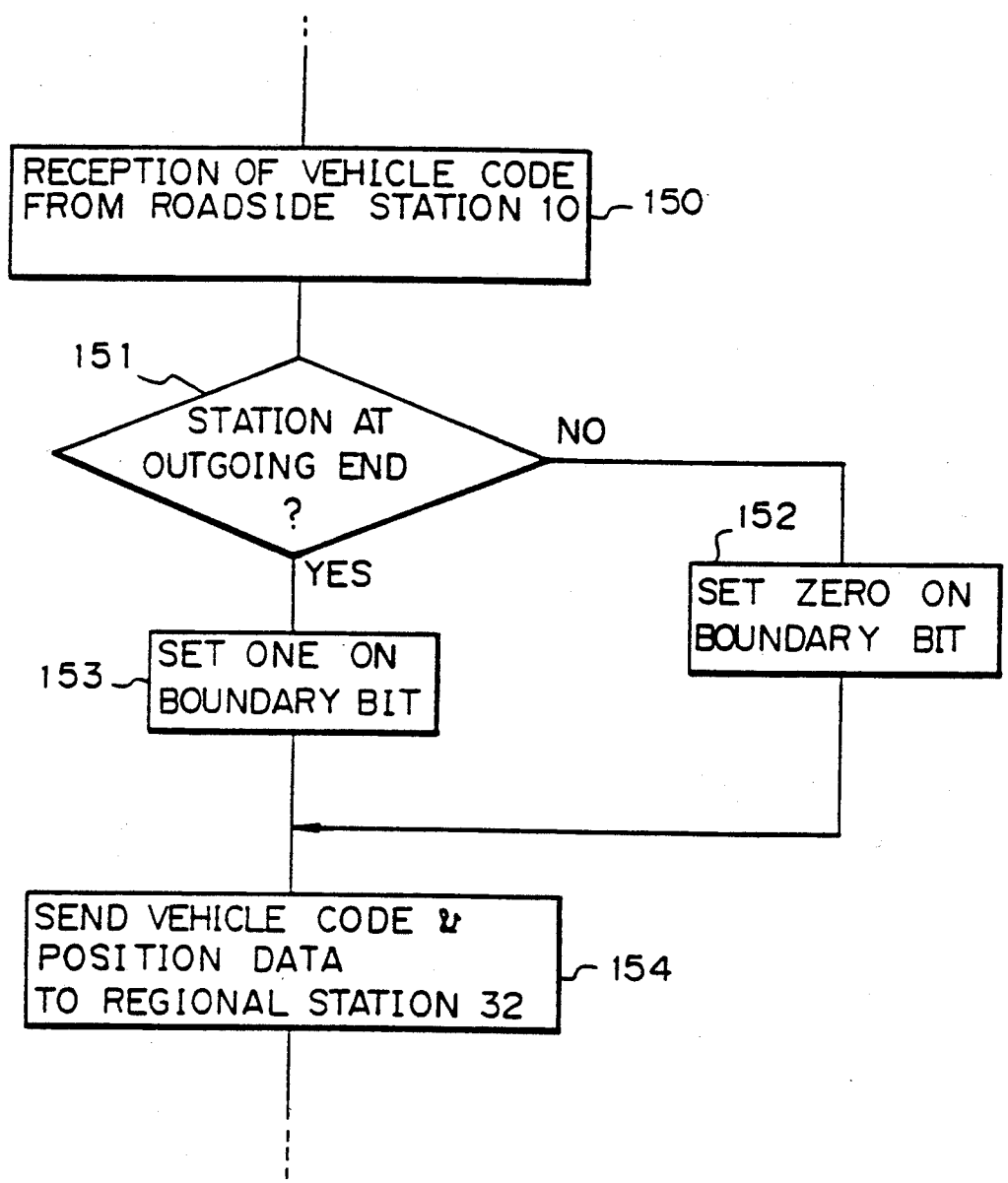
FIG. 14 is a flowchart showing a procedure for a district station to report the position of a mobile station to a registry station in the embodiment of FIG. 13.

As shown in FIG. 14, when the roadside station $A_0B_1C_1D_5$, for example, detects the mobile station $A_1B_1M_{03}$ (150), the district station $A_0B_1C_1$ determines that the roadside station $A_0B_1C_1D_5$ is not the outgoing end station by referencing the roadside station table 134 (151). In this condition, the district station $A_0B_1C_1$ sends the running area code 64 and dynamic vehicle code 50 (154) while maintaining a (logial) ZERO in the boundary bit 64a (152). When the roadside station $A_0B_1C_1D_7$ detects the mobile station $A_1B_1M_{03}$, the district station $A_0B_1C_1$ sees that the roadside station $A_0B_1C_1D_7$ is the outgoing end station by referencing the roadside station table 134. Then, the district station $A_0B_1C_1$ turns the boundary bit 64a from ZERO to ONE (153) and transmits the mobile station data 50 and 60 (154).

Switching stations lying above the district station $A_0B_1C_1$ such as the regional station $A_0B_1$ and central stations $A_0$ and $A_1$ identify the destination of the mobile station position data on the basis of the vehicle code "$A_1B_1M_{03}$" and repeat it to the registry station in which the mobile station $A_1B_1M_{03}$ is registered, i.e. the regional station $A_1B_1$ in this example. On reception of the mobile station position data, i.e., the static vehicle code 50 and dynamic vehicle code 60, the registry station $A_1B_1$ identifies the mobile station 16 of interest, i.e., the station $M_{03}$ in this example on the basis of the mobile station code 54 and stores such position data in the associated location of the running vehicle table 80. These position data, of course, include the boundary bit 64a.

Again, a reference will be made to FIG. 9 for describing a sequence available with this particular embodiment to terminate a call from the center 26 or 28 to the mobile station $A_1B_1M_{03}$ on the basis of the mobile station position data which is constantly updated at the registry station $A_1B_1$. A message to be sent from the center 26 or 28 to the mobile station $A_1B_1M_{03}$ is transmitted to the registry station $A_1B_1$ via the central station 34, together with a header in the form of the static vehicle code 50 which includes a destination code "$A_1B_1M_{03}$". For so transferring the message, the transmit stations individually identifies the destination code "$A_1B_1M_{03}$" of the message. On reception of the message with the header, the station $A_1B_1$ checks the destination code to see if the mobile station $A_1B_1M_{03}$ is a registered or qualified station and, if it is qualified, temporarily stores the message in a memory (not shown) (140). At this instant, the registry station $A_1B_1$ returns a confirmation signal to the center 26 or 28, although not shown in the figure.

Figure 15:
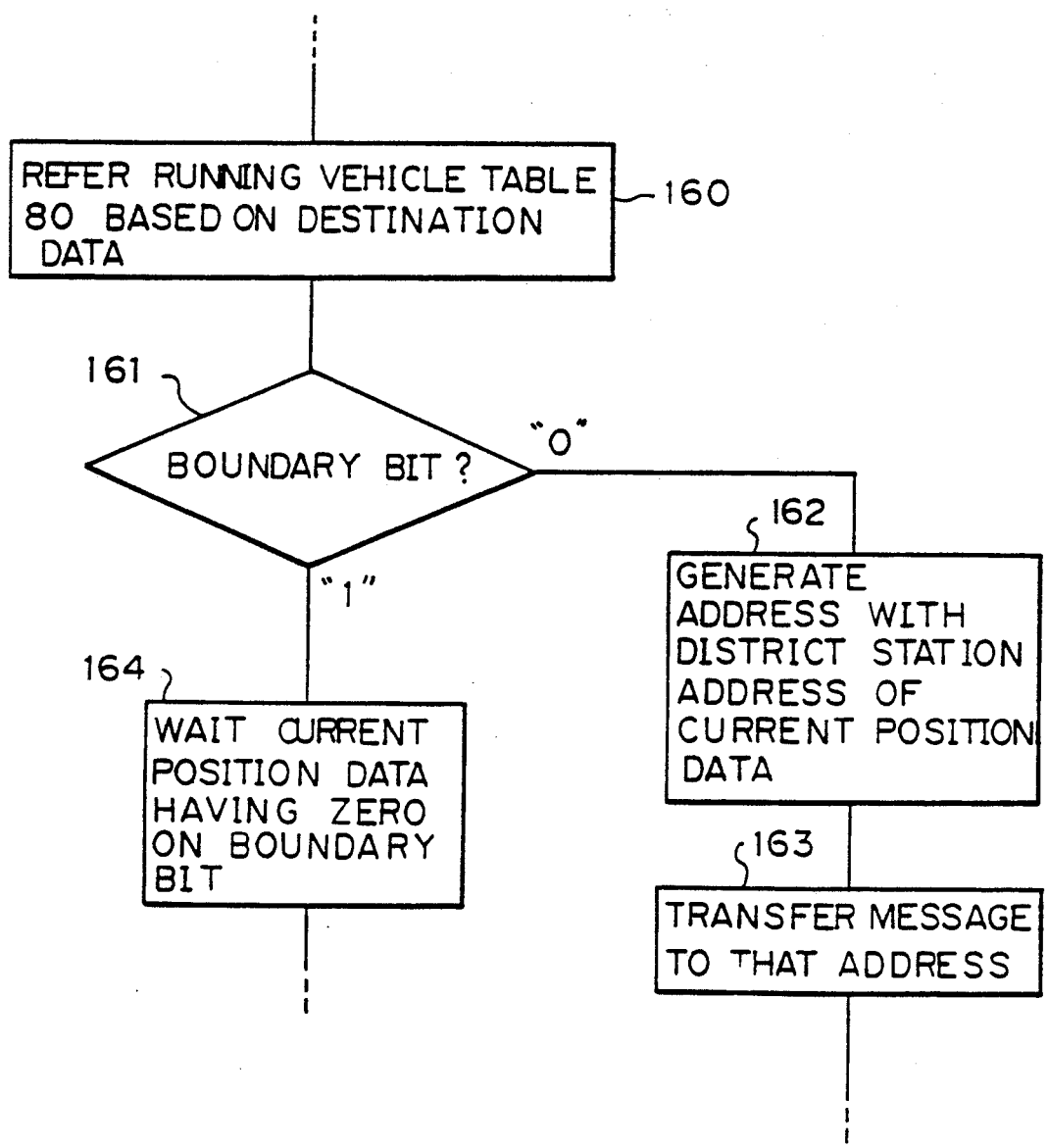
FIG. 15 is a flowchart demonstrating a specific procedure associated with an embodiment in which a message address is generated when a registry station terminates an incoming call at a mobile station.

The registry station $A_1B_1$ checks the running vehicle table 80 (160, FIG. 15) to determine the current position of the mobile station $A_1B_1M_{03}$ of interest as indicated by the mobile station position data. If a ONE is not set in the boundary bit 64a associated with the mobile station $A_1B_1M_{03}$ (161), the registry station $A_1B_1$ prepares, on the basis of the current position such as "$A_0B_1C_1$", a dynamic vehicle code 60 which includes the running area code in the form of the address "$A_0B_1C_1$" of the district station 30 (162). The registry station $A_1B_1$ reads the message out of the memory, adds the dynamic code 60 to the header, and sends the resulting header and message to the district station $A_0B_1C_1$ (163).

Transit stations such as the central station 34 and regional station 32 identify the dynamic vehicle code 60 of the message and transfer it to the district station $A_0B_1C_1$. As the district station $A_0B_1C_1$ receives the message together with the header, it accesses all of its associated roadside stations 10 at the same time.

Referring again to FIG. 15, if the boundary bit 64a is a ONE as determined in the step 161 by the registry station $A_1B_1$, in the illustrative embodiment, the transmission of the message is not effected until position data having a ZERO in the boundary bit 64a has been received afterwards with respect to the mobile station $A_1B_1M_{03}$ (164). This is because, even if call termination at the mobile station $A_1B_1M_{03}$ is attempted via the district station $A_0B_1C_1$, the probability that the mobile station $A_1B_1M_{03}$ seizes it is generally small. In this manner, this embodiment allows a minimum of ineffective termination of a call at the mobile station 16 to occur by giving special significance to the outgoing end station which is present in the coverage area of the district station 30.

If desired, in the step 164 where the registry station $A_1B_1$ is in a waiting condition, whether or not new position data arrives within a predetermined period of time may be determined. If the predetermined period of time expires before the arrival of new position data, the district station $A_0B_1C_1$ stored in the running vehicle table 30 will access the mobile station $A_1B_1M_{03}$ by paging.

Figure 16:
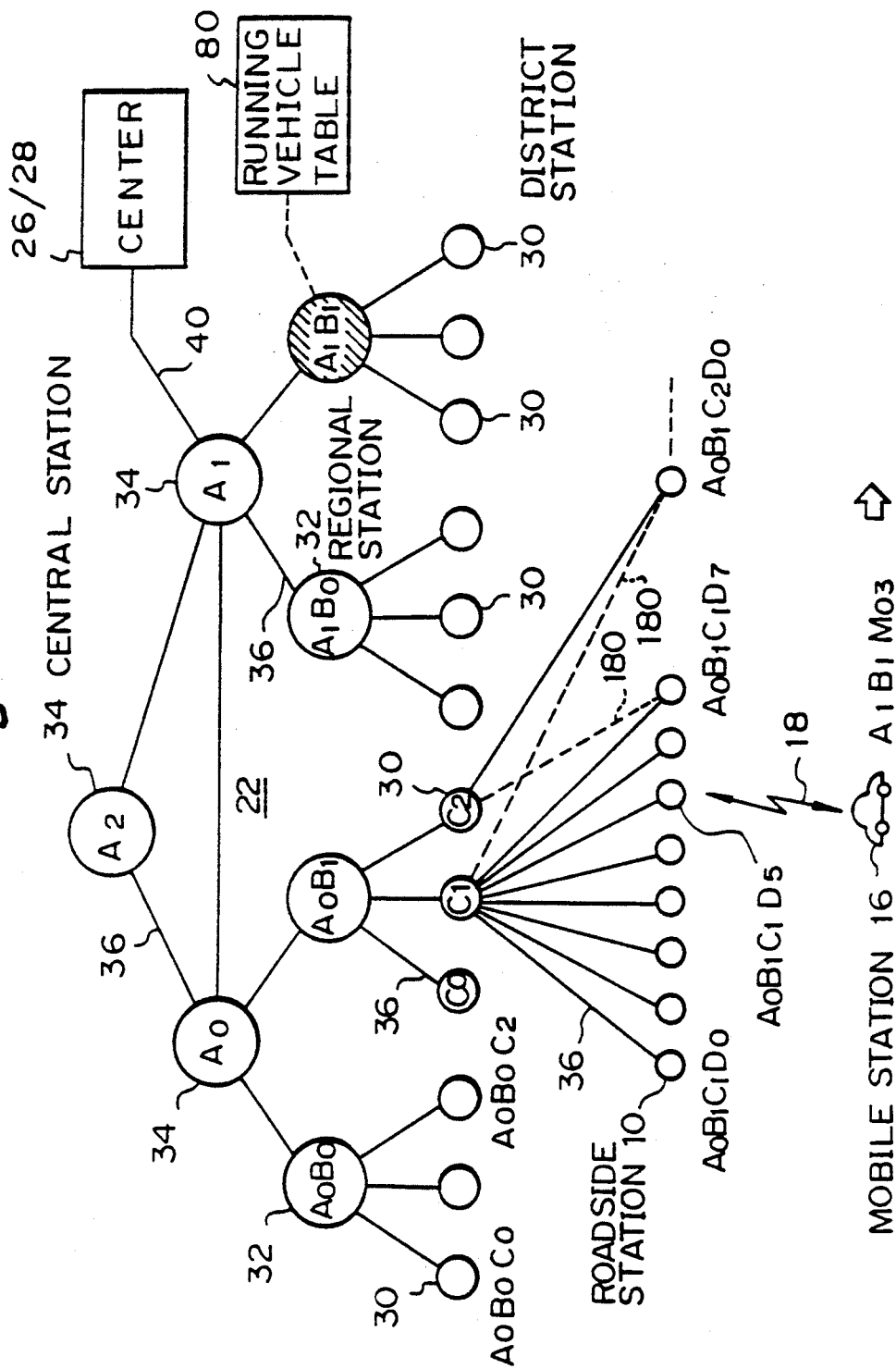
FIG. 16 is a schematic view showing an alternative embodiment of the mobile telecommunications system using distributed miniature zones in accordance with the present invention.

An alternative embodiment of the present invention will be described which is so constructed as to effect a paging to a mobile station which is running at the incoming end of the coverage area of an adjoining district station 30 also. One of characteristic features of this embodiment is that particular ones of the roadside stations 10 are subordinate not only to their associated district stations 30 but also to other district stations 30, as indicated by dotted lines 180 in FIG. 16. Specifically, assuming that the roadside station $D_7$ geographically belonging to the coverage area of a certain district station $C_1$ and accommodated in the latter is located in close proximity to the coverage area of another district station $C_2$, i.e., the roadside station $D_7$ is an "end station", the roadside station $D_7$ is also connected to the district station $C_2$ such that it is logically subordinate to the district station $C_2$ as to the control over call termination at the mobile station 16 and is controlled by the latter as well.

For example, the district station $C_1$ accommodates the roadside stations $D_0$ to $D_7$ so that when any of the subordinate roadside stations $D_0$ to $D_7$ detects the mobile station 16, the district station $C_1$ is informed of the detection from that roadside station as usual. However, in response to an incoming call meant for the mobile station 16, the district station $C_1$ simultaneously accesses not only its own roadside stations $D_0$ to $D_7$ but also a roadside station of the adjacent area, e.g., a roadside station $A_0B_1C_2D_0$ which is located at the incoming end of the adjacent district station $C_2$. That the call termination control extends from the district station 30 located in a certain region to a roadside station 10 located in the adjacent region is represented by the dotted lines 180 in FIG. 16. In the example shown in FIG. 16, the roadside station $D_7$ associated with the district station $C_1$ is also an incoming end station when it comes to the vehicle 12 which moves away from the district station $C_2$ to the district station $C_1$ and, therefore, it is subordinate to the district station $C_2$ with respect to call termination control. It is to be noted that two or more incoming end stations may exist in the case of an actual road because the roadside stations 10 associated with such a road are usually developed two-dimensionally.

Concerning the roadside station $D_7$ located at the end of the coverage area of the district station $C_1$, the land station code may include the boundary bit (FIG. 12) indicative of the fact that the coverage area terminates at the station $D_7$ when the station $D_7$ has detected the mobile station $A_1B_1M_{03}$, as in the previous embodiment. Further, an arrangement may be made such that when a certain district station 30 has detected the mobile station $M_{03}$ for the first time via any of its subordinate roadside stations 10, it reports the detection to the registry station $A_1B_1$ where the mobile station $M_{03}$ is registered.

Figure 17A:
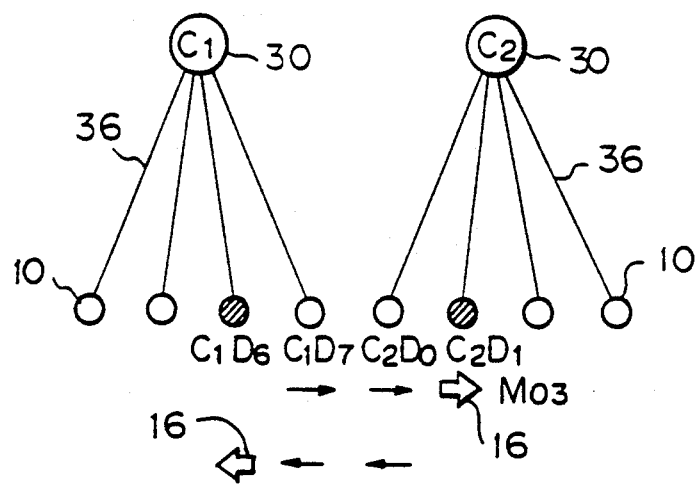
FIGS. 17A, 17B and 17C are schematic diagrams individually showing embodiments of single subordination and double-subordination of an end roadside stations which lies in the coverage area of a district station.

It rarely occurs that the mobile station $M_{03}$ detected by the outgoing end station $A_0B_1C_1D_7$ remains in the coverage area of the same district station $C_1$. Hence, as shown in FIG. 17A, if the system architecture is such that each of the end stations $C_1D_7$ and $C_2D_0$ is subordinate solely to its associated district station $C_1$ or $C_2$, the termination of an incoming call from the district station $C_1$ at the mobile station $M_{03}$ which may be attempted after the outgoing end station $C_1D_7$ has detected the mobile station $M_{03}$ will in many cases be unsuccessful. Generally, it is only after the incoming end station $C_2D_0$ of the adjoining district station $C_2$ has detected the mobile station $M_{03}$ and reported its current position to the registry station $A_1B_1$ that a call termination is attempted via the district station $C_2$. Therefore, the mobile station $M_{03}$ cannot receive a call until, at the earliest, it reaches the zone 20 of the next roadside station $C_2D_1$, resulting in a substantial delay in the termination of a call. In FIG. 17A, the locations where a call can be received are indicated by bold arrows 16 while the roadside stations associated with such locations are indicated by hatching.

Figure 17B:
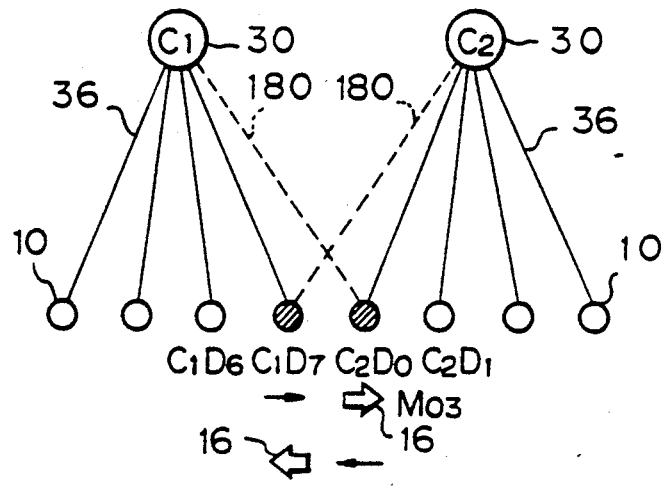

In contrast, in the illustrative embodiment, the architecture is such that the incoming end station $C_2D_0$ of the district station $C_2$ which adjoins the district station $C_1$ is logically subordinate to the district station $C_1$ as well, as shown in FIG. 17B. In this construction, even when the mobile station $M_{03}$ enters the coverage area of the district station $C_2$ after the outgoing end station $C_1D_7$ of the district station $C_1$ has detected it, the probability of a call being successfully terminated at the mobile station $M_{03}$ is great because the district station $C_1$ accesses not only its coverage area but also the incoming end station $C_2D_0$ of the adjoining district at the same time.

Figure 17C:
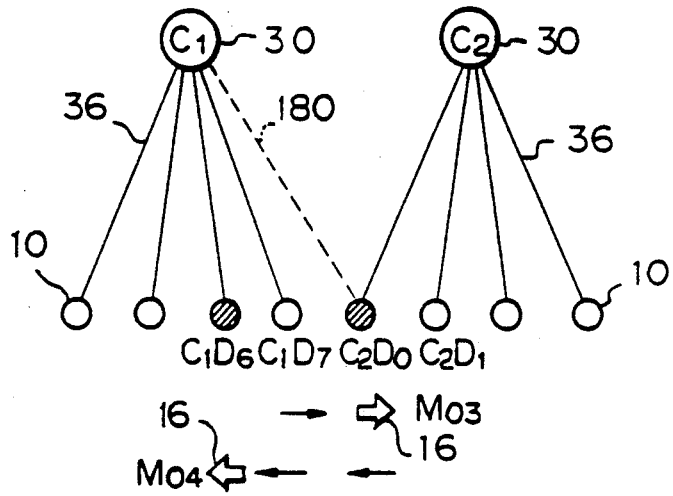

In the example shown in FIG. 17, incoming and outgoing end stations 10 are shown as being subordinate with respect to opposite directions of travel of a vehicle, i.e., the end station $C_1D_7$ of the district station $C_1$ which adjoins the district station $C_2$ is subordinate to the district station $C_2$ also. This allows even the mobile station 16 running in the opposite direction from the district station $C_2$ to the district station $C_1$ to receive a call efficiently. However, such a both-direction double-subordinate scheme is not essential. For example, when the distance between two nearby roadside stations 10 is relatively short, the end station 10 may be subordinate to the two nearby district stations $C_1$ and $C_2$ with respect to one direction only, as shown in FIG. 17C. In the example shown in FIG. 17C, since the distance between the roadside stations $C_1D_6$ and $C_1D_7$ belonging to the district station $C_1$ is shorter than the distance between the others, an arrangement is made such that the station $C_1D_7$ is subordinate solely to the district station $C_1$ as to a mobile station running in the opposite direction to the mobile station $M_{03}$ such as $M_{04}$. Although the arrangement shown in FIG. 17 allows the mobile station $M_{04}$ to receive a call only when the latter enters the service zone of the roadside station $C_1D_6$, the distance between the roadside station $C_1D_6$ and the incoming end station $C_1D_7$ is sufficiently short to prevent the serviceability from being critically degraded.

In this particular embodiment, when the district station 30 accesses its own roadside stations 10 at the same time for the termination of a call at the mobile station 16, it necessarily accesses the incoming end station 10 of the adjoining district also. It is not necessary, however, that the roadside station 10 of the adjoining district station be accessed as stated. For example, in the case that the current position of the motor vehicle 16 is detected with a boundary included in the running area code 64 as discussed earlier, the call termination control may be such that the incoming end station 10 of the adjoining district is accessed by paging only when the boundary bit shows that the mobile station 10 has been detected by the end station 10.

In summary, in this particular embodiment, a call is terminated at the mobile station by causing the district station 30 to access not only its own roadside stations 10 but also the incoming end station 10 of the adjoining district station 30 at the same time. This reduces the chance of ineffective paging for call termination and thereby enhances efficient call termination control.

Figure 18:
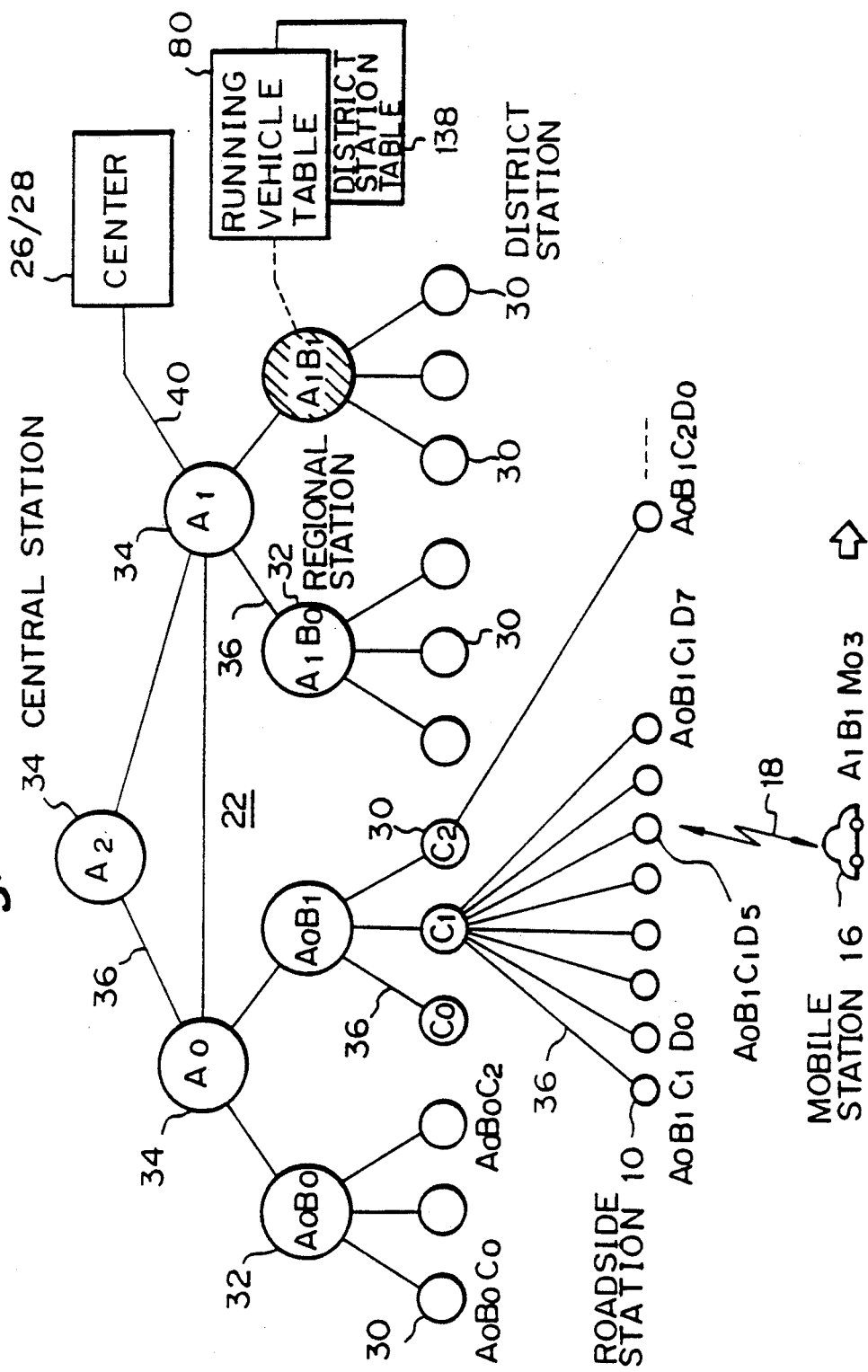
FIG. 18 is a schematic diagram showing an alternative embodiment of the mobile telecommunications system using distributed miniature zones in accordance with the present invention.
Figure 19:
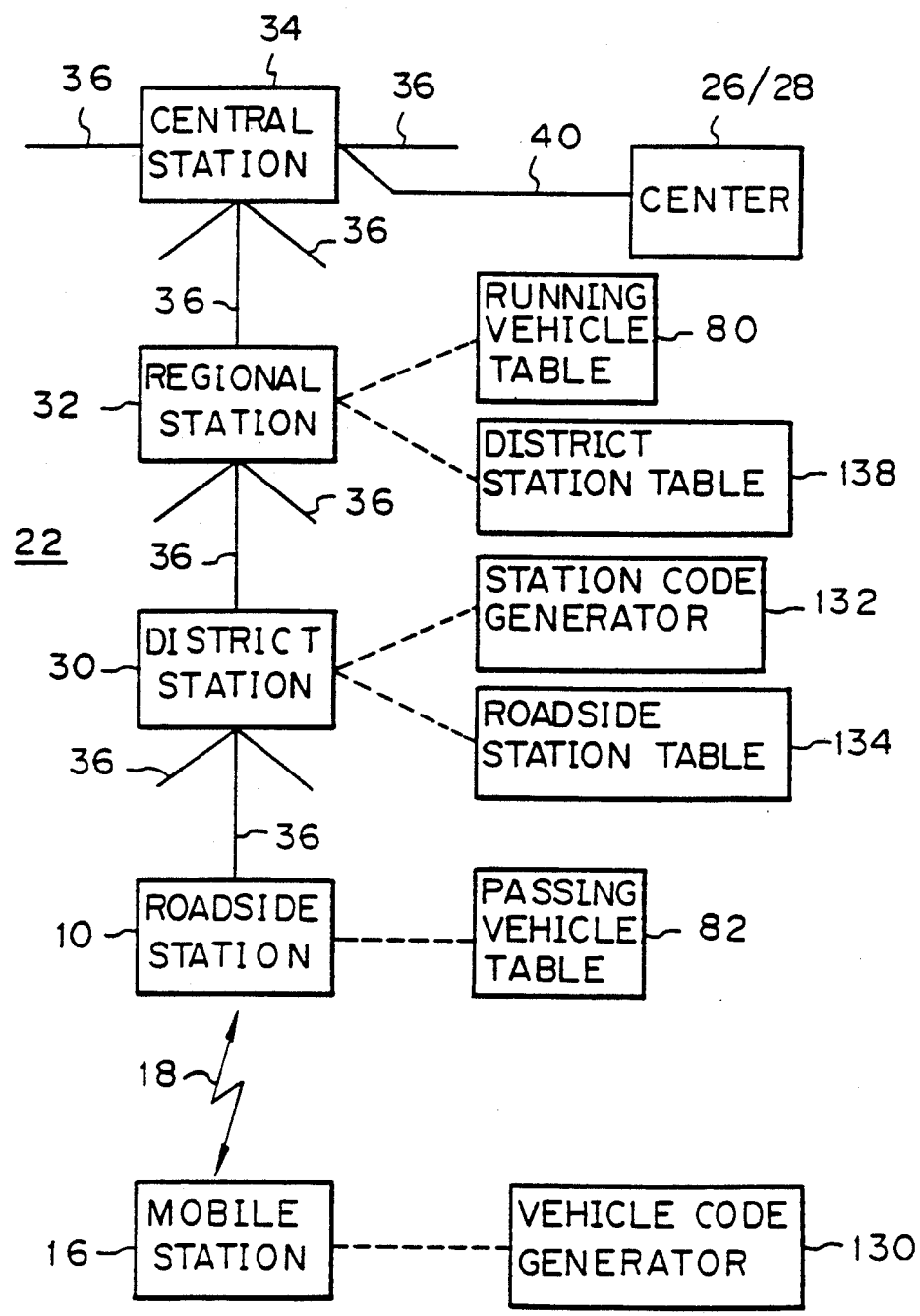
FIG. 19 is a block diagram schematically representative of an alternative hierarchical configuration of the on-road vehicle telecommunications network.
Figure 21:
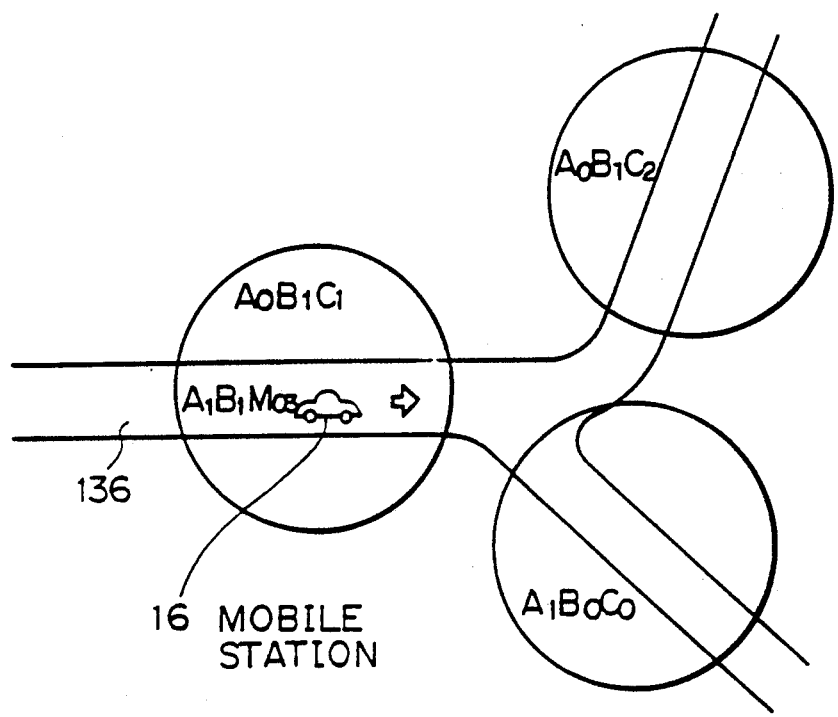
FIG. 21 is a diagram schematically showing how a mobile station is called by adjacent district stations in the system shown in FIG. 18.

An alternative embodiment of the present invention will be described which is constructed such that, when a mobile station 16 leaves a certain district station 30, an area which the mobile station 16 will enter next is estimated to cause a district station 30 covering that area to terminate an incoming call. A specific system construction of this embodiment is shown in FIG. 18, while the hierarchy of the telecommunications network 22 is shown in FIG. 19. In the example shown in FIG. 13, the mobile station $A_1B_1M_{03}$ running on the road 136 away from the end station $A_0B_1C_1D_7$ will soon enter the coverage area of the adjoining district station $A_0B_1C_2$. In another example shown in FIG. 21, the mobile station $A_1B_1M_{03}$ running on the road 136 away the end station 10 of the district station $A_0B_1C_1$ will soon reach either one of district stations $A_0B_1C_2$ and $A_1B_0C_0$.

In this particular embodiment, such a possibility of travel of the mobile station 16 over adjoining district stations 30 is stored in the form of the district station table 138 (FIG. 18) in the memory of the registry station, e.g. the rgional station $A_1B_1$. More specifically, the district station table of the registry station $A_1B_1$, for example, lists for each of the district stations 30 which belong to the network 22 the adjoining district stations 30 to which the mobile station 16 moving away from the coverage area of the district station 30 is likely to enter next. To terminate a call to the mobile station, the district station table 138 (FIG. 19) is referenced so that any adjoining district station 30 to which the mobile station 16 is likely to move is selected, as described in detail later.

In this embodiment, the information indicative of the current position of the mobile station 16 is implemented as the own station position information. The position information includes the land station code "$A_0B_1C_1$" and boundary bit (FIG. 12) in the form of the running area code 64 of the dynamic vehicle code 60.

A sequence for terminating a call from the center 26 or 28 at the mobile station $A_1B_1M_{03}$ by using the mobile station position data which is constantly updated by the registry station $A_1B_1$ will be described with reference to FIG. 9, as in the previous embodiments. A message from the center 26 or 28 and meant for the mobile station $A_1B_1M_{03}$ is sent to the registry station $A_1B_1$ via the central station 34 together with a header in the form of the static vehicle code 50 which includes a destination code "$A_1B_1M_{03}$". This message transfer is effected by causing each transmit station to identify the destination code "$A_1B_1M_{03}$" of the message. On reception of the message together with the header, the registry station $A_1B_1$ checks the mobile station $A_1B_1M_{03}$ as to qualification on the basis of the destination code and, if it is qualified, temporarily stores the message in its memory (not shown) (140). In this instance, the registry station $A_1B_1$ returns a confirmation signal to the center 26 or 28.

Figure 20:
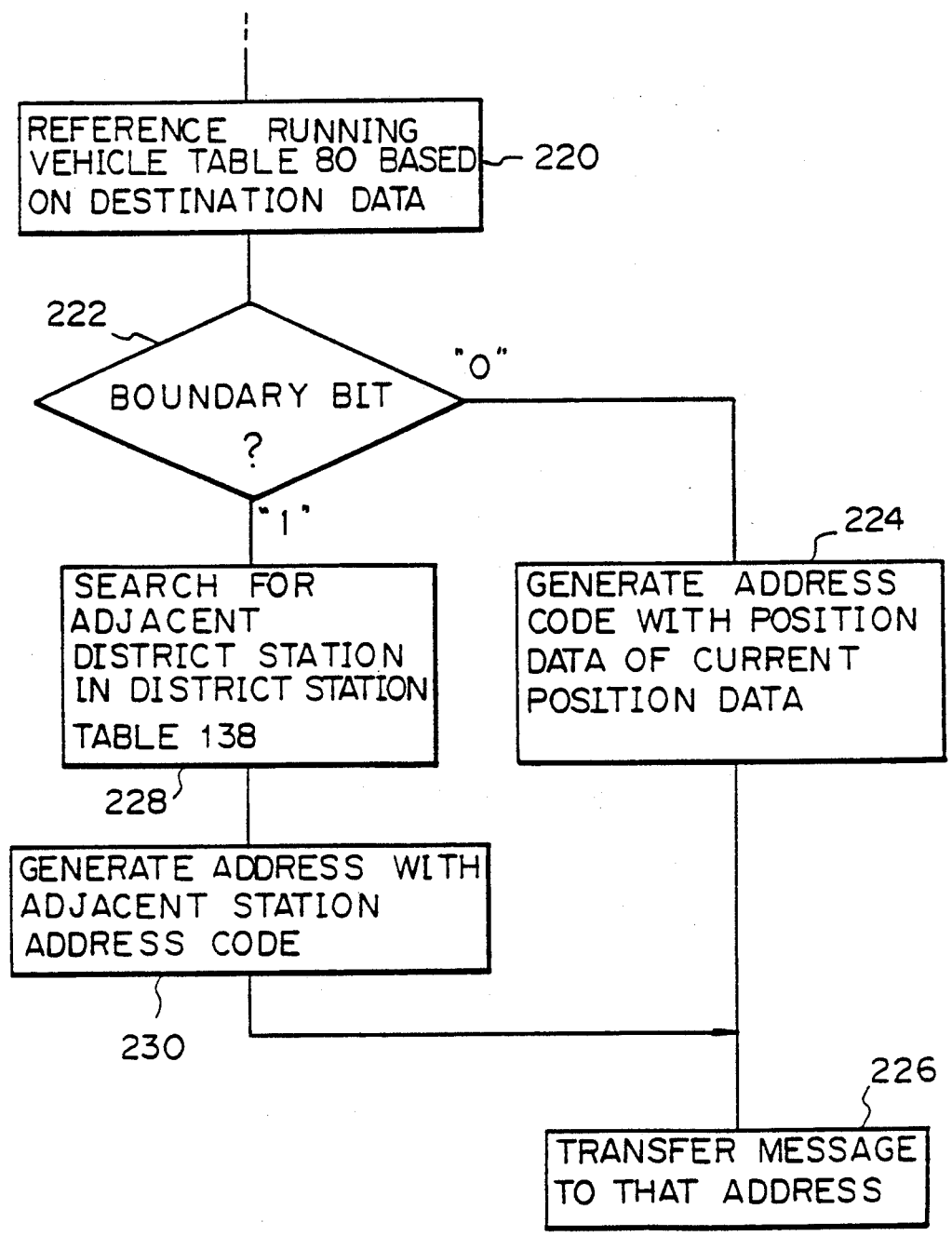
FIG. 20 is a flowchart associated with an alternative embodiment in which a message address is generated when a call is to be terminated at a mobile station.

By referencing the running vehicle table 80 (220, FIG. 20), the registry station $A_1B_1$ determines the current position of the mobile station $A_1B_1M_{03}$ on the basis of the listed position data. If a ONE which is a significant bit is not set in the boundary bit 64a (FIG. 12) of the mobile station $A_1B_1M_{03}$ (222), the registry station $A_1B_1$ produces a dynamic vehicle code 60 which includes a running area code 64 from the current position of the mobile station $A_1B_1M_{03}$, e.g. a running area code "$A_0B_1C_1$" from the current position "$A_0B_1C_1$". Then, the registry station $A_1B_1$ reads the message out of the memory, adds the dynamic code 60 to the header of the message, and sends the resulting header and message to the district station $A_0B_1C_1$ (226). In response, the district station accesses all of its subordinate road stations 10 simultaneously.

Turning back to FIG. 20, if the boundary bit 64a is a ONE as determined in the step 161 by the registry station $A_1B_1$, the station $A_1B_1$ references the district station table with respect to the district station code "$A_0B_1C_1$" and thereby produces a district station which governs the district which the mobile station 16 is expected to enter next (228). In the example shown in FIG. 13, the mobile station $A_1B_1M_{03}$ running on the road 136 away from the end station $A_0B_1C_1D_7$ will enter the coverage area of the district station $A_0B_1C_2$ in due course. In this case, the registry station $A_1B_1$ produces the district station $A_0B_1C_2$ out of the table 138. On the other hand, in the example of FIG. 21, the mobile station $A_1B_1M_{03}$ running on the road 136 away from the district station $A_0B_0C_1$ will soon reach either one of the district stations $A_0B_1C_2$ and $A_1B_0C_0$. Then, the registry station $A_1B_1$ produces the district station $A_0B_1C_2$ and $A_1B_0C_0$.

By using the produced district station code for an address (230), the station $A_1B_1$ transmits a message and terminate a call in the previously described manner (226). When a plurality of district addresses are produced as stated above, the station $A_1B_1$ accesses all of them at the same time or, alternatively, one after another according to a predetermined priority order. The priority order may be set beforehand on a district station basis or may be selected randomly.

The estimation of a district station discussed above is effective in reducing the possibility that when a call termination at the mobile station $A_1B_1M_{03}$ is attempted via the district station $A_0B_1C_1$ which is indicated by the current position information, the mobile station fails to seize the call, whereby the frequency of retry is lowered. Thus, this embodiment allows a minimum of wasteful termination of a call at the mobile station 16 to occur by giving special significance to the end stations subordinate to each district station 30.

While adjoining district stations 30 have been shown and described as being sarched by the registry station, this kind of search is not necessary and, of course, may be assigned to a station other than the registry station. For example, either the central station 34 or the regional station 32 may be provided with a similar district station table so as to perform the search in response to a message which is distined to the mobile station 16. Further, the search of adjoining districts may be assigned to the regional stations in place of the district stations.

Figure 22:
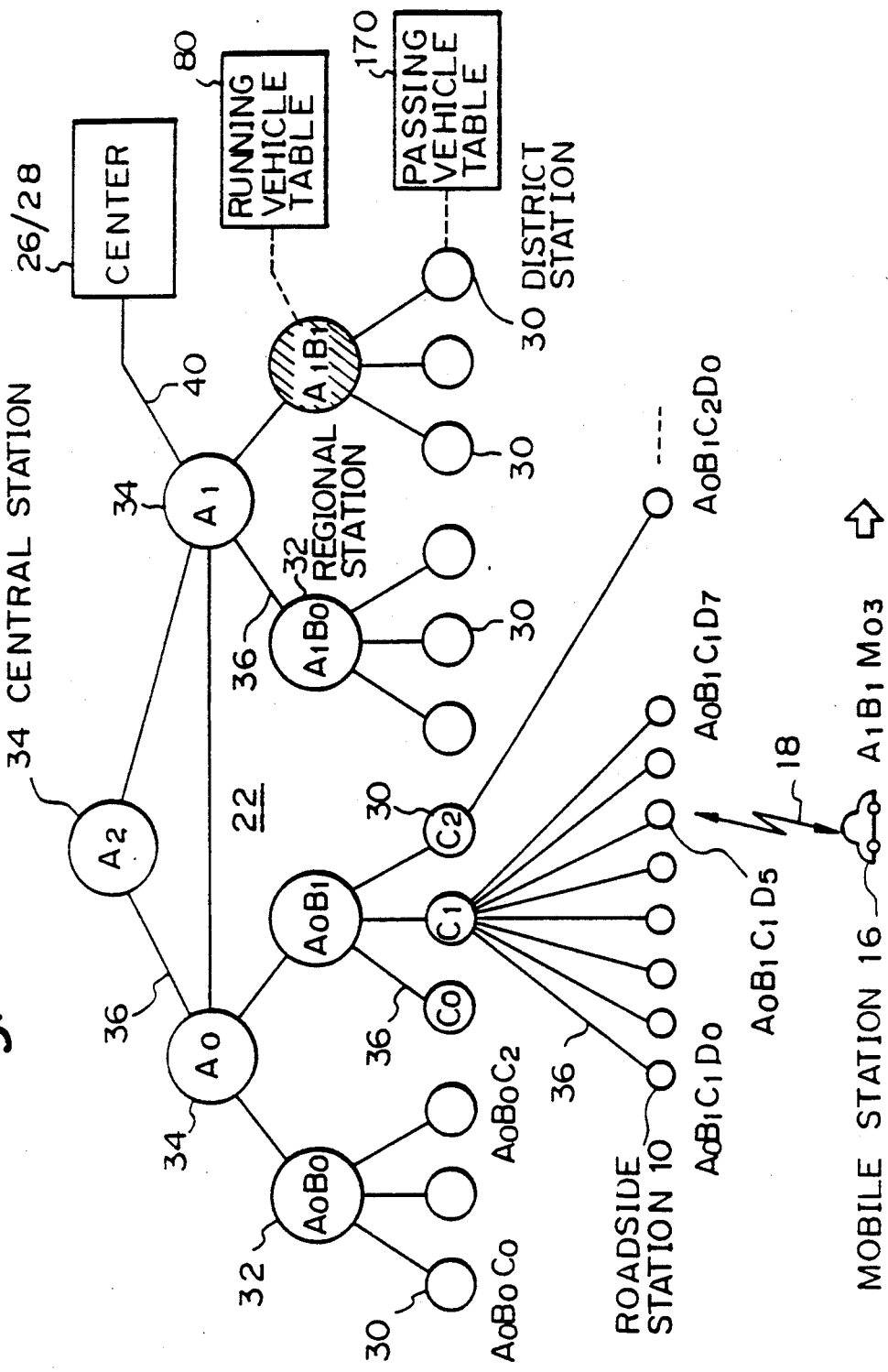
FIG. 22 is a schematic diagram showing how a mobile station is located in an alternative embodiment of the mobile telecommunications system using miniature zones in accordance with the present invention.
Figure 23:
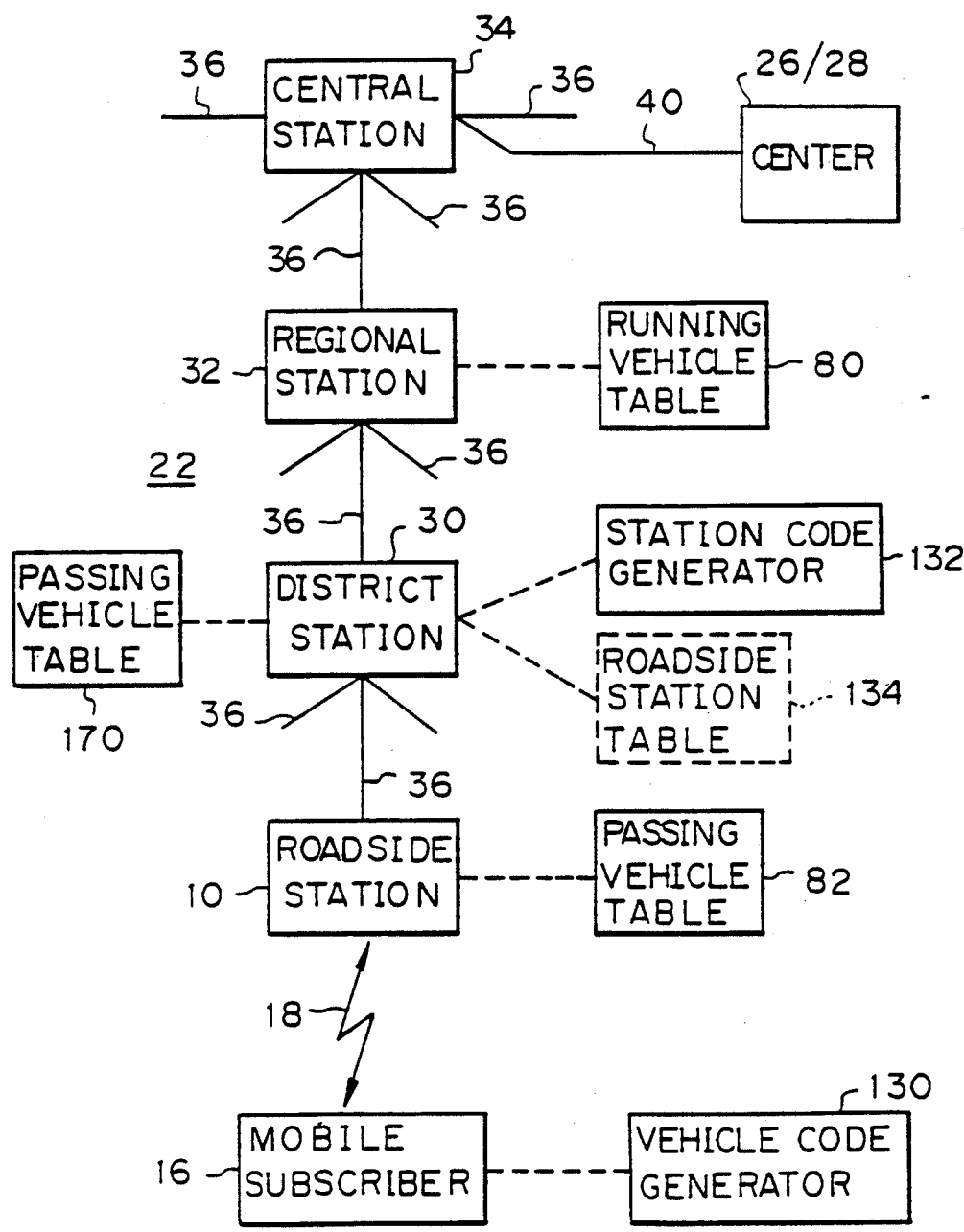
FIG. 23 is a schematic block diagram representative of an alternative hierarchical configuration of the on-road vehicle telecommunications network.

An alternative approach for the detection of the travelling position of the mobile station 16 in accordance with the present invention will be described. In this embodiment, as shown in FIG. 3, an ID code designating a mobile station 16, i.e., a vehicle specific code is constituted by a static code 50 and a dynamic code 60. As shown in FIGS. 22 and 23, the memory of each district station 30 stores a passing vehicle table 170. This table 170 lists data associated with the mobile stations 16 which are detected in the service zones 20 of all of the roadside stations that are accommodated in the district station 30. In the illustrative embodiment, it is only when the district station 30 has found a new or strange mobile station 16 in its coverage area that it holds a communication with the registry station where that mobile station 16 is registered for informing the latter of the current position of the mobile station 16. This alleviates the communication traffic needed for reporting the current position and simplifies the processing which the registry station has to execute for managing the running positions. The passing vehicle table 170 is referenced in order to determine whether or not a mobile station 16 seized by any roadside station 10 is a newcomer in the coverage area of the district station 30. Also, when the roadside stations 10 are not arranged in a paging group configuration as to an incoming call, the table 170 is used to search for a roadside station 10 which can terminate a call at the mobile station 16.

For example, as shown in FIG. 22, assume that one $C_1$ of multiple district stations subordinate to a regional station $A_0B_1$ accommodates eight roadside stations 10 which are designated respectively by station codes $D_0$ to $D_7$. In the figure, the sixth roadside station 10 as counted from the left is designated by a station code "$A_0B_1C_1D_5$". When a mobile station 16 having a static vehicle code 50 of "$A_1B_1M_{03}$" is polled by the roadside station $A_0B_1C_1D_5$ while running within the zone 20 of the latter, it returns an ID code "$A_1B_1M_{03}$" to the roadside station as a land station code 52 and a mobile station code 54.

The roadside station 10 may store in the passing vehicle table 82 the data which are associated with the subscriber vehicles 12 and obtained from the mobile stations 16 present in the zone 20 at each polling period. The roadside station 10 transfers such data to the associated district station 30 over the channel 36. In this embodiment, the district station 30 is so constructed as to inform the registry station $A_1B_1$ of the current position of a particular mobile station such as $A_1B_1M_{03}$ for the first time when it has detected the mobile station through any of its associated roadside stations 10

As shown in FIG. 13, assume that the mobile station $A_1B_1M_{03}$ running on the road 136 has moved away from the end roadside station $A_0B_1C_1D_7$ subordinate to the district station $A_0B_1C_1$ into the zone 20 which is defined by the first roadside station $A_0B_1C_2D_0$ subordinate to an adjoining district station $A_0B_1C_2$. Then, the roadside station $A_0B_1C_2D_0$ reports the vehicle code 50 of the mobile station $A_1B_1M_{03}$ to its associated district station $A_0B_1C_2$ which in turn stores it in its passing vehicle table 170. At this instant, the district station $A_0B_1C_2$ checks the table 170 to see if the vehicle code "$A_1B_1M_{03}$" has been listed in the past (172, FIG. 24). If it has not been listed, the district station $A_0B_1C_2$ transfers the current position data of the mobile station $A_1B_1M_{03}$ to the registry station $A_1B_1$ via its associated district station $A_0B_1$. In this case, the station code "$A_0B_1C_2$" sufficiently implements the current position data.

More specifically, as shown in FIG. 23, each district station 30 has a station code generating unit 132 for generating a land station code 52 which designates the station 30 itself. Concerning the district station $A_0B_1C_2$, for example, the station code generating unit 132 is loaded with a code "$A_0B_1C_2$" as the land station code 52. The vehicle code "$A_1B_1M_{03}$" of the mobile station 16 received by the roadside station $A_0B_1C_2D_0$ is once stored in the passing vehicle table 82 of the roadside station 10 while being transferred to the associated district station $A_0B_1C_2$.

Figure 24:
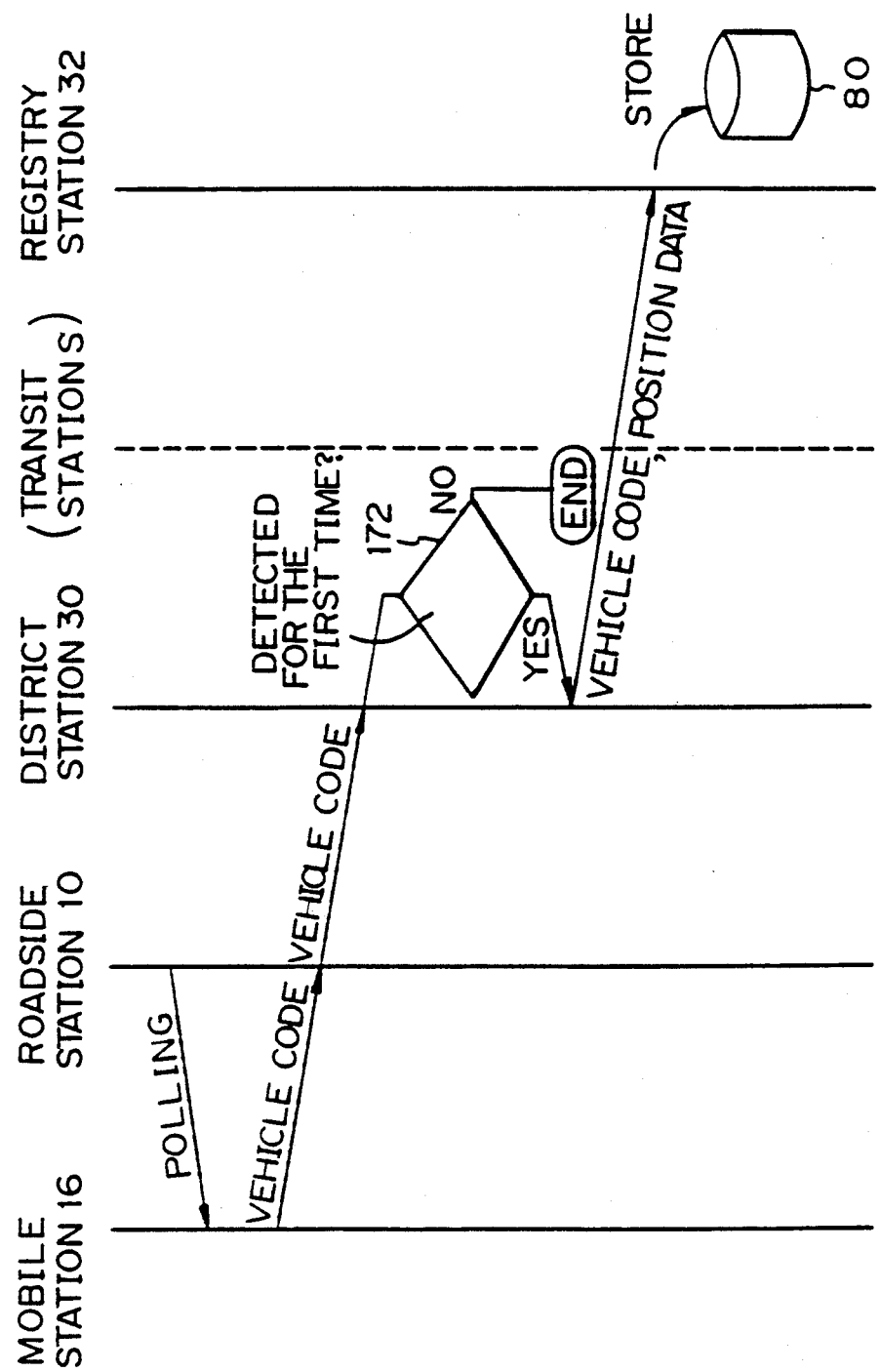
FIG. 24 is a diagram schematicall indicating another specific sequence for locating a mobile station.

As the district station $A_0B_1C_2$ decides that the vehicle code "$A_1B_1M_{03}$" has not been stored in the passing vehicle table 170 (172), it determines that the mobile station $A_1B_1M_{03}$ is registered in the regional station $A_1B_1$ which belongs to the central station $A_1$ on the basis of the vehicle code "$A_1B_1M_{03}$" and, then, transfers the vehicle code "$A_1B_1M_{03}$" to the station $A_1B_1$, as shown in FIG. 24. At this instant, the district station $A_0B_1C_2$ sends its own position information for indicating the current position of the mobile station 16. This position information includes the land station code "$A_0B_1C_2$" in the form of the running area code 64 of the dynamic vehicle code 60.

Switching stations lying above the district station $A_0B_1C_2$ such as the regional station $A_0B_1$ and central stations $A_0$ and $A_1$ individually repeat the mobile station position data toward the registry station, i.e., the regional station $A_1B_1$ in this example while identifying the destination on the basis of the vehicle code "$A_1B_1M_{03}$". On receiving the mobile station position, i.e., the static vehicle code 50 and dynamic vehicle code 60, the registry station $A_1B_1$ identifies the mobile station 16 of interest, i.e., the mobile station $M_{03}$ in this example on the basis of the mobile station code 54 and writes these position data in a predetermined location of the running vehicle table 80. In this manner, the running vehicle table 80 of the registry station $A_1B_1$ is constantly updated by incoming new data. In this system, a communication for reporting the current position occurs only when a new mobile station 16 is found in the coverage area of the district station 30, so that the communication traffic is alleviated and the processing to be executed by the registry station for dealing with the running positions is simplified.

The current position data associated with each mobile station 16 is constantly updated. Concerning the mobile station $M_{03}$, for example, when any of the district stations 30 detects it through its subordinate roadside station 10 for the first time, the district station 30 informs the registry station $A_1B_1$ of the presence of the mobile station $M_{03}$. Hence, the data listed in the running vehicle table 80 is updated as to the mobile station $M_{03}$.

It is to be noted that a particular mobile station 16 is not always detected for the first time through a roadside station 10 which is located at the end of the coverage area of a district station 30. Specifically, it may occur that the district station 30 finds the mobile station 16 for the first time through its subordinate roadside station 10 other than the end station 10, e.g., when the vehicle 12 moves into the coverage area of another district station 30 with the power supply of the on-board unit 16 being turned off and then the power supply is turned on.

To summarize this embodiment, each mobile station 16 is registered in a particular land station beforehand. When a district station 30 detects a particular mobile station 16 for the first time through any of its subordinate roadside stations 10, it informs the registry station of the current position of the mobile station 16. The registry station in turn holds the current position data and constantly updates it on a real time basis. Since it is only when the district station 30 has detected the mobile station 16 through the subordinate roadside station 10 that it reports the current position of the mobile station 16 to the registry station, the communication traffic for reporting the current position is minimized and therefore prevented from interfering with the data communication traffic which is the primary traffic.

Figure 25:
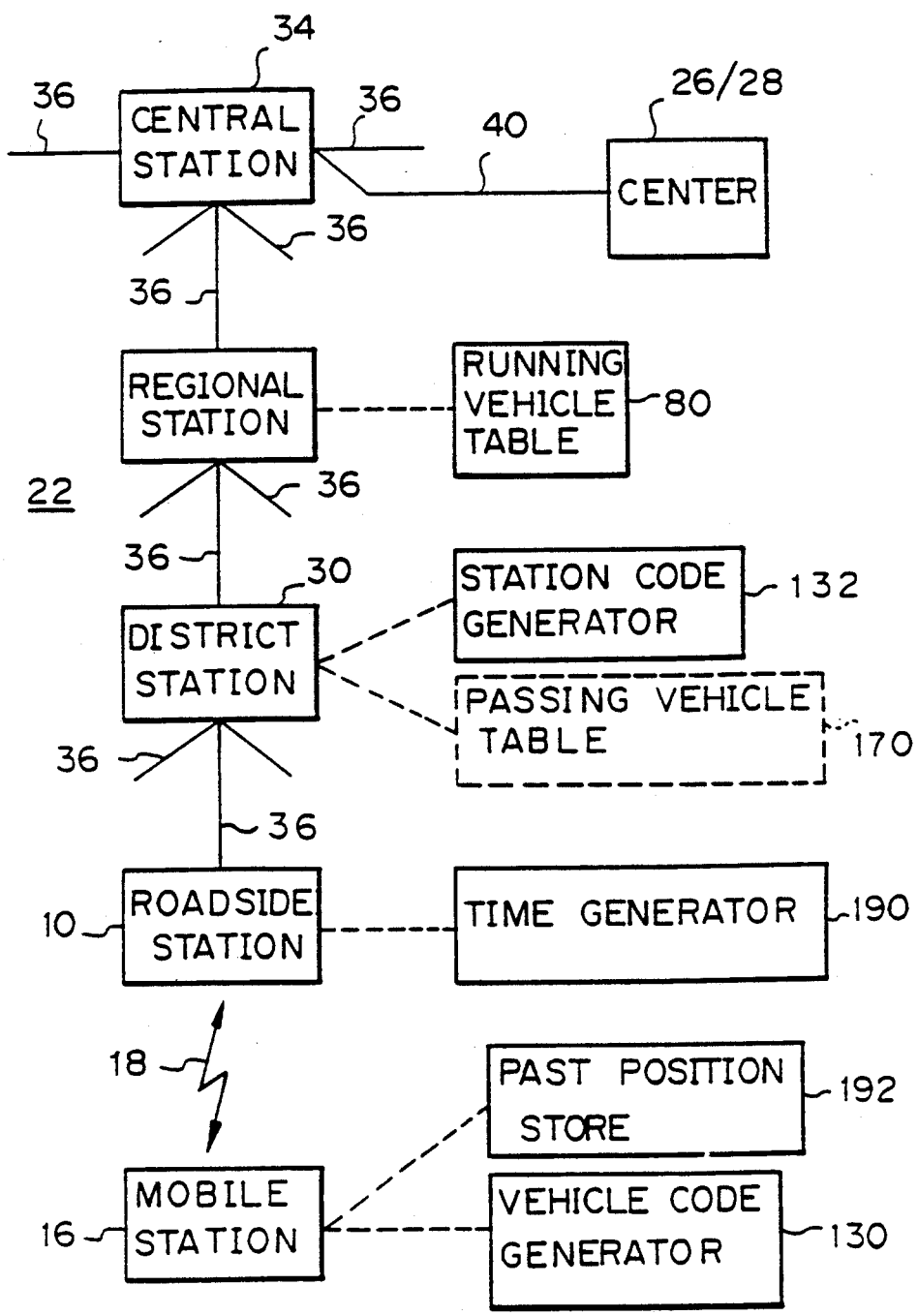
FIG. 25 is a schematic block diagram representative of another specific hierarchical configuration of the on-road vehicle telecommunications network.

Another embodiment of the present invention will be described which enhances efficient call termination control by estimating the movement of a mobile station 16 with accuracy. With this embodiment, it in principle is not necessary to provide each district station 30 with the passing vehicle table 170 (FIG. 25). Nevertheless, in order that the district station 30 may estimate the movement of the vehicle 12 and, based on the result of estimation, efficiently terminate an incoming call at the mobile station 16, it is advantageous for the district station 30 to memorize the estimated vehicle position. In the light of this, the memory of the district station 30 may be provided with the passing vehicle table 170. When the roadside stations 10 are not arranged in a paging configuration as to an incoming call, the table 170 is also used to search for a roadside station 10 which can terminate a call to the desired mobile station 16.

In this particular embodiment, as shown in FIG. 25, each roadside station 10 has a time generating unit 190. As described in detail later, the time generating unit 190 is available to supply the mobile station 16 with a time at which the latter has moved away from the roadside station 10 and which should be included in past position data. Specifically, when any of the roadside stations 10 polls the individual mobile stations which are present in its coverage area, it gives the time generated by the time generating unit 190 to the mobile stations 16. The time is written in a past position store 192 which is installed in the mobile station 16 as will be described.

The mobile station 16 has a memory or temporary store an area of which implements the past position store 192 for temporarily storing the past position data. In the illustrative embodiment, the past position data or position history data includes position data associated with a roadside station 10 which the subscriber vehicle 12 passed last, i.e., the land station code included in the running area code 64, and the time at which it passed the roadside station 10. When the subscriber vehicle 12 runs through the service zone 20 of the roadside station 10, the station 10 gives the past position data to the mobile station 16 by polling so that the data are temporarily stored in the past position store 192 of the latter. As the mobile station 16 is polled by another roadside station 10, it returns the past position data to that roadside station 10. It is to be noted that the roadside stations 10 so polling the mobile station 16 sequentially are sometimes the same and sometimes different from each other. In the case of a system in which the roadside stations 10 do not supply the mobile stations 16 with time information, it is preferable that each mobile station 16 be provided with a timepiece (not shown) itself to transmit a time obtained therewith as the past time data or time history data.

In this embodiment, the communication between the on-board station 16 of the subscriber vehicle 12 and the base station 10 is effected by polling and using a frame 100 having a format such as one shown in FIG. 4.

In response to polling, the vehicle code generating unit 130 of the mobile station 16 generates the registered land station code 52 and mobile station code 54 of the mobile station. The codes 52 and 54 are transmitted to the roadside station 10 in the form of the static vehicle code 50 and service function code over a selected channel (see FIG. 26), together with the past position data written in the past position store 192, When the system is not of the type storing time data in the past position store 192, time information available with the timepiece of the mobile station 16 is returned to the roadside station 10.

The roadside station 10 may write in the passing vehicle table 82 the data of the subscriber vehicle 12 which are obtained from the mobile station 16 present in the zone 20 at each polling period. The roadside station 10 transfers these data to the associated district station 30 over the channel 36. This embodiment, like the previous embodiment, is constructed such that the district station 30 reports the presence of a particular mobile station such as $A_1B_1M_{03}$ to the registry station $A_1B_1$ only when it has detected it for the first time through its subordinate roadside station 10.

More specifically, in the illustrative embodiment, when the district station 30 receives data associated with the subscriber vehicle 12 from the roadside station 10, it descriminates the district station code by referencing the past position data and determines whether or not the discriminated code is identical with the own code. If the two codes are not identical, the district station 30 holds a communication with the registry station for reporting the current position of the mobile station 16 by determining that the mobile station 16 is a newcomer detected in the coverage area. This reduces the communication traffic to be allocated to current position reporting and simplifies the position management processing to be executed by the registry station.

Figure 28:
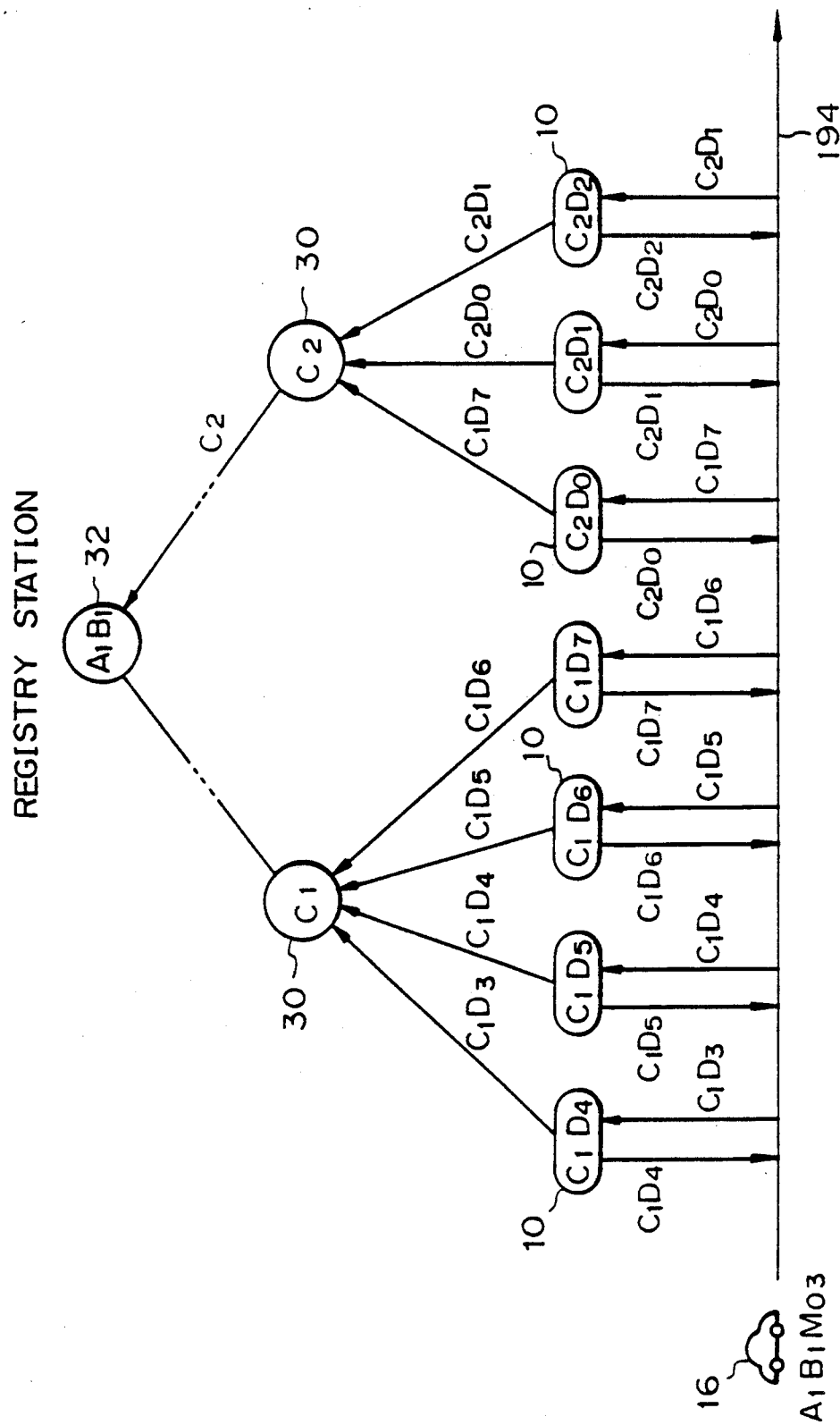
FIG. 28 is a schematic view showing how a mobile station is located in the embodiment of FIG. 25.

For example, as shown in FIG. 28, the mobile station $A_1B_1M_{03}$ running in a direction indicated by an arrow 194 is polled by a roadside station subordinate to the district station $C_1$, e.g., a roadside station $C_1D_6$ and, at this instant, receives the current time data and the roadside station code "$C_1D_6$" as past position data or position history data. The mobile station $A_1B_1M_{03}$ stores the past position data in its memory 192 (FIG. 25). When the mobile station $A_1B_1M_{03}$ enters the service zone 20 of the next roadside station $C_1D_7$ and is polled thereby, it writes the current data and roadside station code "$C_1D_7$" fed from the roadside station $C_1D_7$ in the memory 192 while returning the past position data stored in the memory to the roadside station $C_1D_7$. The roadside station $C_1D_7$ transmits the received past position data to its associated district station $C_1$. In response, the district station $C_1$ compares the uppermost bit of the latest position data associated with the mobile station $A_1B_1M_{03}$ and included in the past position data, i.e., the district station code "$C_1$" with the own district station code "$C_1$" (171, FIG. 26). In this example, the compared codes are identical with each other so that the district station $C_1$ does not inform the registry station of the current position of the mobile station $A_1B_1M_{03}$.

Assume that the mobile station $A_1B_1M_{03}$ has moved away from the roadside station $C_1D_7$ located at the end of the coverage area of the district station $C_1$ to enter the zone 20 which is covered by the first roadside station $C_2D_0$ subordinate to an adjoining district station $C_2$. The roadside station $C_2D_0$, like the roadside stations stated above, receives past position data from the mobile station $A_1M_1B_{03}$ and sends it to the associated district station $C_2$. This past position data includes time data obtained from the roadside station which the mobile station $A_1B_1M_{03}$ passed last, and the roadside station code "$C_1D_7$". Then, the district station $C_2$ compares the district station code "$C_1$" included in the past position data with the own station code "$C_2$". Since the two codes are not identical with each other, the district station $C_2$ transfers the current position data of the mobile station $A_1B_1M_{03}$ to the registry station $A_1B_1$. In this instance, the station code "$A_0B_1C_2$" which ends with the code assigned to the district station 30 suffices for the current position data.

More specifically, as shown in FIG. 25, the district station 30 has a station code generating unit 132 for generating a land station code assigned to the district station 30. Concerning the district station $A_0B_1C_2$, the station code generating section 132 is loaded with "$A_0B_1C_2$" as a land station code 52. The vehicle code "$A_1B_1M_{03}$" and past position data "$C_1D_7$" associated with the mobile station 16 and received by the roadside station $A_0B_1C_2D_0$ are once stored in the passing vehicle table 82 of the roadside station 10 while being transferred to the associated district station $A_0B_1C_2$.

Figure 26:
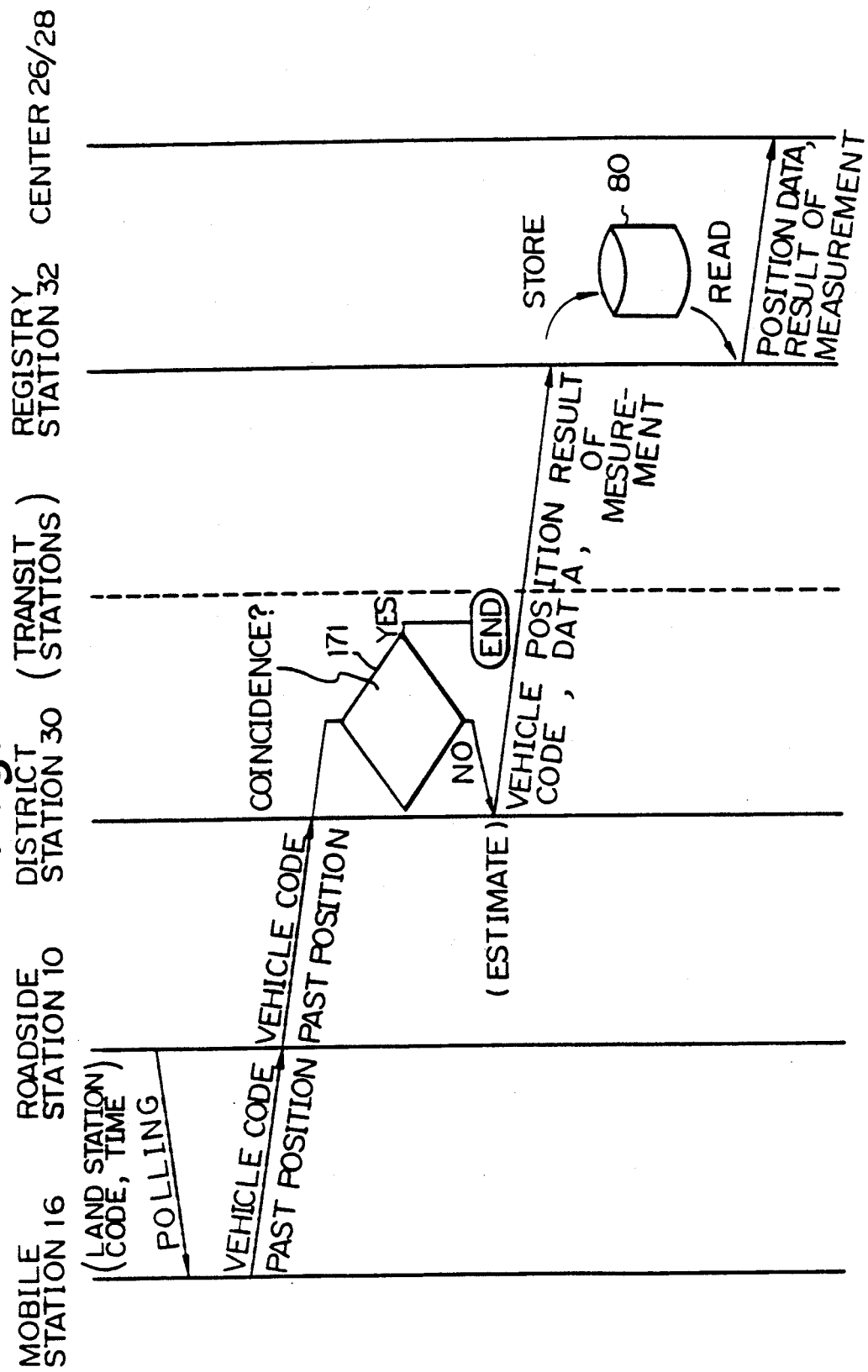
FIG. 26 is a diagram schematically showing another specific sequence for locating a mobile station.

As shown in FIG. 26, when the district station $A_0B_1C_2$ finds the previously mentioned non-coincidence in the past position data with respect to the vehicle code "$A_1B_1M_{03}$" (171), it determines that the mobile station $A_1B_1M_{03}$ is registered in the regional station $A_1B_1$ subordinate to the central station $A_1$ on the basis of the vehicle code "$A_1B_1M_{03}$", transferring current position data to the station $A_1B_1$. At this instant, the district station $A_0B_1M_{03}$ sends its own position information to the registry station $A_1B_1$ as the information indicative of the current position of the mobile station 16. This position information includes the land station code "$A_0B_1C_2$" in the form of the running area code 64 of the dynamic vehicle code 60.

Switching stations lying above the district station $A_0B_1C_1$ such as the regional station $A_0B_1$ and central stations $A_0$ and $A_1$ identify the destination of the mobile station position data being sent on the basis of the vehicle code "$A_1B_1M_{03}$" and repeat the data toward the regional station $A_1B_1$. On receiving the mobile station position data made up of the static vehicle code 50, dynamic vehicle code 60 and past position data, the regional station $A_1B_1$ identifies the mobile station 16 of interest, i.e., the station $M_{03}$ in this example as represented by the mobile station code 54 and writes the position data in a particular location of its running vehicle table 80. By such a procedure, the running vehicle table 80 of the registry station $A_1B_1$ is constantly updated by the latest data.

The past position data filed in the memory 80 of the registry station $A_1B_1$ as stated above may be transferred to the center 26 or 28, user center or similar subscriber in response to an access from the latter or automatically. Such a center may effectively use the supplied past position data for the purpose of estimating a position to which the subscriber vehicle 12 is expected to move or for a traffic controlling purpose.

As described above, in this embodiment, each mobile station 16 holds past position data on the level of district stations 30 while constantly updating it, and each district station 30 needs a communication for reporting the current position only when the past position data and the own station code do not coincide as to a particular mobile station 16. This not only minimizes the exclusive communication traffic associated with the mobile station current position and simplifies the processing to be executed by the registry station, but also makes it needless to install a storage in each district station 30 for storing the passing vehicle table 170.

The current position data of the mobile station 16 is constantly updated. Concentrating on the mobile station $M_{03}$, for example, when a certain district station 30 detects it for the first time through any of its subordinate roadside stations 10, the resulting position data is sent from the district station 30 to the registry station $A_1B_1$ to update the running vehicle table 80 as to the mobile station $M_{03}$.

It is to be noted that the roadside station 10 through which the district station 30 may detect a particular mobile station 16 for the first time is not always located at the end of the coverage area of the station 30. Specifically, it may occur that the district station 30 detects a mobile station 16 for the first time through a roadside station 10 other than the end station 10, e.g., when the vehicle 12 enters the coverage area of an adjoining district station 30 with the power supply of its on-board unit 16 being turned off and then the power supply is turned on. The mobile station 16 is constructed such that in such an initial condition the past position data to be returned in response to the first polling from a roadside station 10 has a particular initial value such as "ALL ZEROS" or "ALL ONES".

Information from the center 26 or 28, telephone network 24 or data switching network 25 which is destined to a mobile station 16 is temporarily stored in any one of the land stations, e.g. the roadside station 10 having the memory 42. In response, the roadside station 10 compares the static vehicle code 50 received from the mobile station 16 which is present in its coverage area with the destination code of the transmit information. If the two codes compare equal, the roadside station 10 transmits the information stored in the memory 42 to the mobile station 16 over a down-going channel of the vehicle communication field 108 of the frame 100. Information received from a mobile station 16 over an up-going channel is temporarily stored in the memory 42. The up-going transmit information is transferred to the center 26 or 28, data network 25 or telephone network 24 by way of the land communication network 22 later.

In the illustrative embodiment, efficient call termination at the mobile station 16 is promoted by dividing the roadside stations into paging groups on the basis of the area where they are located. To terminate an incoming call at a particular mobile station, all the mobile stations belonging to the same group as mobile station of interest are accessed at the same time. Specifically, all the roadside stations 10 subordinate to a single district station 30 may be arranged in a paging group configuration or, alternatively, some geographically associated roadside stations 10 subordinate to the same district station 30 may be arranged in such a configuration.

Figure 27:
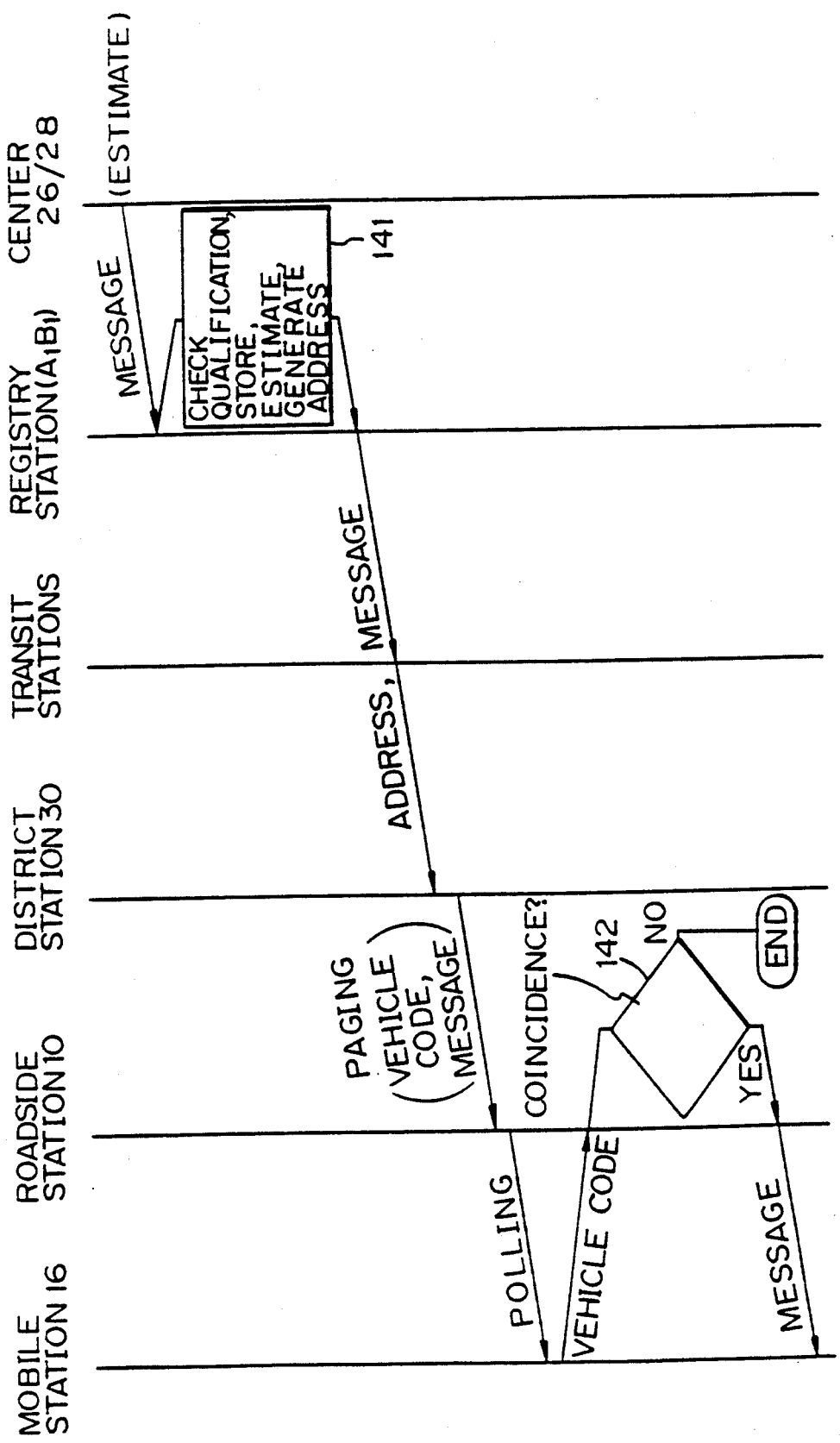
FIG. 27 is a diagram schematically showing another specific sequence for call termination.

A reference will be made to FIG. 27 for outlining a sequence for terminating a call from the center 26 or 28 at the mobile station $A_1B_1M_{03}$ by using the mobile station position data which is constantly updated at the registry station $A_1B_1$. A message from the center 26 or 28 which is meant for the mobile station $A_1B_1M_{03}$ is set to the registry station $A_1B_1$ via the central station 34 together with a header which is in the form of a static vehicle code 50 including the destination code "$A_1B_1M_{03}$". Each transit station transfers the message by identifying the destination code "$A_1B_1M_{03}$". On receiving the message together with the header, the registry station $A_1B_1$ determined whether or not the mobile station $A_1B_1M_{03}$ is qualified to receive the message on the basis of the destination code and, if it is qualified, stores the message in its memory (not shown) for a moment (141). At this instant, the registry station $A_1B_1$ returns a confirmation signal to the center 26 or 28, although not shown in the figure.

The registry station $A_1B_1$ references the running vehicle table 80 to see the current position of the mobile station $A_1B_1M_{03}$. If the current position of the mobile station $A_1B_1M_{03}$ is "$A_0B_1C_2$", for example, the registry station $A_1B_1$ estimates a position which the mobile station $A_1B_1M_{03}$ is likely to reach next by taking account of the period of time elapsed after the latest current position data has been obtained, traffic volumes, etc. Alternatively, the district station 30 may perform such an estimation when received past position data and send the estimated position data to the registry station $A_1B_1$. In any case, the registry station $A_1B_1$ produces a dynamic vehicle code 60 which includes the address of the district station 30 estimated with the mobile station, e.g., "$A_0B_1C_2$" as the running district code 64. The registry station $A_1B_1$ reads the transmit message out of the memory, adds the dynamic code 60 to the header of the message, and sends the resulting header and message to the district station $A_0B_1C_2$.

The central station 34, regional station 32 and other transit stations transfer the message by identifying the dynamic vehicle code 60. On receiving the message, the district station $A_0B_1C_2$ accesses all of its subordinate roadside stations 10 at the same time.

Assume that the roadside stations 10 belonging to a certain district station such as $A_0B_1C_2$ are divided into a plurality of paging groups. Then, the district station $A_0B_1C_2$ references the passing vehicle table on the basis of the static vehicle code 50 which it received together with the message from the registry station $A_1B_1$, thereby selecting a particular roadside station 10 as indicated by the running area code 64 associated with the mobile station $A_1B_1M_{03}$. Then, the district station $A_0B_1C_2$ references the roadside station table 134 to determine a particular paging group and accesses all of the roadside stations 10 belonging to that group at the same time. The paging involves a send request, the message, and the destination code "$A_1B_1M_{03}$" to which the message is destined. In response, each roadside station 10 temporarily stores the message in its memory 42 while polling the mobile stations 16 which are present in its service zone 20. This polling is effected in the introductory field 102 of the frame 100, as stated earlier.

Active mobile stations 16 being operated in the service zone 20 of the roadside stations 10 each generates, in response to the polling, the vehicle codes 50 and 60 by the vehicle code generating unit 130 and returns them to the roadside station 10. This occurs in the vehicle ID field 104 of the frame 100. The roadside station 10 once stores the vehicle codes returned from the mobile station 16 in its passing vehicle table 82 and compares the static vehicle code 50 with the destination code "$A_1B_1M_{03}$" associated with the message (142). When the two codes compare equal at any of the roadside stations 10, that station 10 read the transmit message out of its memory 42 and transmits it over the channel of the mobile station $A_1B_1M_{03}$ and by using the vehicle communication field 108 of the frame 100. The mobile station $A_1B_1M_{03}$ received the message returns a confirmation by using the end-of-communication field 110 of the frame 100, the answer being finally transferred to the register station 34 via the land station. If the confirmation includes a positive answer ACK, the district station $A_0B_1C_1$ cancels the send requests meant for the other roadside stations 10.

The other roadside stations 10 where the two kinds of codes do not compare equal discard the message being stored in their memories 42 and end this processing, under the control of the district station $A_0B_1C_1$. While each station returns an answer for confirmation at each step of the call termination sequence, such a procedure is not shown in the figure to avoid complexity of illustration.

It is to be noted that the paging adopted in the call termination sequence as discussed above does not constitute an essential part of the illustrative embodiment. Alternatively, an incoming call may be terminated at a mobile station 16 of interest by way of a particular roadside station 10 which is selected by a predetermined sequence. In such a case, a district station such as $A_0B_1C_2$ references the passing vehicle table 170 by using the static vehicle code 50 which was received together with the message from the registry station $A_1B_1$, thereby determining a roadside station 10 represented by the running district code 64 associated with the mobile station $A_1B_1M_{03}$. Thereafter, the district station $A_0B_1C_2$ estimates and then accesses a roadside station which is associated with the determined roadside station 10 in a predetermined relationship, e.g., an adjoining roadside station 10 so as to attempt to terminate the incoming call at the mobile station $A_1B_1M_{03}$.

In summary, in the illustrative embodiment, the mobile stations 16 are individually registered in particular land stations. When any of the district stations 30 detects a particular mobile station 16 for the first time in response to past position data associated with the station 16 and sent from its subordinate roadside station 10, it reports the current position of the mobile station 16 to a registry station where the station 16 is registered. The registry station holds the current position data while constantly updating it on a real-time basis. Since it is only when the past position data is not coincident with the own station code of the district station 30 that the station 30 informs the registry station of the current position of the mobile station 16, the traffic needed for reporting the current position is not heavy and therefore does not effect the data communication traffic which is the primary traffic. In addition, the district station 30 does not have to be provided with the passing vehicle table 170.

To terminate an incoming call at a mobile station 16, access is made to a registry station where the station 16 is registered to determine the current position of the station 16 and, then, the call is terminated at the station 16 via a particular road station 10 which is associated with or estimated from the determined current position. This is successful in reducing the uncertainty as to the position in the event of call termination to the mobile station 16, whereby efficient call termination control is promoted.

In the illustrative embodiment, a roadside station 10 polled a mobile station 16 receives past position data from the mobile station 16. This pas position data is transferred to the associated district station 30 so that the station 30 itself and/or the registry station may perform the estimation of a position of the mobile unit 16 and other various functions in addition to the detection of a change in the position of the mobile station 16.

For example, a roadside station 10 or a district station 30 is capable of grasping various operating conditions of a subscriber vehicle 12 such as running direction, turn, stop and parking. It is possible to determine a roadside station 10 which a particular subscriber vehicle 12 passed last by referencing the past position data obtained by polling. The roadside station 10 can determine a direction in which a subscriber terminal 12 is running by comparing its own station code and the latest position data included in past position data. Specifically, in the example shown in FIG. 28, the roadside station $C_1D_7$ received the code "$C_1D_6$" as past position data from the mobile station $A_1B_1M_{03}$ sees that the subscriber vehicle 12 has travelled in the direction 194. Also, a district station 30 is capable of determining the travelling direction of a subscriber vehicle 12 only if it is supplied with the station code of a roadside station 10 which polled the mobile station 16 of the vehicle 12. Further, the registry station and the centers 26 and 28 are each capable of recognizing the activity over a broader range.

Likewise, in FIG. 28, when the roadside station $C_1D_7$ has received the same past position data "$C_1D_7$" as before from the mobile station $A_1B_1M_{03}$, it is determined that the subscriber vehicle 12 has made a turn to return to the same position or is in a halt or parked there. These conditions are discriminated from each other by a roadside station 10 or a district station 30 depending on whether the same past position data appears at every polling period or at the interval of a plurality of polling periods, or by the associated registry station or the center 26 or 28 by taking account of road traffic data such as conjestion data.

By using the time data included in the past position data, it is possible to count a period of time that a subscriber vehicle 12 needed to travel from one roadside station 10 to another. Specifically, a roadside station 10 determines the period of time as measured from an adjoining roadside station 10 by comparing the time at which it received past position data by polling and the time data included in the past position data. It is to be noted that the time data included in the past position data may be either one of the data fed from a roadside station 10 to a mobile station 16 in the event of polling and the data obtained with a timepiece which is built in a mobile station 16; the former is generally more desirable than the latter in the aspect of accuracy. The mobile station position data and the operating conditions of a subscriber vehicle 12 are fed to the registry station, center 26 or 28, telephone netowork 24 or data switching network 25 via the associated district station 30, regional station 32 and/or the central station 34 as needed.

It is also possible to estimate the movement of a subscriber vehicle 12 by using such past position data. For example, when the registry station associated with a certain mobile station 16 holds past position data and transmits a message meant for the station 16 to a district station 30 as previously stated, the position history data may be used to estimate a particular district station 30 which is most likely to successfully terminate an incoming call. Further, the past position data is available for the center 26 or 28 or similar processing system to estimate a future position, destination and arrival time of a subscriber vehicle 12 and thereby to accomplish efficient message transfer.

The district stations 30, regional stations 32 or central stations 34 may each be provided with the passing vehicle table 170 (FIG. 25) for storing the vehicle code and past position data associated with a particular mobile station 16. Then, the running direction, turn, running time and other operating conditions of a subscriber vehicle 12 can be determined so as to write an estimated future movement of the vehicle 12 in the table 170. Preferably, the future position should be computed and stored by using a district station 30 to which the subscriber vehicle 12 is likely to reach next or a previously stated paging group as a unit. In response to an incoming call meant for a mobile station 16, a district station 30 accesses the associated roadside station group at the same time on the basis of the estimated data. All these schemes are the applications of the detection of a running direction, the detection of a moving condition, and the measurement of a running time.

The past position data to be held and updated by a mobile station 16 has been shown and described as including the latest land station data and time data. Besides, the past position data may include land station data and time data obtained at a plurality of preceding polling points. Specifically, in the example shown in FIG. 28, the mobile station $M_{03}$ polled by the roadside station $C_1D_7$ may store the latest position history data "$C_1D_7$" particular to the roadside station $C_1D_7$ in addition to the data "$C_1D_6$" particular to the preceding roadside station $C_1D_6$. These past position data will be returned to the immediately following roadside station such as $C_2D_0$ when the mobile station $M_{03}$ is polled by the station $C_2D_0$.

An alternative embodiment of the mobile telecommunications system using distributed miniature zones in accordance with the present invention will be described.

Figure 29:
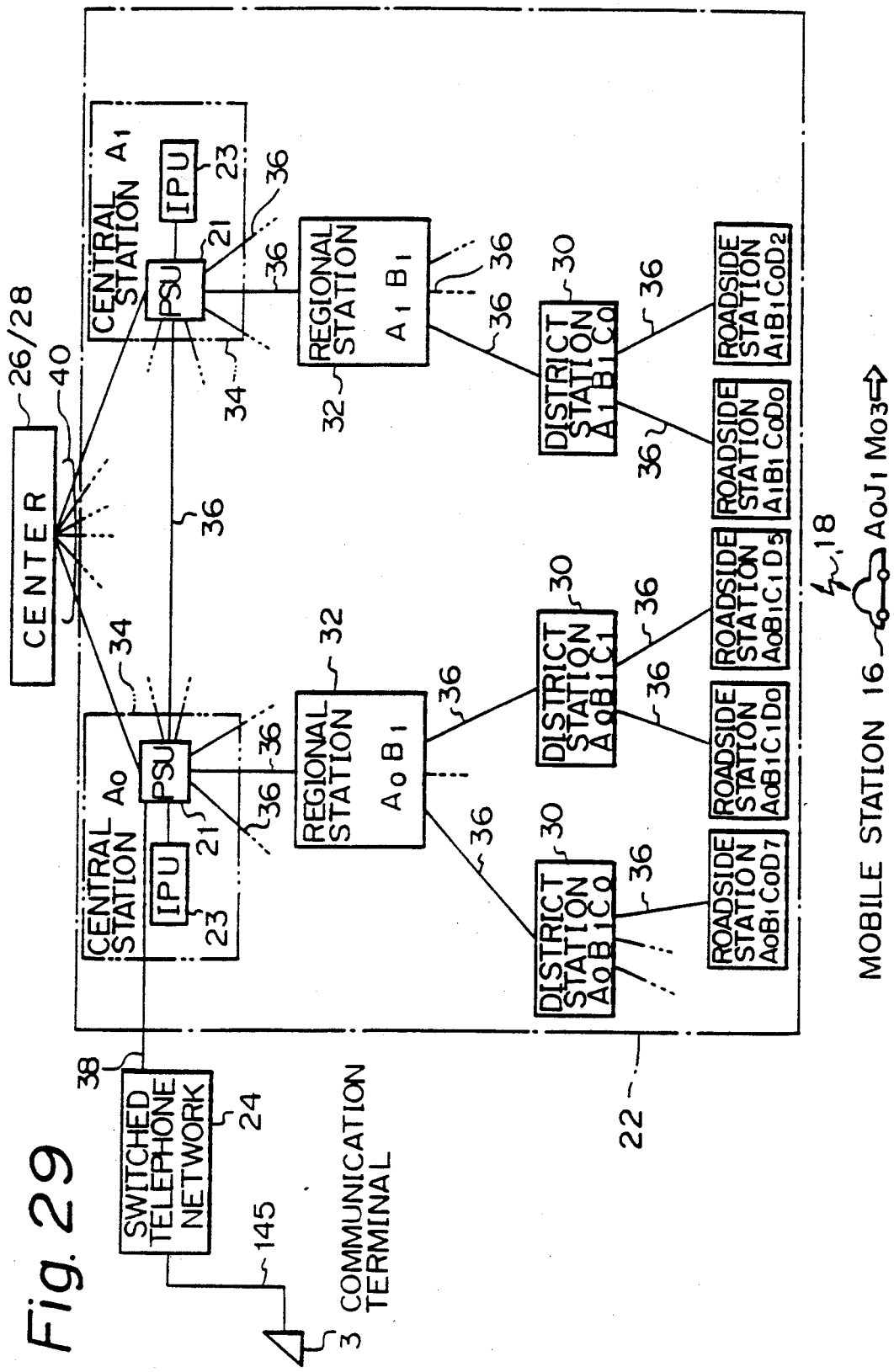
FIG. 29 is a schematic block diagram showing an alternative embodiment of the mobile telecommunications system using distributed miniature zones in accordance with the present invention, especially an alternative hierarchical configuration of the embodiment.

Referring to FIG. 29, there is shown an on-road vehicle telecommunications network 22 which is particular to this alternative embodiment. A trunk 38 for the switched telephone network 24 and data switching network 25, FIG. 1, is connected to the central stations 34, for example. The telephone network 24 is a telephone switching network which mainly switches voice, while the data switching network 25 is a packet switching network mainly switching data. In the illustrative embodiment, the on-road vehicle telecommunications system 22 transmits data in the form of packets and is therefore especially affinitive to a packet switching network. The telephone network 24 accommodates via a subscriber line 145 a communication terminal 3 such as a telephone set which interchange voice signals or data equipment which interchanges data. Although only one terminal 3 is shown in the figure, it will be apparent that a plurality of such terminals 3 are accommodated in the telephone network 24.

The system center 26 serves as a data processing system for handling the navigation of subscriber vehicles 12, for example. The user center 28 is a user-oriented data processing system which allows a particular user to supervise the operation of those subscriber vehicles 12 which belong to the user. The system center 26 and user center 28 are individually connected to the central stations 34 by trunks 40. Alternatively, the centers 26 and 28 may of course be connected to the regional stations 32 or the district stations 30.

Each of the central stations 34, regional stations 32 and district stations 30 has a different station code. By representing the codes assigned to, among such stations, the central stations 34 and regional stations 32 in a hierarchial configuration, a registry land station code 52 (FIG. 3) for designating a particular central station 34 is generated. In the illustrative embodiment, concerning a large enterprise owning a great number of vehicles 12 which are distributed nationwide, the mobile stations 16 of the subscriber vehicles 12 are registered in any of the central stations 34 and each is provided with a unique mobile station code 54. Hence, the individual on-board units or mobile stations 16 are designated in terms of the land station code 52 and mobile station code 54. Alternatively, the subscriber vehicles 12 may be registered in the regional stations 32 or the district stations 30.

As shown in FIG. 3, a vehicle-oriented code for designating a mobile station 16 is made up of a static code 50 and a dynamic code 60. Adapted to designate a mobile station 16 registered in a given central station 34, the static code 50 includes the land station code 52, mobile station code 54, and system code 56 for identifying the whole system. The system code 56 serves to designate this system in distinction from other systems, but it is omissible within the system. Hence, apart from the role of an ID number for distinguishing each mobile stations 16 from the others within the system, the static code 50 is closely related to the number system which is used to terminate a call from the telephone network 24, data switching network 25 or center 26 or 28 at a mobile station 16.

The mobile station 16 mounted on each subscriber vehicle 12 has a vehicle code generating unit (not shown) for generating a vehicle code assigned to the station 16. The vehicle code includes a land station code 52 representative of a registry associated with the mobile station 16 and a mobile station code 54 assigned to the mobile station 16. These codes are set in the vehicle code generating unit and, in response to a polling from any roadside station 10 which will be described, read out and transmitted.

For example, a mobile station 16 is registered in a central station $A_0$ shown in FIG. 29. Assuming that the land station code 52 associated with this mobile station 16 is "$A_0J_1$" and the mobile station code 54 assigned to the station 16 within the central station $A_0$ is "$M_{03}$", then the mobile station 16 is designated by a static vehicle code "$A_0J_1M_{03}$".

Each central station 34 has an information processing unit (IPU) 23 for updating dynamic data associated with the individual subscriber terminals stored therein and storing and processing information which are sent from the system center 26 and user center 28. The central station 34 also has a packet switching unit (PSU) 21 for controlling the connection of the trunk 36. When the IPU 23 receives message information destined to a certain subscriber vehicle 12 from the communication terminal 3, it determines whether or not the mobile station code of the subscriber vehicle 12 of interest is a registered code. If the result of decision is positive, the IPU 23 temporarily stores the mobile station code 54 of the vehicle 12 together with the message information. The IPU 23 adds the latest running area code 64 to the message information and sends them via the PSU 21. Further, after storing the message information, the IPU 23 delivers a command to the PSU 21 for causing the latter to release the connection to the communication terminal 3. As a result, the communication terminal 3 releases the channel immediately after the transmission of the message information. The user center has an automatic vehicle motor (AVM) system available to search the running areas of the subscriber vehicles 12 which belong to an enterprise and, as in the illustrative embodiment, registered in the central station 34. The search with the AVM system, of course, is applicable to the subscriber vehicles 12 which are registered in a district station 32, for example. Further, if a vehicle of interest is not present as determined by comparison, the central station 34 starts on comparison with the other stations simultaneously.

In this embodiment, the IPU 23 of each central station 34 is provided with a running vehicle table. The running vehicle table stores, on a station basis, the areas in which the subscriber vehicles 12 registered in that central station 34 are presently running. The table also stores data associated with the other subscriber vehicles 12 which are running in the individual areas of the particular central station 34, on a registry station basis. These data in the table are constantly updated. Such a running vehicle table may also be installed in each district station 30 or regional station 32.

Each district station 30 accesses all of its subordinate roadside stations 10 at the same time over the trunk 36 for transmitting message information which is sent from the regional station 32 which is associated with the district station 30. This is because, when the district station 30 has received message information from the associated regional station 32, a mobile station 16 which is expected to receive the message is present in the coverage area of the district station 30. On receiving the message, each roadside station 10 polls mobile stations 16 running in its coverage area by polling and, based on the mobile station codes 54 returned from the mobile stations 16, determines whether or not any of the mobile stations 16 is to receive the message information. If the mobile station 16 to receive the message information exists in the coverage area, the roadside station 10 sends the message information to that mobile station 16.

Figure 30:
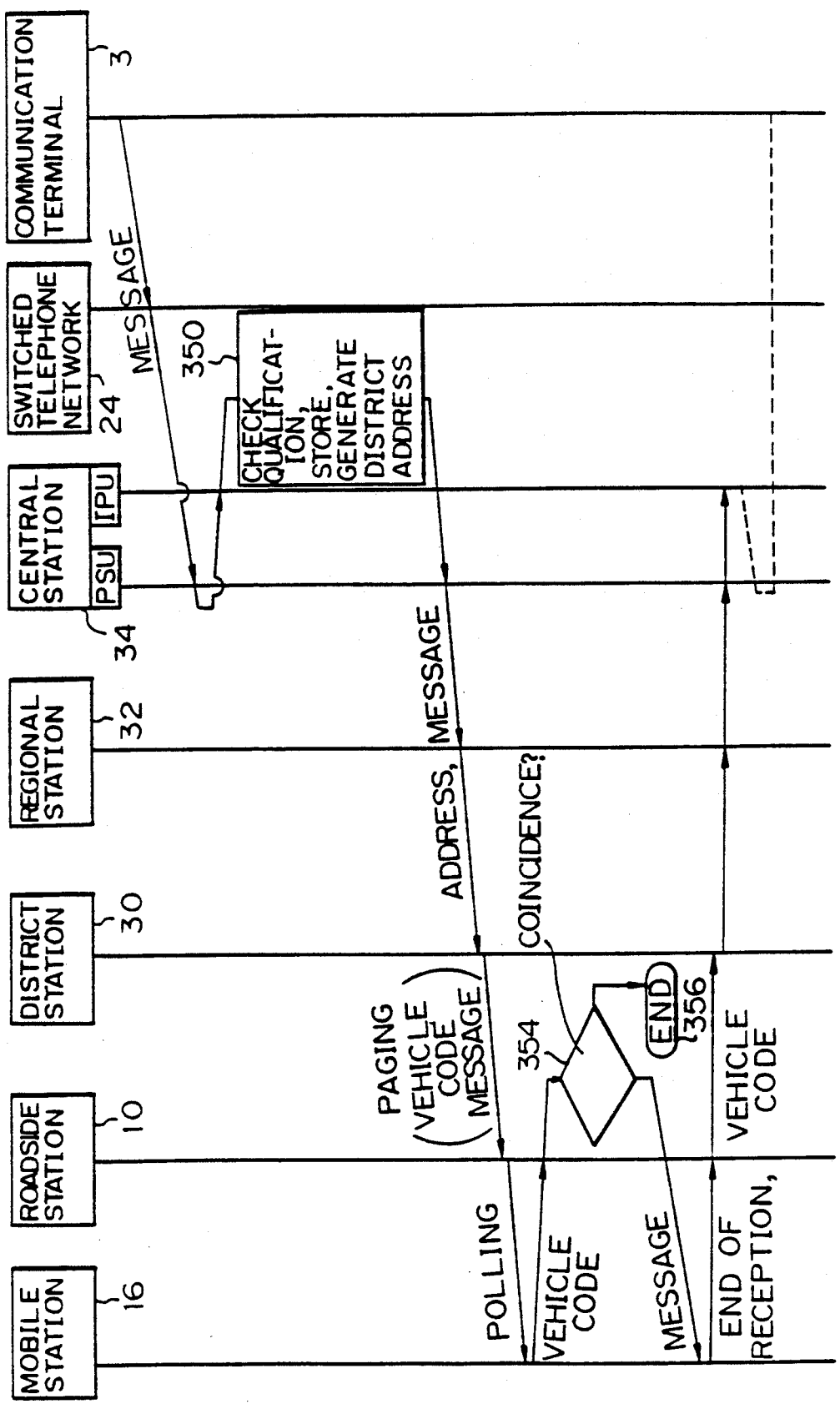
FIG. 30 is a diagram showing a specific sequence for terminating a call at a mobile station in the embodiment of FIG. 30.

FIG. 30 indicates a specific sequence for terminating a call at a mobile station 16. This sequence will be described by taking the communication terminal 3 and the mobile station 16 having a static vehicle code "$A_0J_1M_{03}$" as an example and with reference also made to FIG. 29. A message fed from the communication terminal 3 is sent to the telecommunications network 22 over the telephone network 24 together with a header, or static vehicle code 50, which includes the destination code "$A_0J_1M_{03}$". From the telecommunications network 22, the message is transferred to the IPU 23 of the central station $A_0$ where the vehicle specific code 50 is registered, via the PSU unit 21. In response, the IPU 23 checks the qualification of the mobile station $A_0J_1M_{03}$ as to the registration on the basis of the destination code and, if it is qualified, temporarily stores the message (350). As soon as the IPU 23 so stores the message, it delivers a command to the PSU 21 for releasing the channel. This allows the communication terminal 3 to end the communication rapidly after the transmission of the message.

By referencing the running vehicle table which stores mobile station position data, the IPU 23 determines the current position of the mobile station $A_0J_1M_{03}$ which is to receive the message. Assuming that the determined current position is "$A_0B_1C_1$", the IPU 23 produces a dynamic vehicle code 60 which includes the address "$A_0B_1C_1$" of the district station 30 as a running area code 64. Then, the IPU 23 reads out the stored message, adds the dynamic code 60 to the header of the message, and applies the resulting code and message to the PSU 21. In response, the PSU 21 selects a particular trunk 36 being connected to the regional station $A_0B_1$ as indicated by the dynamic code 60.

The transit stations, i.e., the central station 34 and regional station 32 transfer the message to the district station $A_0B_1C_1$ by identifying the dynamic vehicle code 60 which is added to the message. On receiving the message together with the header, the district station $A_0B_1C_1$ accesses all of its subordinate roadside stations 10 at the same time. Such paging is implemented by a send request, the message and the destination code "$A_0J_1M_{03}$". Each roadside station 10 stores the received message in the memory 42 for a moment and then polls the mobile stations 16 which are present in its service zone 20. This polling occurs independently of, or asynchronously to, the arrival of the message and in the introductory field 102 of the frame 100, as previously stated.

In response to the polling, each active mobile station 16 which exists in the service zone 20 of the roadside station 10 generates vehicle codes 50 and 60 by its vehicle code generating unit and returns them to the roadside station 10. This is implemented by the vehicle ID field 104 of the frame 100. The roadside station 10 once stores the vehicle codes returned from the mobile stations 16 in its passing vehicle table, while comparing the mobile station codes 54 of the static vehicle codes 50 which are included in the vehicle codes with the destination code "$A_1J_1M_{03}$" of the message (354). When the mobile station code 54 sent from any of the mobile stations 16 coincides with the destination code "$A_1J_1M_{03}$" at any of the roadside stations 10, that roadside station 10 reads the message out of the memory 42 and transmits it to the mobile station $A_1J_1M_{03}$ by using the channel of the latter and the vehicle communication field 108 of the frame 100. The mobile station $A_1J_1M_{03}$ received the message returns a confirmation signal by using the end-of-communication field 110, the confirmation being finally transferred to the central station $A_0$. In response to the confirmation from the mobile station $A_0J_1M_{03}$, the central station $A_0$ causes the IPU 20 thereof to inform the communication terminal 3 of the successful delivery of the message to the mobile station $A_0J_1M_{03}$, as needed.

The roadside stations 10 where the two kinds of codes are not coincident as determined in the step 354 discard the message stored in their memories 42 in response to, for example, a cancel request which may be sent from the district station 30 (356). While each station returns a confirmation at each step of the call termination sequence discussed above, such a procedure is not shown in FIG. 30 to avoid complexity of illustration.

FIG. 31 shows a specific sequence which is executed to allow the mobile station $A_0J_1M_{03}$ having a vehicle code "$A_0J_1M_{03}$" to originate a message. This sequence will be described with reference also made to FIG. 29. When the mobile station $A_0J_1M_{03}$ enters the service zone 20 of the roadside station $A_0B_1C_1D_5$, the former is polled by the latter at a predetermined period. The mobile station 16 is held in a receive mode while in an idle state and is caused into a transmit mode on ending the reception of the introductory field 102 of the frame 100, as previously stated. Specifically, in response to polling, the mobile station 16 selects one of a plurality of channels out of its random number table and reports it to the roadside station 10. So long as this channel does not conflict with the channels of the other mobile stations 16, the roadside station 10 uses it. As the roadside station 10 informs the mobile station 16 of the assigned channel, the mobile station 16 sends the static vehicle code 50 and dynamic vehicle code 60 by using the vehicle ID field 104 of the frame 100 and a message and destination code by using the vehicle communication field 108.

As the roadside station $A_0B_1C_1D_5$ receives the vehicle code "$A_0J_1M_{03}$" of the mobile station 16 which is registered in the mobile station code 54, it once stores the message and destination code in the memory 42 while transferring them to its associated district station $A_0B_1C_1$ together with a vehicle code 50. In response, the district station $A_0B_1C_1$ identifies the registry station represented by the vehicle code "$A_0J_1M_{03}$" and then sends the message and destination code to its associated central station $A_0$, where the mobile station 16 is registered, together with the own station position information. On receiving the static and dynamic vehicle codes 50 and 60, the IPU 23 of the central station $A_0$ checks the qualification of the mobile station $A_0J_1M_{03}$ as to the registration. If the mobile station $A_0J_1M_{03}$ is qualified, the IPU 23 identifies the mobile station 16 of interest, i.e., $M_{03}$ in this example as indicated by the mobile station code 54 and then stores the position data in a particular location. Further, the IPU 23 produces the address of the communication terminal included in the telephone network 24 on the basis of the received destination code and adds the address to the message. The message with the address is transmitted to the communication terminal 3 designated by the address over the telephone network 24. Again, although each station returns a confirmation at each step of the mobile station call origination sequence described above, such a procedure is not shown in FIG. 31 to avoid intricacy of illustration.

As stated above, in this particular embodiment, the on-road vehicle telecommunications network 22 stores within the network a message which is sent from a communication terminal 3 accommodated in the switched telephone network 24, for example, then releases the connection with the telephone network 24, and then transfers the message to a mobile station. This prevents the communication terminal 3 from being held until the path between itself and the mobile station 16 has been set up, thereby reducing the holding time of the telephone network 24.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile telecommunications system comprising:
a plurality of base stations each being communicable with a mobile station over a radio link using a single frequency of an electromagnetic wave between geographically adjoining base stations, said plurality of base stations transmitting and receiving data with which the single frequency is modulated; and
a communication network interconnected to said plurality of base stations for switching to said plurality of base stations communications of the data which have been received and are to be transmitted by said plurality of base stations;
geographically adjoining ones of said plurality of base stations being spaced apart from each other with an area intervening in between in which the mobile station is substantially not responsive to the electromagnetic wave on the radio link;
each of said plurality of base stations establishing a miniature zone in which the single frequency of the electromagnetic wave is available to the mobile station, said miniature zone being of such a size that part of the data is transmitted between one of said plurality of base stations and the mobile station while the mobile station is in the miniature zone established by said one base station;
whereby said adjoining base stations are allowed to share the single frequency of the electromagnetic wave to transmit a series of data to the mobile station intermittently while the mobile station moves across the miniature zones established by adjoining ones of said plurality of base stations with said area intervening in between in which the mobile station is substantially not responsive to the electromagnetic wave on the radio link.

2. A system in accordance with claim 1, wherein on receiving from a first terminal first information to be transmitted to the mobile station, said communication network temporarily stores said first information, releases connection with the first terminal, and transmits said first information to one of said base stations;
on receiving second information to be destined to a second terminal from the mobile station via said base station, said communication network temporarily stores said second information and transmits said second information to the second terminal.

3. A mobile telecommunications system comprising:
a mobile station; and
a communication network comprising a plurality of land stations communicable with said mobile station and having memory storage, geographically adjoining ones of said plurality of land stations being spaced apart from each other with an area intervening in between in which the mobile station is not communicable with any of said plurality of land stations;
said geographically adjoining land stations using a single frequency of an electromagnetic wave between each said adjoining base station to communicate with the mobile station;
an identification identifying said mobile station being registered in one of said plurality of land stations;
said plurality of land stations, upon detecting said mobile station, reporting a position of said mobile station to said one land station where the identification of said mobile station is registered;
said one land station updating its memory storage in response to the position of said mobile station being detected and reported.

4. A system in accordance with claim 3, wherein said plurality of land stations comprises base stations each being communicable with said mobile station over a radio channel and switching stations for switching communications to said base stations;
ones of said plurality of base stations which are located in an area interconnected to one of said switching stations to form a group;
the identification of said mobile station being registered in one of said switching stations;
said switching station to which said base stations forming the group are interconnected reporting, when detecting said mobile station in the area for the first time through any one of said base stations forming the group, a position of said detected mobile station to said switching station where said mobile station is registered;
said switching station where said mobile station is registered storing data representative of the reported position of said mobile station.

5. A system in accordance with claim 3, wherein said land stations comprise base stations communicable with said mobile station over a radio channel and switching stations interconnected to each other and to said base stations for switching communications to and from said base stations;
the identification of said mobile station being registered in first one of said switching stations;
said mobile station storing history data including at least position data representative of a position which said mobile station has passed last while updating said history data and, in response to access from any one of said base stations, returning the stored position data to said one base station;
said one base station sending the returned position data to a second one of said switching stations to which said one base station is interconnected;
said second switching station detecting when the position data sent from said one base station undergoes a change, and then reporting a position of said mobile station to said first switching stations.

6. A mobile telecommunications system comprising:
a plurality of base stations each being communicable with a mobile station over a radio link including a single frequency of an electromagnetic wave used between adjoining base stations, said plurality of base stations being spaced apart from each other with an area intervening in between in which the mobile station is substantially not responsive to said electromagnetic wave on the radio link and being allowed to share the single frequency of the electromagnetic wave to communicate with the mobile station; and a communication network interconnected to said plurality of base stations and including a plurality of switching stations for switching communications to said plurality of base stations, an identification of the mobile station being registered in a first one of said plurality of switching stations;

a second one of said plurality of switching stations detecting the mobile station through any of said plurality of base stations, and then reporting a position of the mobile station to said first switching station;

said first switching station storing position data representative of the reported position of said mobile station;

said first switching station updating the stored position data in response to the position of the mobile station being detected and reported.

7. A system in accordance with claim 6, wherein geographically associated ones of said plurality of base stations form a paging group and wherein said system receives incoming calls to be terminated at the mobile station;

whereby when an incoming call is to be terminated at the mobile station, said position data for said mobile station stored in said first switching station is referenced, and said paging group associated with the referenced position data is accessed.

8. A system in accordane with claim 6, wherein geographically associated ones of said plurality of base stations form a group and are interconnected to a third one of said plurality of switching stations;

in response to any one of said base stations detecting the mobile station, said third switching station transferring to said first switching station first position information representative of a position of said mobile station and second position information indicative of whether or not said mobile station is located at an edge of an area which corresponds to the group and from which the mobile station is outgoing;

said first switching station storing the first and second position information;

when an incoming call is to be terminated at the mobile station, said first switching station referencing the first and second position information stored and, if the second position information shows that said mobile station is not located at the edge, terminating the call to said mobile station on the basis of the first position information.

9. A system in accordance with claim 6, wherein geographically associated ones of said plurality of base stations form a group and are interconnected to a third one of said plurality of switching stations;

said switching stations being responsive to an incoming call to be terminated at the mobile station;

said third switching station covering, as to call termination control, one of said plurality of base stations which is located at an edge of an area corresponding to another group which adjoins an area corresponding to the group of said third switching station;

in response to the incoming call to be terminated at the mobile station, said third switching station executing the call termination control over ones of said base stations interconnected to said third switching station and said one base station located at the edge of the area of the other group.

10. A system in accordance with claim 6, wherein geographically assoicated ones of said plurality of base stations form a group and are interconnected to a third one of said plurality of switching stations;

in response to any one of said plurality of base stations detecting the mobile station, said third switching station to which said one bse station is interconnected transferring to said first switching station first position information representative of a position of said mobile station and second position information indicative of whether said mobile station is located at an edge of an area which corresponds to the group and from which the mobile station is outgoing;

said first switching station storing the first and second position information;

when an incoming call is to be terminated at the mobile station, said first switching station referencing the first and second position information and, if the second position information shows that said mobile station is not located at the edge, causing the call to be terminated at said mobile station from said third switching station on the basis of the first position information and, if the second position information shows that said mobile station is located at the edge, causing the call to be terminated at said mobile station via any of said switching stations which is adjacent to said third switching station on the basis of the first position information.

11. A system in accordance with claim 6, wherein the mobile station is registered said first switching station in association with an identification code which designates said mobile station; and the mobile station generates the identification code and transmits said identification code to any one of said plurality of base stations;

said switching stations, when receiving the identification code from the mobile station via said one base station, adding position information associated with a position of said mobile station to said identification code and transferring said position information and identification code to said first switching station;

said first switching station storing the position information in association with the identification code.

12. A system in accordance with claim 6, wherein said system is adapted for road traffic of vehicles including automobiles.

13. A system in accordance with claim 6, wherein said communication network is connectable to a center and/or another switching network which supplies information to the mobile station and/or supervises the mobile station.

14. A method of mobile telecommunications comprising the steps of:

preparing a plurality of base stations communicable with a mobile station over a radio link using a single frequency of an electromagnetic wave between adjoining base stations, said plurality of base stations being spaced apart from each other with an area intervening in between in which the mobile station is substantially not responsive to the electromagnetic wave on the radio link, said plurality of base stations being adapted to transmit and receive data with which the single frequency is modulated;

interconnecting said plurality of base stations to a communication network, each of said plurality of base stations establishing a miniature zone in which the single frequency of the electromagnetic wave is available to the mobile station, said miniature zone being of such a size that part of the data is transmitted between one of said plurality of base stations and the mobile station while the mobile station is in the miniature zone established by said one base station;

allowing said plurality of base stations to share the single frequency of the electromagnetic wave to communicate with the mobile station; and switching communication of the data which have been received and are to be transmitted by said plurality of base stations over said communication network through said plurality of base stations to and from the mobile station;

whereby the mobile station is allowed to transmit a series of data to adjoining ones of said plurality of base stations intermittently while moving across the miniature zones established by said adjoining base stations with said area intervening in between in which the mobile station is substantially not responsive to the electromagnetic wave on the radio link.

15. A method in accordance with claim 14, further comprising the steps of:
setting up a connection between said communication network and a terminal;
receiving information directed to the mobile station from the terminal by said communication network;
storing the information in said communication network;
releasing the connection with the terminal; and
transmitting the information to any one of said base stations.

16. A method in accordance with claim 14, further comprising the steps of:
receiving information directed to a terminal from the mobile station via said base station;
storing the information in said communication network; and
transmitting the information to the terminal.

17. A method of mobile telecommunications comprising the steps of:
preparing a communication network comprising a plurality of land stations communicable with a mobile station to have geographically adjoining ones of said plurality of land stations spaced apart for each other with an area intervening in between in which the mobile station is not communicable with any of said plurality of land stations;
utilizing a single frequency between said geographically adjoining land stations to communicate with the mobile system;
registering an identification of the mobile station in one of said plurality of land stations;
detecting a position of the mobile station by any of said plurality of land stations;
reporting, in response to said detecting step, a position of the mobile station from said land station having detected the mobile station to said one land station where the mobile station is registered; and
updating a stored content in said one land station where the mobile station is registered in response to the position of the mobile station being detected and reported.

18. A method in accordance with claim 17, wherein said plurality of land stations comprises base stations communicable with the mobile station over a radio channel and switching stations for switching a communication to said base stations,
said registering step comprising the step of registering the identification of the mobile station in a first one of said plurality of switching stations;
said method further comprising the steps of:
forming a group of geographically associated ones of said plurality of base stations to be interconnected to a second one of said plurality of switching stations;
reporting, in response to any one of said base stations forming a group detecting the mobile station for the first time in an area corresponding to the group, a position of the detected mobile station by said second switching station to said first switching station; and
storing data representative of the reported position of the mobile station in said first switching station.

19. A method in accordance with claim 17, wherein said plurality of land stations comprises base stations communicable with the mobile station over a radio channel and switching stations interconnected to each other and to said base stations for switching a communication to said base stations,
said registering step comprising the step of registering the identification of the mobile station in a first one of said plurality of switching stations;
said method further comprising the steps of:
storing in the mobile station history data including at least position data representative of a position which the mobile station has passed last to update the history data;
returning, in response to access from any one of said base stations, the stored position data to said one base station;
sending the returned position data from said one base station to a second one of said switching stations to which said one base station is interconnected;
detecting by said second switching station when the position data sent from said one base station undergoes a change; and
reporting a position of the mobile station by said second switching station to said first switching station.

20. A method of mobile telecommunications comprising the steps of:
preparing a plurality of base stations communicable with a mobile station over a radio link using a single frequency of an electromagnetic wave between adjoining base stations with said plurality of base stations spaced apart from each other with an area intervening in between in which the mobile station is substantially not responsive to the electromagnetic wave on the radio link;
interconnecting said plurality of base stations to a communication network including a plurality of switching stations;
allowing said plurality of base stations to share the single frequency of the electromagnetic wave to communicate with the mobile stations;

switching communications through said plurality of switching stations to said plurality of base stations;

registering the mobile station in a first one of said plurality of switching stations;

detecting the mobile station by any one of said plurality of base stations;

reporting a position of the mobile station from said one base station having detected the mobile station to said first switching station;

storing data representative of the reported position of the mobile station in said first switching station; and updating the stored position data in said first switching station in response to the position of the mobile station being detected and reported.

21. A method in accordance with claim 20, further comprising the steps of:

dividing said plurality of base stations into paging groups each including geographically associated ones of said base stations;

referencing, when an incoming call is to be terminated at the mobile station, a position of the mobile station stored in said first switching station; and accessing one of said paging groups associated with the referenced position.

22. A method in accordance with claim 20, further comprising the steps of:

forming a group of geographically associated ones of said plurality of base stations to be interconnected to a second one of said plurality of switching stations;

transferring to said first switching station by said second switching station, when any one of said base stations detects the mobile station, first position information representative of a position of the mobile station and second position information indicative of whether or not the mobile station is located at an edge of an area which corresponds to the group and from which the mobile station is outgoing;

storing the first and second position information in said first switching station;

referencing, when an incoming call is to be terminated at the mobile station, the first and second position information stored in said first switching station; and terminating the call to the mobile station on the basis of the first position information if the second position information shows that the mobile station is not located at the edge of the area.

23. A method in accordance with claim 20, further comprising the steps of:

forming a group of geographically associated ones of said plurality of base stations to be interconnected to a second one of said plurality of switching stations, said second switching station covering, as to call termination control, one of said plurality of base stations which is located at an edge of an area corresponding to another group which adjoins an area corresponding to the group including said second switching station; and executing the call termination control over said base stations interconnected to said second switching station and said one base station located at the edge of the area corresponding to the other group by said second switching station when an incoming call is to be terminated at the mobile station.

24. A method in accordance with claim 20, further comprising the steps of:

forming a group of geographically associated ones of said plurality of base stations to be interconnected to a second one of said plurality of switching stations;

transferring, when any one of said base stations detects the mobile station, first position information representative of a position of the mobile station and second position information indicative of whether or not the mobile station is located at an edge of an area which corresponds to the group and from which the mobile station is outgoing by said second switching station, to which said base station having detected the mobile station in interconnected, to said first switching station where the mobile station is registered;

storing the first and second position information in said first switching station;

referencing, when an incoming call is to be terminated at the mobile station, the first and second position information stored in said first switching station;

terminating the call at the mobile station from said second switching station on the basis of the first position information if the second position information shows that the mobile station is not located at the edge of the area; and terminating the call at the mobile station from any of said switching stations which is adjacent to said second switching station on the basis of the first position information if the second position information shows that the mobile station is located at the edge of the area.

25. A method in accordance with claim 20, further comprising the steps of:

registering the mobile station in said first switching station in accordance with an identification code which designates the mobile station;

generating the identification code from the mobile station;

transmitting the identification code to any one of said plurality of base stations from the mobile station;

receiving the identification code from the mobile station by a second one of said switching stations from the mobile station via said one base station;

adding position information associated with a position of the mobile station to the identification code by said switching station;

transferring the position information and identification code from said second switching station to said first switching station; and storing the position information in association with the identification code in said first switching station.

* * * * *